United States Patent
Uragami et al.

(10) Patent No.: US 10,031,336 B2
(45) Date of Patent: Jul. 24, 2018

(54) IMAGE DISPLAY DEVICE

(71) Applicant: Panasonic Intellectual Property Management Co., Ltd., Osaka (JP)

(72) Inventors: Susumu Uragami, Osaka (JP); Takahisa Shiramizu, Saga (JP); Akira Kurozuka, Osaka (JP); Hiroyuki Furuya, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/403,408

(22) Filed: Jan. 11, 2017

(65) Prior Publication Data

US 2017/0212347 A1    Jul. 27, 2017

(30) Foreign Application Priority Data

Jan. 26, 2016  (JP) ................................ 2016-012101
Sep. 21, 2016  (JP) ................................ 2016-184032

(51) Int. Cl.
*G02B 27/01* (2006.01)
*G09G 3/00* (2006.01)

(52) U.S. Cl.
CPC .. *G02B 27/0149* (2013.01); *G02B 2027/0123* (2013.01); *G09G 3/002* (2013.01); *G09G 2380/10* (2013.01)

(58) Field of Classification Search
CPC ........ G02B 2027/0123; G02B 27/0149; G09G 2380/10; G09G 3/002
USPC ....................................................... 345/156
See application file for complete search history.

(56) References Cited

U.S. PATENT DOCUMENTS

| | | | |
|---|---|---|---|
| 2009/0160736 A1 | 6/2009 | Shikita | |
| 2016/0124230 A1* | 5/2016 | Hino | G02B 27/0172 359/214.1 |
| 2016/0139415 A1* | 5/2016 | Irzyk | G02B 27/0093 250/342 |
| 2016/0139416 A1* | 5/2016 | Yamakawa | G02B 26/101 359/634 |
| 2016/0313562 A1* | 10/2016 | Saisho | G02B 27/0179 |
| 2016/0334637 A1* | 11/2016 | Saisho | G02B 27/0101 |
| 2017/0131549 A1* | 5/2017 | Tanaka | G02B 26/101 |
| 2017/0146803 A1* | 5/2017 | Kishigami | G02B 27/0179 |
| 2017/0212347 A1* | 7/2017 | Uragami | G02B 27/0149 |
| 2017/0264872 A1* | 9/2017 | Uragami | H04N 9/3185 |

FOREIGN PATENT DOCUMENTS

| | | | | |
|---|---|---|---|---|
| JP | 2009-150947 | | 7/2009 | |
| JP | 2012058689 A | * | 3/2012 | ......... G02B 27/0101 |

* cited by examiner

*Primary Examiner* — Tony Davis
(74) *Attorney, Agent, or Firm* — McDermott Will & Emery LLP

(57) ABSTRACT

An image display device includes a light source, a screen, an optical system and a driving unit. The screen is irradiated with light from the light source to form an image. The optical system generates a virtual image with the light from the screen. The driving unit moves the screen in an optical axis direction. The driving unit includes a holder, one or more elastic members and a driving source. The holder holds the screen. The one or more elastic members support the holder so as to enable the holder to reciprocally move in the optical axis direction. The driving source generates force for moving the holder in the optical axis direction.

15 Claims, 40 Drawing Sheets

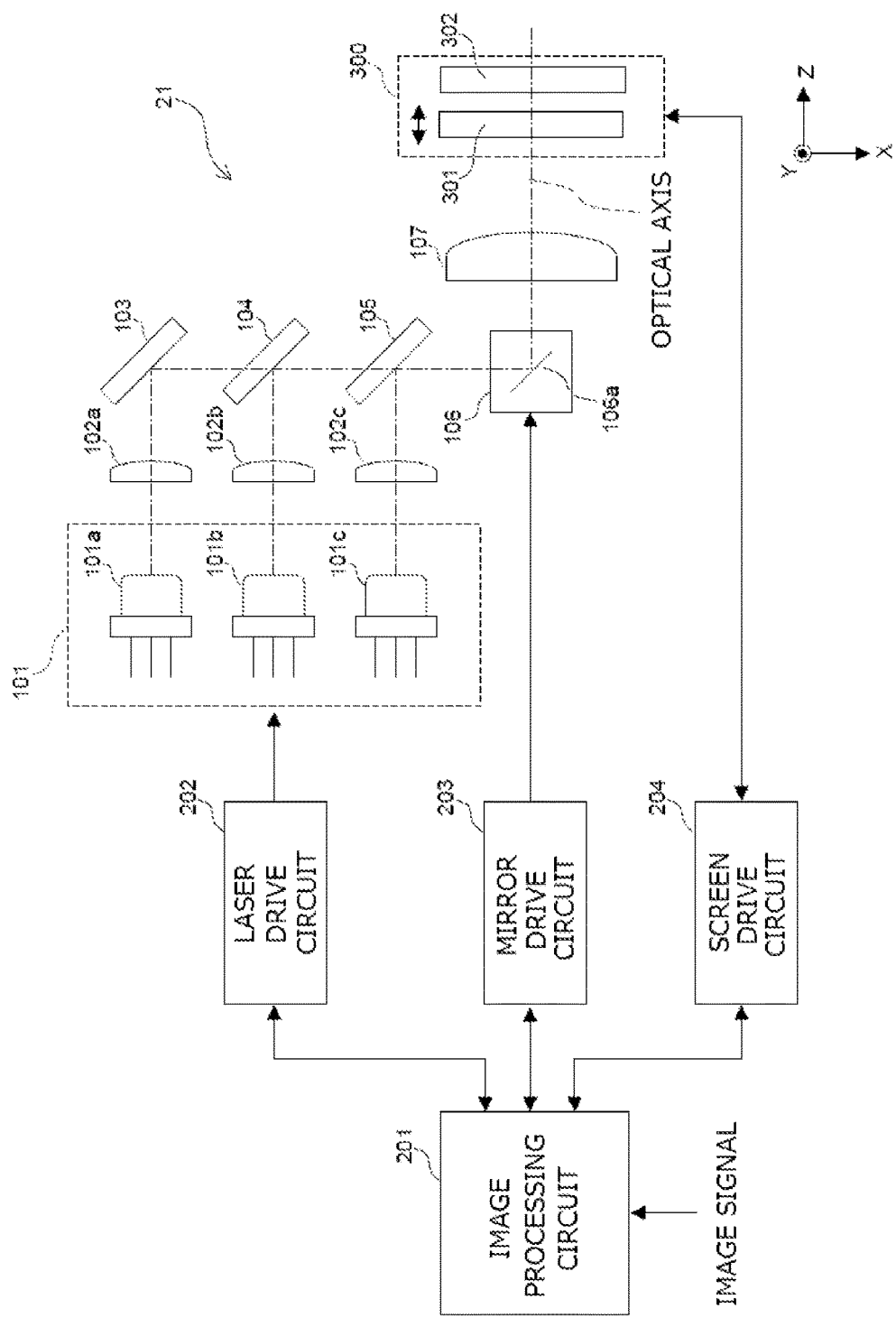

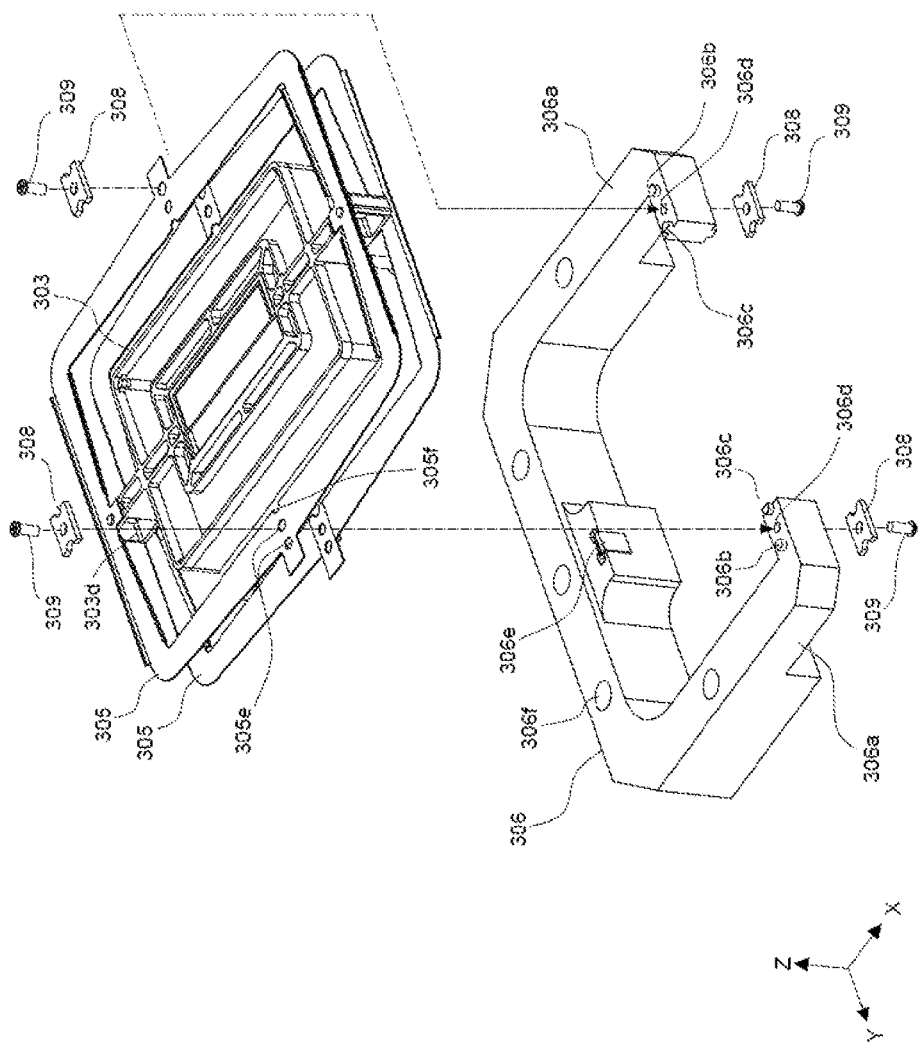

IMAGE DISPLAY DEVICE

BACKGROUND

1. Technical Field

The present disclosure relates to an image display device that is suitable to mount on a moving body such as a vehicle.

2. Description of the Related Art

In recent years, an image display device which is called a head-up display has been developed, and has been mounted on a moving body such as a vehicle. In the head-up display to be mounted on a vehicle, light modulated according to image information is projected toward a wind shield, and vehicle driver's eyes are irradiated with reflected light from the wind shield. Consequently, a vehicle driver can see a virtual image of an image ahead of the wind shield. For example, a vehicle speed, outdoor temperature or the like is displayed as a virtual image. Recently, displaying a navigation image or an image which calls attention to a passerby as a virtual image has also been studied.

In the above-described head-up display, a laser light source such as a semiconductor laser can be used as a light source for generating a virtual image. In this configuration, while laser light is modulated according to an image signal, a screen is scanned with the laser light. In the screen, the laser light is diffused and an area of light with which vehicle driver's eyes are irradiated is widened. Consequently, even when a vehicle driver slightly moves the head, the eyes do not go out of the irradiation area, and the vehicle driver can favorably and stably see an image (virtual image).

Unexamined Japanese Patent Publication No. 2009-150947 describes a configuration of moving a screen in an optical axis direction and changing a virtual image formation position in a front-back direction. In this configuration, the screen is driven by using a motor, a feed screw and a rack.

SUMMARY

An image display device according to a first aspect of the present disclosure includes a light source, a screen, an optical system and a driving unit. The screen is irradiated with light from the light source to form an image. The optical system generates a virtual image with the light from the screen. The driving unit moves the screen in an optical axis direction. The driving unit includes a holder, one or more elastic members and a driving source. The holder holds the screen. The one or more elastic members support the holder so as to enable the holder to reciprocally move in the optical axis direction. The driving source generates force for moving the holder in the optical axis direction.

According to an image display device according to this aspect, it is possible to move the screen stably at a high speed.

An image display device according to a second aspect of the present disclosure includes a light source, a first screen, a second screen, an optical system, a driving unit and an image processing unit. The first and second screens are irradiated with light from the light source to form images. The optical system generates a virtual image with light from the first and second screens. The driving unit moves the first screen in an optical axis direction. The image processing unit modulates according to an image signal the light with which the first screen and the second screen are irradiated.

According to the image display device according to this aspect, for example, the second screen can display a static image showing a vehicle speed, outdoor temperature or the like, and the first screen can display a dynamic image such as a depth image which is superimposed on scenery in a field of view to be displayed. Consequently, as compared to a case where the first screen displays a static image together with a dynamic image, it is possible to narrow a movement range (oscillation range) of the first screen, and to more smoothly and quickly move the first screen.

As described above, the present disclosure can provide an image display device which can move a screen at a high speed.

An effect and significance of the present disclosure will be clarified further by description of the following exemplary embodiments. However, the following exemplary embodiments are only examples for carrying out the present disclosure, and the present disclosure is by no means limited to those described in the following exemplary embodiments.

BRIEF DESCRIPTION OF THE DRAWINGS

FIG. 2 is a view illustrating a configuration of an irradiation light generator and a configuration of a circuit used for the irradiation light generator in the image display device according to the first exemplary embodiment;

FIG. 8 is a perspective view illustrating an assembly process of the suspension and a support member according to the first exemplary embodiment;

DETAILED DESCRIPTION OF EMBODIMENT

A problem in a conventional configuration will be described prior to description of the exemplary embodiments of the present disclosure. A series of images are drawn on a screen by changing a position of the screen in an optical axis direction at a high speed. Consequently, a vehicle driver can visually recognize an image which spreads in a depth direction. Consequently, it becomes possible to display, for example, an image which spreads in the depth direction such as an arrow indicating a traveling direction of a vehicle (such an image will be referred to as a "depth image" below) superimposed on an intersection. In this case, in order that a vehicle driver visually recognizes the depth image as one image, it is necessary to display a video image at a frame rate from at least 50 frames/second to 60 frames/second, and it is necessary to move the screen at a high speed which is a speed once to three times a frequency of 50 Hz to 60 Hz. In a configuration of Unexamined Japanese Patent Publication No. 2009-150947, it is difficult to move the screen at a high speed in such a way.

Moreover, there is a problem in the screen that vibrates at an unintended frequency during high speed movement of the screen, which results in that the screen cannot correctly display a video image, or screen position control goes out of control and breakage of a driving unit occurs.

In view of such a problem, the present disclosure provides an image display device which can move a screen at a high speed.

The exemplary embodiments of the present disclosure will be described below with reference to the figures. For convenience, X, Y and Z axes orthogonal to each other are appropriately indicated in each figure. The exemplary embodiments of the present disclosure are exemplary embodiments where the present disclosure is applied to an in-vehicle head-up display.

First Exemplary Embodiment

Figure 1A:
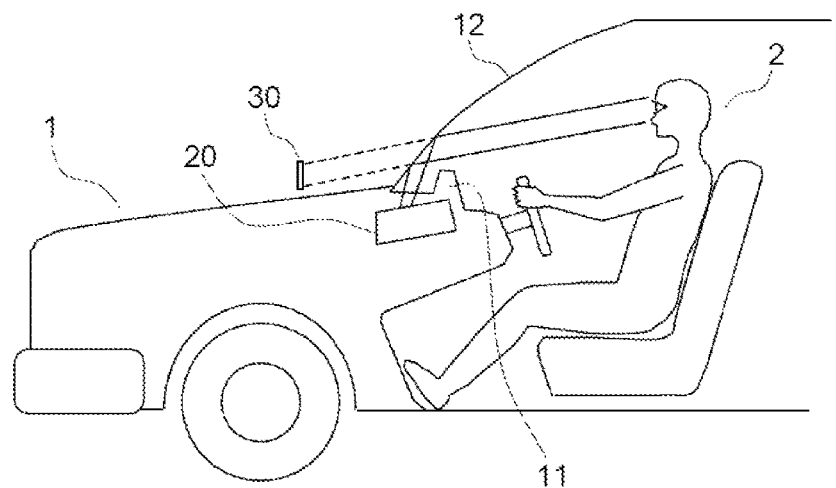
FIGS. 1A, 1B are views each schematically illustrating a use mode of an image display device according to a first exemplary embodiment.
Figure 1B:
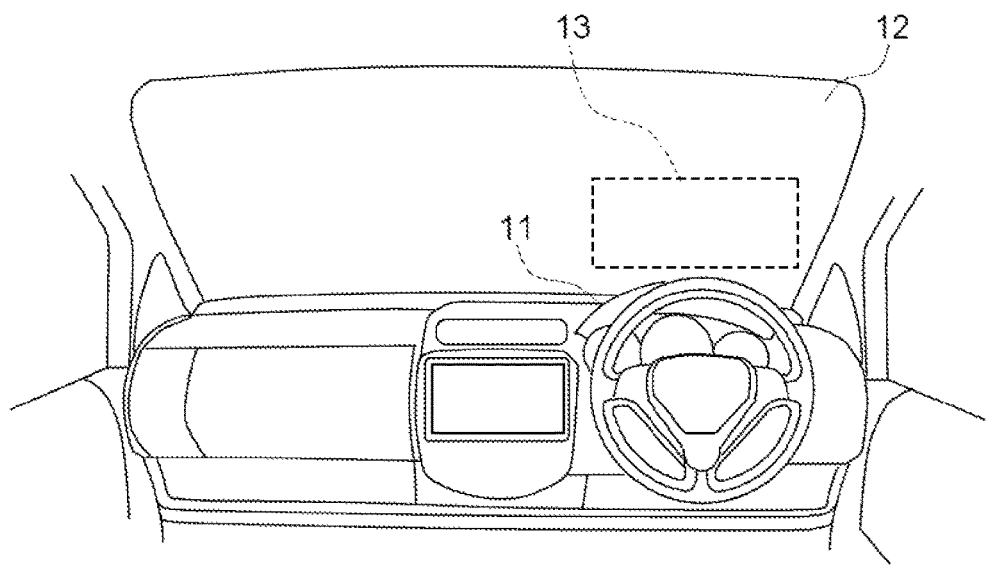

FIGS. 1A, 1B are views each schematically illustrating a use mode of image display device 20. FIG. 1A is a transparent schematic view of an inside of vehicle 1 seen from a side of vehicle 1, and FIG. 1B is a view of a front in a traveling direction seen from the inside of vehicle 1.

As illustrated in FIG. 1A, image display device 20 is installed inside of dashboard 11 of vehicle 1.

As illustrated in FIGS. 1A, 1B, image display device 20 projects laser light modulated according to an image signal, to projection area 13 closer to a driver's seat at a lower side of wind shield 12. The laser light is reflected in projection area 13, and an oblong area around an eye position of vehicle driver 2 (eyebox area) is irradiated with the laser light. Consequently, predetermined image 30 is displayed as a virtual image in a field of view ahead of vehicle driver 2. Vehicle driver 2 can see image 30 that is a virtual image and that is superimposed on a landscape ahead of wind shield 12. That is, image display device 20 forms image 30 that is a virtual image, in a space ahead of projection area 13 of wind shield 12.

Figure 1C:
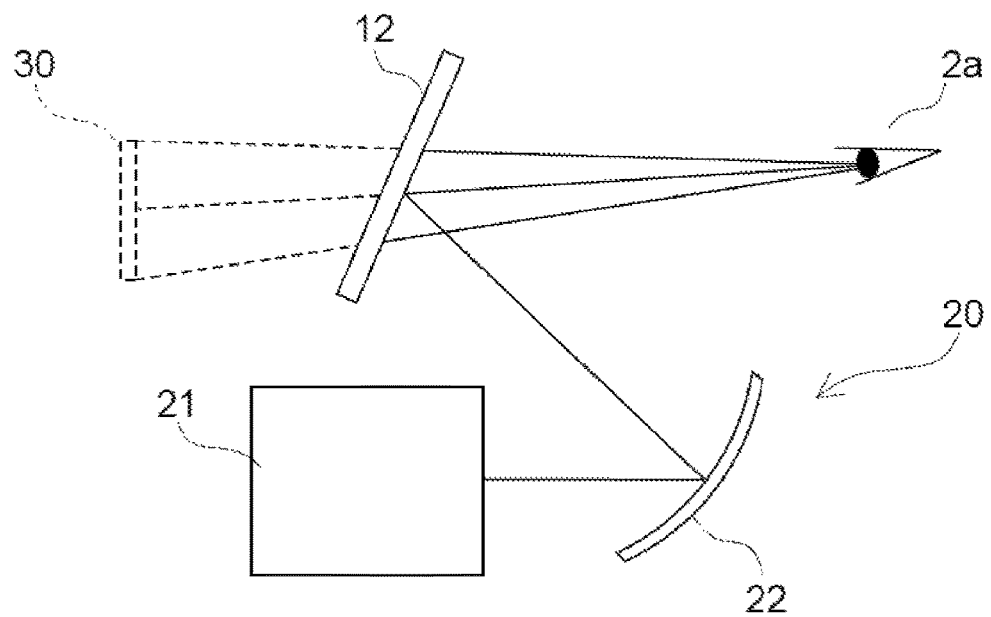
FIG. 1C is a view schematically illustrating a configuration of the image display device according to the first exemplary embodiment.

FIG. 1C is a view schematically illustrating a configuration of image display device 20.

Image display device 20 includes irradiation light generator 21 and mirror 22. Irradiation light generator 21 emits laser light modulated according to an image signal. Mirror 22 has a reflection surface of a curved surface shape, and reflects toward wind shield 12 the laser light emitted from irradiation light generator 21. Eyes 2a of vehicle driver 2 are irradiated with the laser light reflected from wind shield 12. An optical system of irradiation light generator 21 and mirror 22 are designed to display image 30 that is a virtual image, in a predetermined size ahead of wind shield 12.

FIG. 2 is a view illustrating a configuration of irradiation light generator 21 of image display device 20 and a configuration of a circuit used for irradiation light generator 21.

Irradiation light generator 21 includes light source 101, collimator lenses 102a to 102c, mirror 103, dichroic mirrors 104, 105, scanner 106, correction lens 107, movable screen 301, fixed screen 302 and driving unit 300.

Light source 101 includes three laser light sources 101a to 101c. Laser light sources 101a to 101c emit laser light of a red color wavelength range, laser light of a green color wavelength range and laser light of a blue color wavelength range, respectively. In the present exemplary embodiment, light source 101 includes three laser light sources 101a to 101c in order to display a color image as image 30. When an image of a single color is displayed as image 30, light source 101 may include only one laser light source corresponding to the color of the image. Laser light sources 101a to 101c each include a semiconductor laser, for example.

Laser light emitted from laser light sources 101a to 101c is converted into substantially parallel light by collimator lenses 102a to 102c, respectively. At this time, the laser light emitted from each of laser light sources 101a to 101c is shaped in a circular beam shape by an aperture which is not illustrated. Note that instead of collimator lenses 102a to 102c, a shaping lens which shapes laser light in a circular beam shape and which converts the laser light into parallel light may be used. In this case, the aperture can be omitted.

Subsequently, optical axes of the laser light of the respective colors emitted from laser light sources 101a to 101c are matched by mirror 103 and two dichroic mirrors 104, 105. Mirror 103 substantially totally reflects red laser light that collimator lens 102a has transmitted. Dichroic mirror 104 reflects green laser light that collimator lens 102b has transmitted, and transmits the red laser light reflected by mirror 103. Dichroic mirror 105 reflects blue laser light that collimator lens 102c has transmitted, and transmits the red laser light and the green laser light having passed through dichroic mirror 104. Mirror 103 and two dichroic mirrors 104, 105 are disposed so as to match the optical axes of the laser light of respective colors emitted from laser light sources 101a to 101c.

Scanner 106 reflects the laser light of each color having passed through dichroic mirror 105. Scanner 106 includes an MEMS (micro electro mechanical system) mirror, for example, and is configured to rotate mirror 106a which the laser light of each color having passed through dichroic mirror 105 enters, about an axis parallel to a Y axis and an axis parallel to an X axis according to a drive signal. Mirror 106a is rotated in such a way, and consequently a laser light reflection direction changes in an intra-plane direction of an X-Z plane and in an intra-plane direction of a Y-Z plane. Consequently, movable screen 301 is scanned with the laser light of each color as described below.

Note that scanner 106 includes a biaxial drive MEMS mirror here, but scanner 106 may have other configurations. For example, scanner 106 may include a combination of a mirror which is driven to rotate about the axis parallel to the Y axis and a mirror which is driven to rotate about the axis parallel to the X axis.

Correction lens 107 is designed to cause the laser light of each color to travel in a Z axis positive direction regardless of an oscillation angle of the laser light by scanner 106. Movable screen 301 and fixed screen 302 each act such that movable screen 301 and fixed screen 302 are scanned with laser light to form images, and diffuse incident laser light to an area around the position of eyes 2a of vehicle driver 2 (eyebox area).

Driving unit 300 reciprocally moves movable screen 301 in a direction (Z axis direction) parallel to a traveling direction of laser light. A configuration of driving unit 300 will be described below with reference to FIGS. 3 to 13. Driving unit 300 does not move fixed screen 302. Fixed screen 302 is fixed at a predetermined position on driving unit 300. Disposition of fixed screen 302 will be described below with reference to FIGS. 10 and 11.

Image processing circuit 201 includes an arithmetic processing unit such as a CPU (Central Processing Unit) and memory, and processes an input image signal to control laser drive circuit 202, mirror drive circuit 203 and screen drive circuit 204. Laser drive circuit 202 changes emission intensity of laser light sources 101a to 101c according to a control signal from image processing circuit 201. Mirror drive circuit 203 drives mirror 106a of scanner 106 according to a control signal from image processing circuit 201. Screen drive circuit 204 drives movable screen 301 according to a control signal from image processing circuit 201. Control performed by image processing circuit 201 during an image display operation will be described below with reference to FIG. 15B.

Figure 3:
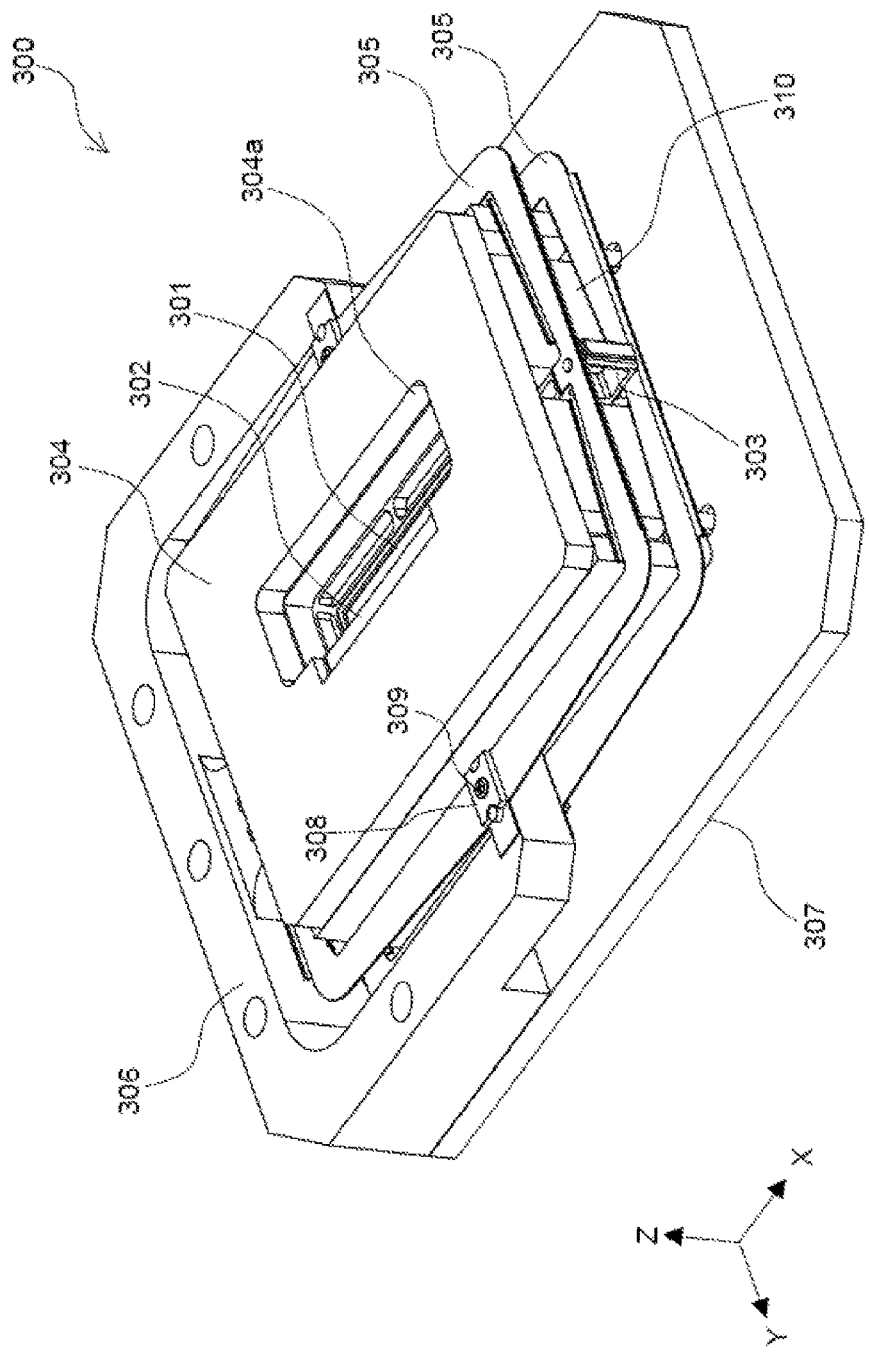
FIG. 3 is a perspective view illustrating a configuration of a driving unit according to the first exemplary embodiment.

FIG. 3 is a perspective view illustrating the configuration of driving unit 300. Note that the configuration of driving unit 300 will be described below with directions defined by X, Y and Z axes and with a side close to a center of driving unit 300 defined as an inside and a side far from the center of driving unit 300 defined as an outside.

Driving unit 300 includes holder 303, cover 304, two suspensions 305, support member 306, base 307, washer 308, screw 309 and magnetic circuit 310. Movable screen 301 is held by holder 303, and fixed screen 302 is held by cover 304. Opening 304a is formed in cover 304, and movable screen 301 is exposed through opening 304a. Fixed screen 302 is installed on a portion at a Y axis positive side of opening 304a.

Holder 303 is supported movably in the Z axis direction by suspensions 305. Support member 306 is installed on base 307, and suspensions 305 are fixed to support member 306 by washer 308 and screw 309. Further, magnetic circuit 310 is installed on base 307. A magnetic field is applied from magnetic circuit 310 to a coil (not illustrated) held by holder 303. A current is applied to the coil, and consequently holder 303 is driven in the Z axis direction.

Figure 4:
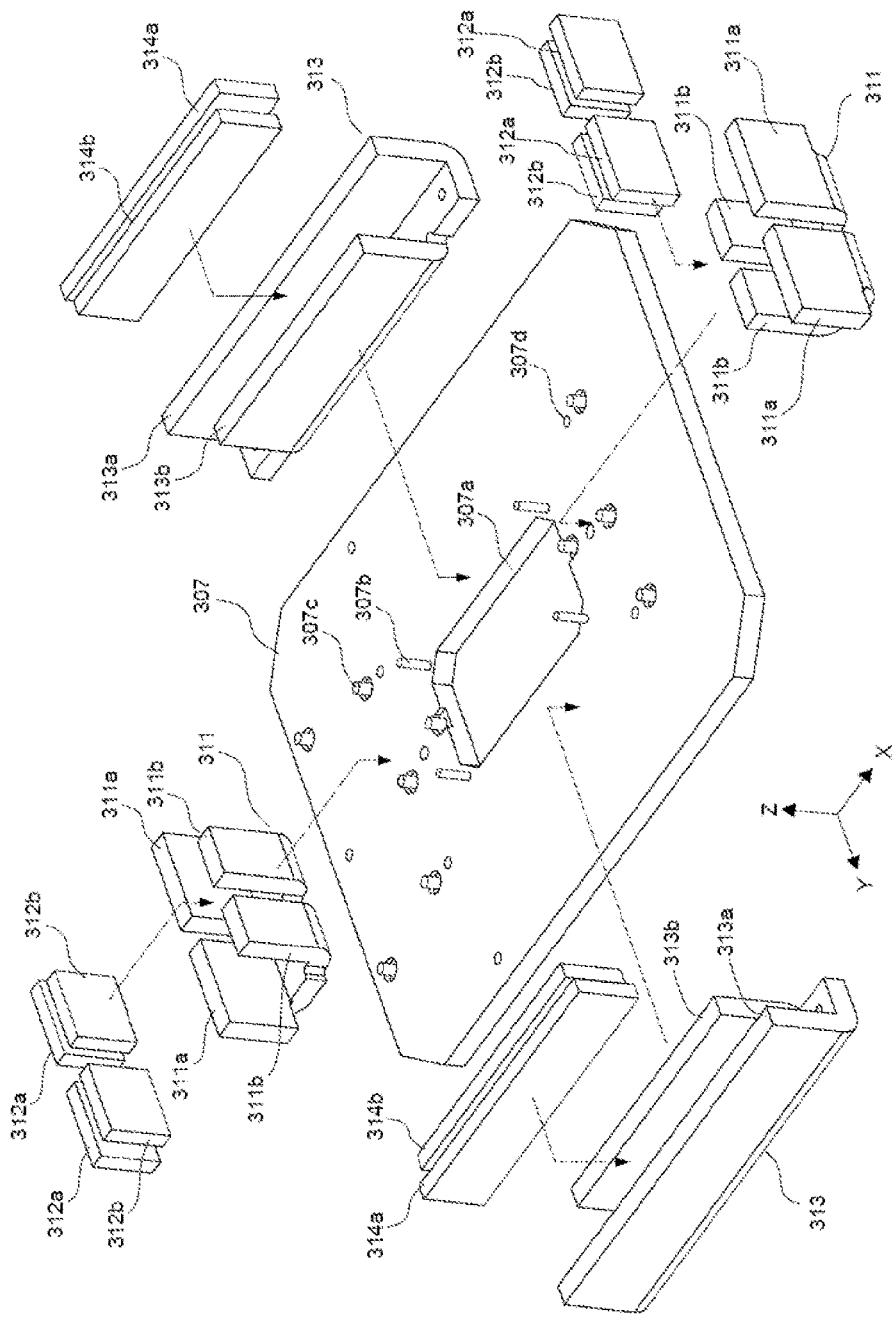
FIG. 4 is an exploded perspective view illustrating a configuration of a magnetic circuit according to the first exemplary embodiment.

FIG. 4 is an exploded perspective view illustrating a configuration of magnetic circuit 310.

Magnetic circuit 310 includes first yoke 311, first magnets 312a, 312b, second yoke 313 and second magnets 314a, 314b.

Base 307 has an outline having a substantially rectangular shape in a plan view. Base 307 is made of a magnetic material. Opening 307a, four protrusions 307b, eight bosses 307c and nine screw holes 307d are formed in base 307. Opening 307a is an opening through which laser light from correction lens 107 illustrated in FIG. 2 passes in the Z axis positive direction. Protrusions 307b and bosses 307c are each a protrusion and a boss for positioning each member installed on base 307 to a predetermined position. Screw holes 307d are each a screw hole for fixing each member installed on base 307 by a screw.

First yoke 311 includes wall 311a (example of "first outside wall portion") at an outside and wall 311b (example of "first inside wall portion") at an inside. A pair of first magnets 312a, 312b are attached respectively to inside surfaces of walls 311a, 311b facing each other. Moreover, second yoke 313 includes wall 313a (example of "second outside wall portion") at an outside and wall 313b (example of "second inside wall portion") at an inside. A pair of second magnets 314a, 314b are attached respectively to inside surfaces of walls 313a, 313b facing each other.

Figure 5A:
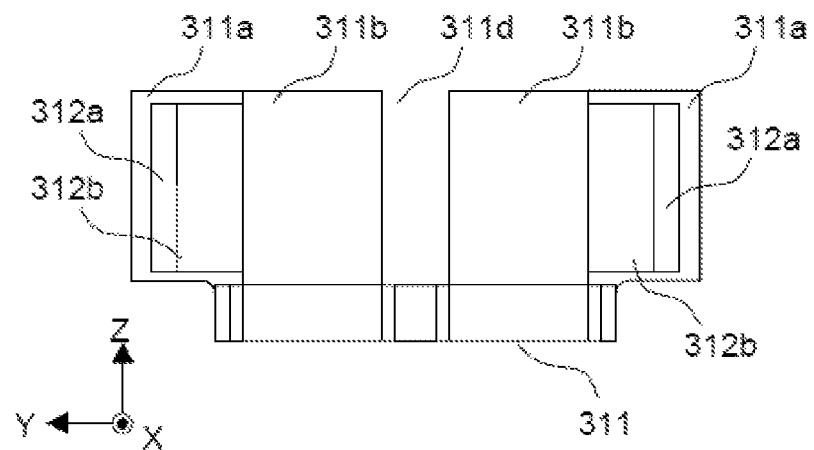
FIGS. 5A to 5C are a front view, a side view and a plan view illustrating configurations of a first yoke and a first magnet according to the first exemplary embodiment, respectively.
Figure 5B:
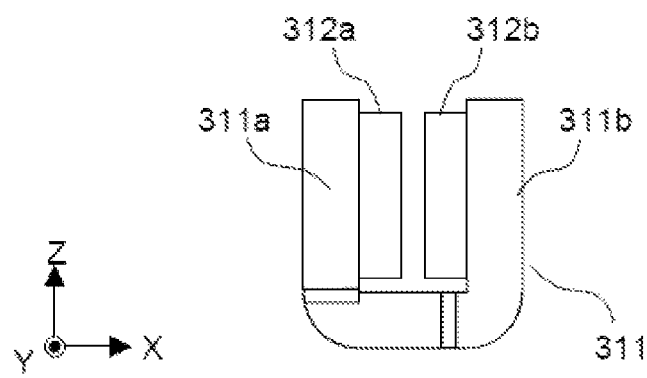
Figure 5C:
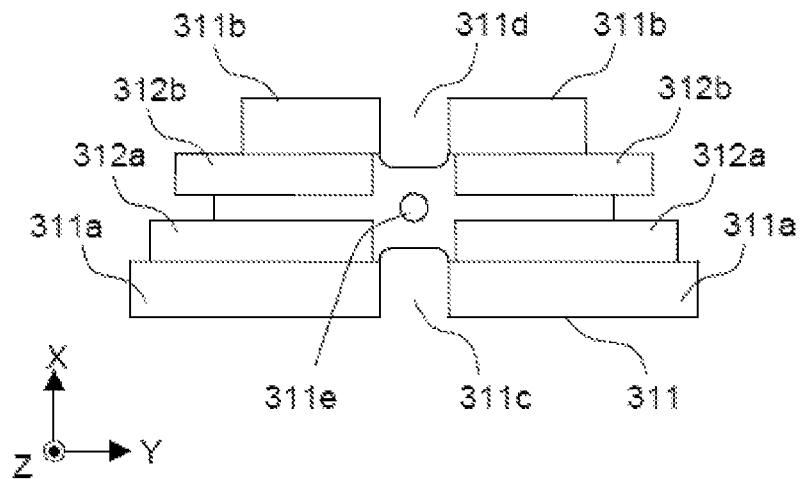
Figure 5D:
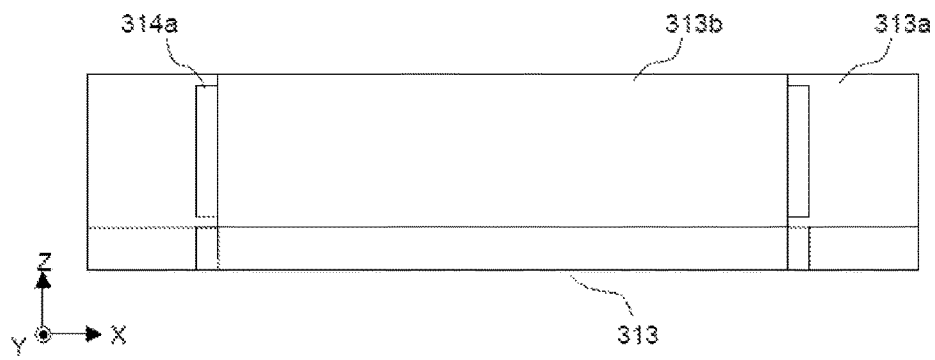
FIGS. 5D to 5F are a front view, a side view and a plan view illustrating configurations of a second yoke and a second magnet according to the first exemplary embodiment, respectively.
Figure 5E:
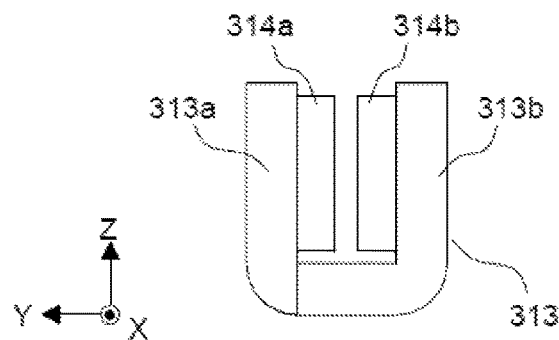
Figure 5F:
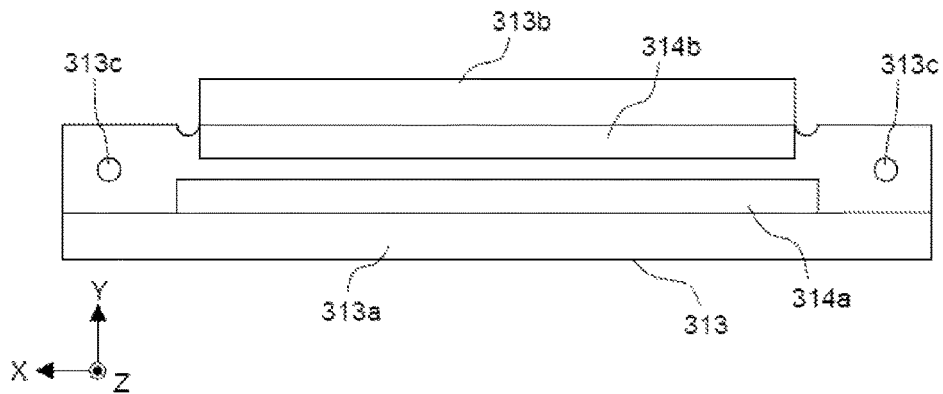

FIGS. 5A to 5C are a front view, a side view and a plan view illustrating configurations of first yoke 311 and first magnets 312a, 312b, respectively. Moreover, FIGS. 5D to 5F are a front view, a side view and a plan view illustrating configurations of second yoke 313 and second magnets 314a, 314b, respectively.

Note that FIGS. 5A to 5C illustrate a combination of first yoke 311 and first magnets 312a, 312b at an X axis positive side in FIG. 4 together with the X, Y and Z axes. Moreover, FIGS. 5D to 5F illustrate a combination of second yoke 313 and second magnets 314a, 314b at a Y axis negative side in FIG. 4 together with the X, Y and Z axes. The combination of first yoke 311 and first magnets 312a, 312b at an X axis negative side in FIG. 4 and the combination of second yoke 313 and second magnets 314a, 314b at the Y axis positive side also have the same configurations as the configurations in FIGS. 5A to 5C and the configurations in FIGS. 5D to 5F.

With reference to FIGS. 5A to 5C, first yoke 311 has substantially a U shape in a side view in a Y axis direction. That is, a cross section of first yoke 311 cut at a center position in the Y axis direction has substantially a U shape. First yoke 311 is formed by, for example, bending portions of an expanded flat plate into walls 311a, 311b. First yoke 311 has a shape symmetrical in the Y axis direction.

As illustrated in FIG. 5C, wall 311a is separated in a width direction (Y axis direction), and first magnet 312a is installed on each of separated walls 311a. Similarly, wall 311b is also separated in the width direction (Y axis direction), and first magnet 312b is installed on each of separated walls 311b. Hence, there is gap 311c between two walls 311a, and there is also gap 311d between two walls 311b.

An outline of each of first magnets 312a, 312b as seen in an X axis direction has a square shape. First magnet 312a is wider in the Y axis direction than first magnet 312b. A width in the Z axis direction of first magnet 312a is the same as a width in the Z axis direction of first magnet 312b. As illustrated in FIG. 5C, a width in the Y axis direction of first magnet 312a is narrower than a width in the Y axis direction of wall 311a, and a width in the Y axis direction of first magnet 312b is wider than a width in the Y axis direction of wall 311b. Hole 311e for screwing is formed in a bottom of first yoke 311.

With reference to FIGS. 5D to 5F, second yoke 313 has substantially a U shape in a side view in the X axis direction. That is, a cross section of second yoke 313 cut at a center position in the X axis direction has substantially a U shape. Second yoke 313 is formed by, for example, bending portions of an expanded flat plate into walls 313a, 313b. Second yoke 313 has a shape symmetrical in the X axis direction.

An outline of each of second magnets 314a, 314b as seen in the Y axis direction has a square shape. Second magnet 314a is wider in the X axis direction than second magnet 314b. A width in the Z axis direction of second magnet 314a is the same as a width in the Z axis direction of second magnet 314b. As illustrated in FIG. 5F, a width in the X axis direction of second magnet 314a is narrower than a width in the X axis direction of wall 313a, and a width in the X axis direction of second magnet 314b is the same as a width in the X axis direction of wall 313b. Two holes 313c for screwing are formed in a bottom of second yoke 313.

Figure 6:
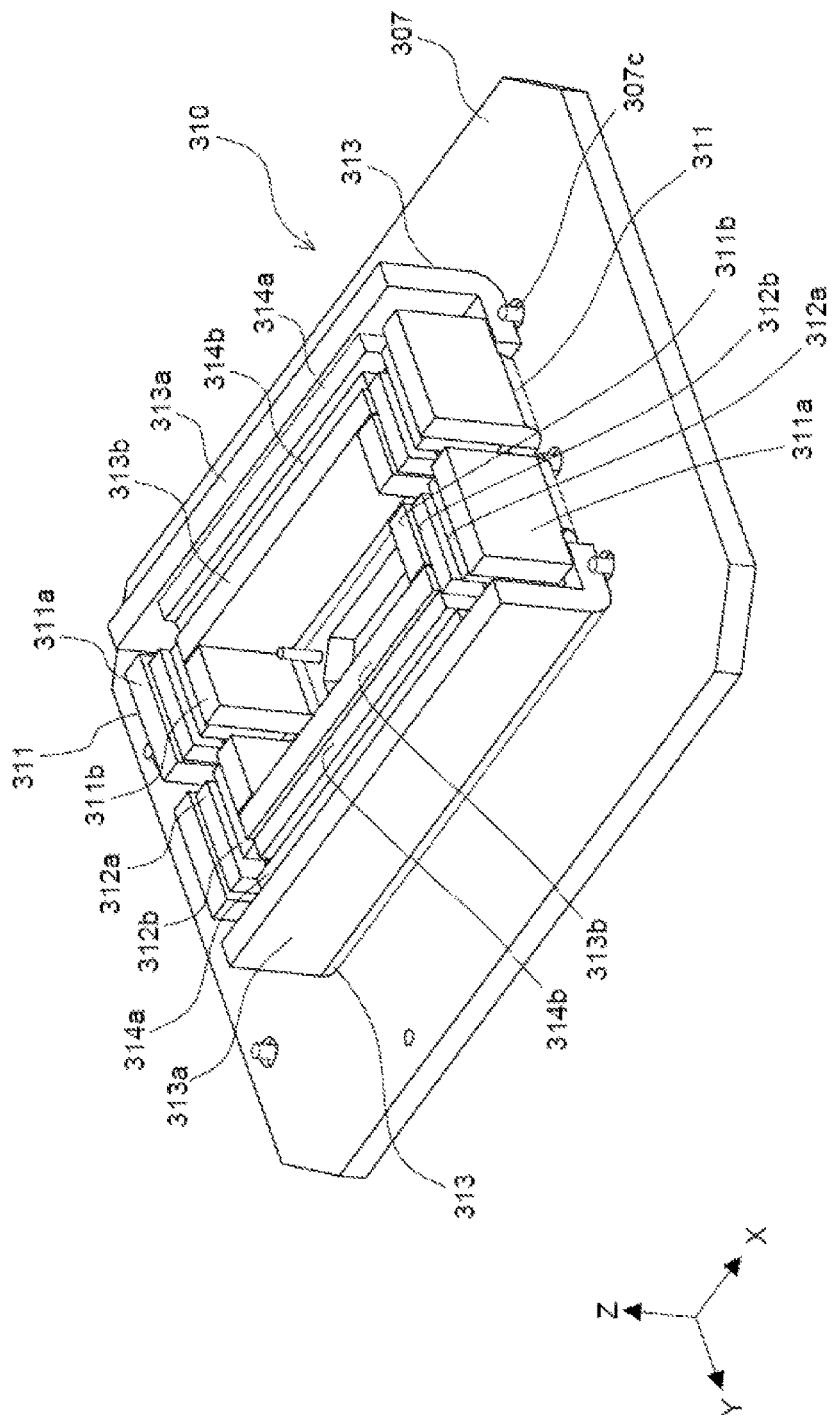
FIG. 6 is a perspective view illustrating a configuration of the assembled magnetic circuit according to the first exemplary embodiment.

Again with reference to FIG. 4, in a state where first magnets 312a, 312b are installed in such a way, first yoke 311 at the X axis positive side is installed at the X axis positive side of opening 307a of base 307, and first yoke 311 at the X axis negative side is installed at the X axis negative side of opening 307a of base 307. Moreover, in a state where second magnets 314a, 314b are installed, second yoke 313 at the Y axis positive side is installed at the Y axis positive side of opening 307a of base 307, and second yoke 313 at the Y axis negative side is installed at the Y axis negative side of opening 307a of base 307. Thus, as illustrated in FIG. 6, magnetic circuit 310 is installed on base 307.

For example, magnetic poles of each of first magnets 312a, 312b are adjusted such that a magnetic field travels from first magnet 312b at the inside to first magnet 312a at the outside. Moreover, magnetic poles of each of second magnets 314a, 314b are adjusted such that a magnetic field travels from second magnet 314b at the inside to second magnet 314a at the outside.

Figure 7A:
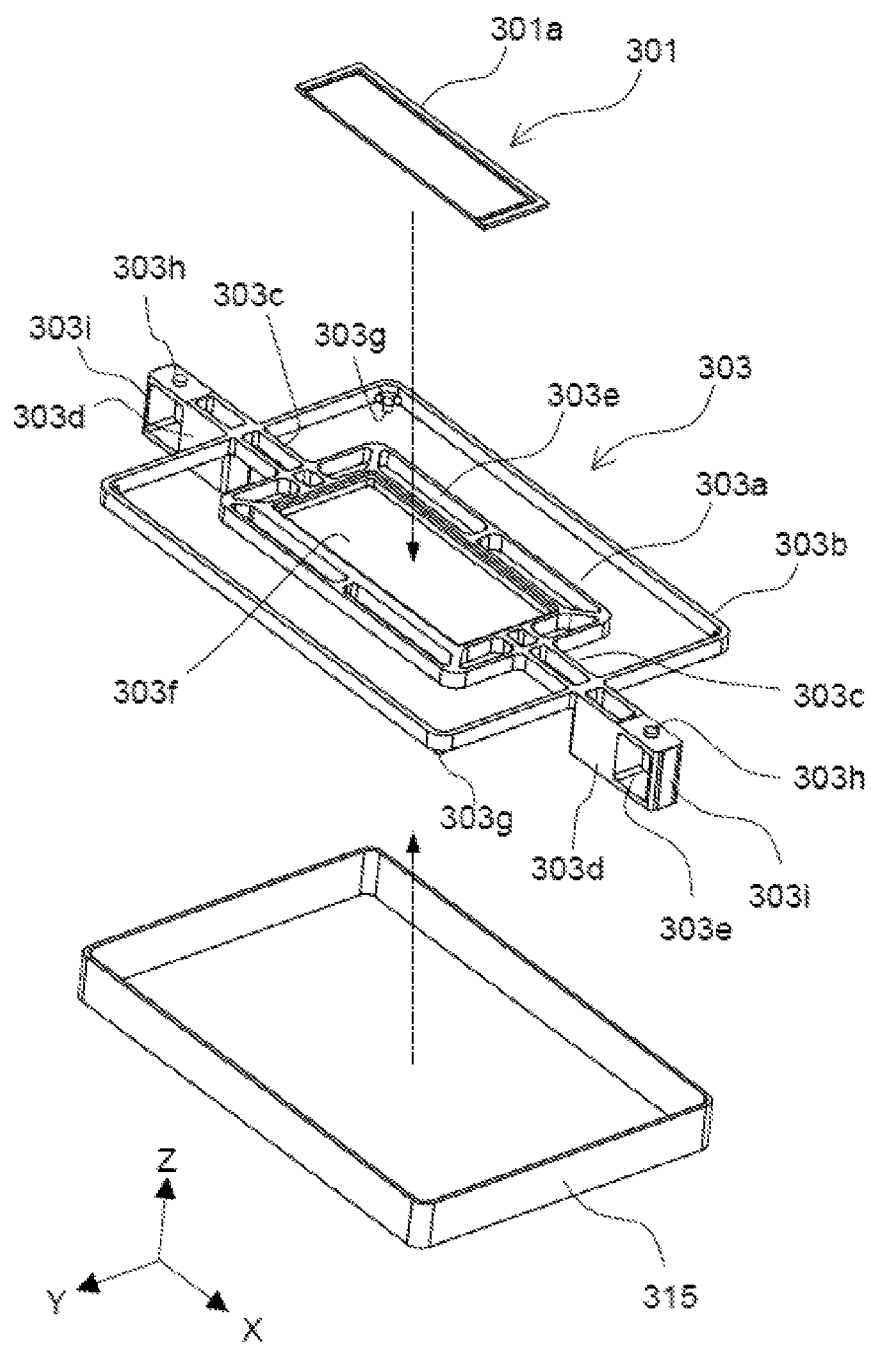
FIG. 7A is a perspective view illustrating an assembly process of a holder, a movable screen and a coil according to the first exemplary embodiment.

FIG. 7A is a perspective view illustrating an assembly process of holder 303, movable screen 301 and coil 315.

Holder 303 is integrally formed with a material having low specific gravity such as a resin. Holder 303 has a shape symmetrical in the X axis direction, and has a shape symmetrical in the Y axis direction. Holder 303 includes inner frame 303a which has a substantially rectangular shape and on which movable screen 301 is installed, and outer frame 303b which has a substantially rectangular shape and on which coil 315 is installed. Inner frame 303a is connected to outer frame 303b by bridge 303c. Bridge 303c connects between a center position in the Y axis direction of inner frame 303a and a center position in the Y axis direction of outer frame 303b. Further, each of two supported portions 303d is formed at the center position in the Y axis direction of outer frame 303b so as to extend in the X axis direction.

In order to reduce a weight while mechanical strength is maintained, various through-holes 303e are formed in inner frame 303a and supported portion 303d of holder 303. Moreover, inner frame 303a is provided with opening 303f through which laser light passes. Opening 303f has an outline having a substantially rectangular shape in a plan view. A step is provided around opening 303f. End rim 301a of movable screen 301 is fitted to this step, and movable screen 301 is attached to inner frame 303a of holder 303. Movable screen 301 is fixed to inner frame 303a by an adhesive.

Moreover, protrusion 303g having a columnar shape and protruding toward a Z axis negative side is formed at each of four corner portions of outer frame 303b. An inner side of coil 315 is fitted to protrusion 303g, and coil 315 is attached to outer frame 303b of holder 303. Coil 315 is fixed to outer frame 303b by an adhesive. Coil 315 is configured to be wound around an axis parallel to the Z axis in one direction. Protrusions 303h are formed respectively at positions arranged in the Z axis direction in an upper surface and a lower surface of supported portion 303d. Further, scale 303i is installed on a side surface at the X axis positive side or the X axis negative side of supported portion 303d.

Figure 7B:
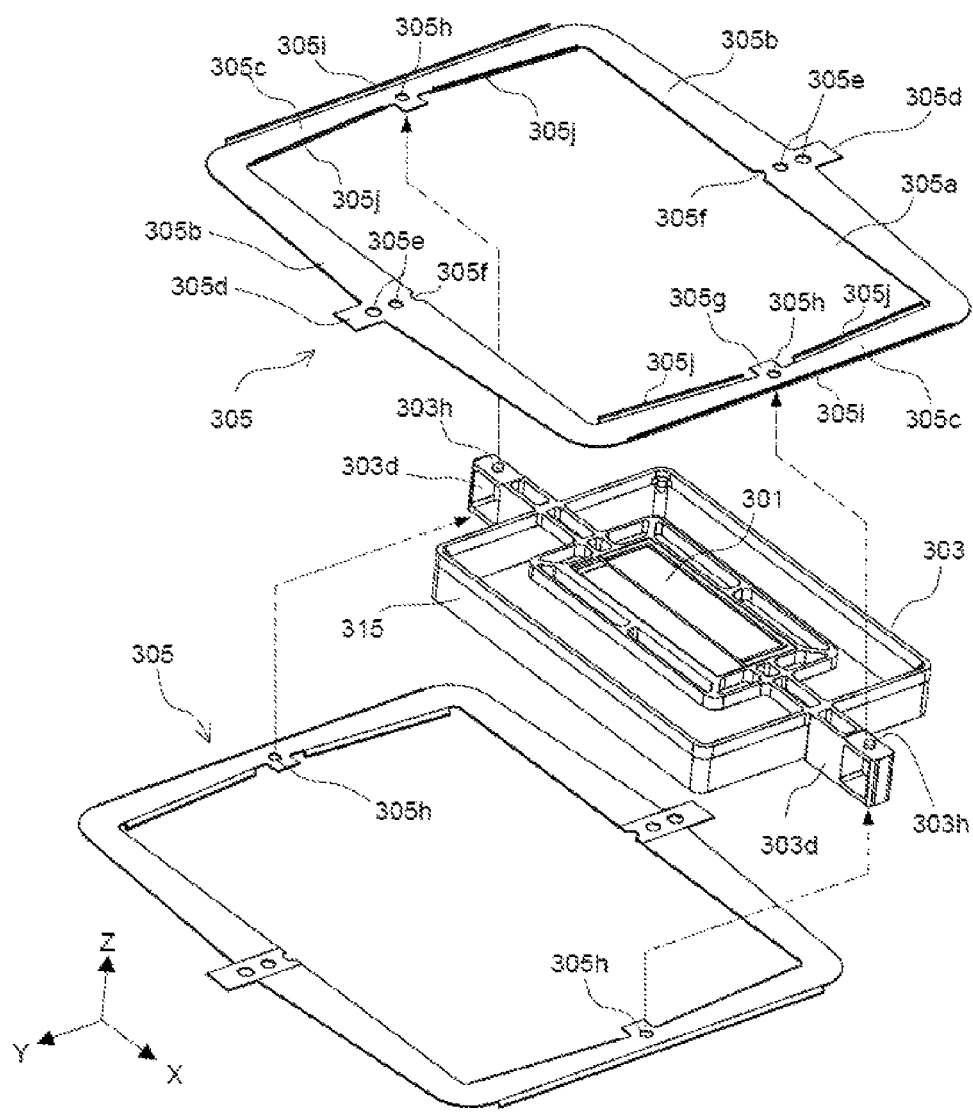
FIG. 7B is a perspective view illustrating an assembly process of the holder and a suspension according to the first exemplary embodiment.

FIG. 7B is a perspective view illustrating an assembly process of holder 303 and suspensions 305. Upper suspension 305 and lower suspension 305 in FIG. 7B have the same structure. Lower suspension 305 and upper suspension 305 have a relationship in which a top side and a back side are reversed. Here, the structure of upper suspension 305 will be described for convenience.

Suspension 305 is integrally formed with a flexible metal material. Suspension 305 has a ring shape of a thin plate shape. The shape of suspension 305 is symmetrical in the X axis direction and also symmetrical in the Y axis direction. Suspension 305 includes opening 305a, a pair of plate springs 305b extending in the X axis direction, and a pair of beams 305c extending in the Y axis direction.

Guard 305d protruding in the Y axis direction is formed at a center position in the X axis direction of each plate spring 305b, that is, at a position of an axis of symmetry in the X axis direction. Moreover, two holes 305e and cutaway 305f of an arc shape are each formed at the center position in the X axis direction of plate spring 305b. A width in the Y axis direction of plate spring 305b is gradually narrowed from the center position in the X axis direction toward both ends in the X axis direction. Consequently, a weight of a movable end of plate spring 305b is reduced while a spring constant of plate spring 305b is maintained.

Guard 305g protruding in the X axis direction is formed at a center position in the Y axis direction of each beam 305c, that is, at a position of an axis of symmetry in the Y axis direction. Moreover, hole 305h is formed at the center position in the Y axis direction of beam 305c. A width in the X axis direction of beam 305c is gradually narrowed from both ends in the Y axis direction toward the center position in the Y axis direction. Consequently, a weight of beam 305c is reduced. Further, ribs 305i, 305j standing in the Z axis positive direction are formed respectively along an end rim at an outside and an end rim at an inside of beam 305c. Warping in the Z axis direction of beam 305c is suppressed by ribs 305i, 305j. The warping is suppressed, and consequently it is possible to suppress vibration at an unintended frequency, and to reduce amplitude even when the unintended vibration occurs.

Upper suspension 305 is attached to holder 303 by fitting protrusion 303h formed in the upper surface of supported portion 303d of holder 303 to hole 305h of suspension 305. Similarly, lower suspension 305 is attached to holder 303 by fitting protrusion 303h formed in the lower surface of supported portion 303d of holder 303 to hole 305h of suspension 305. Upper and lower suspensions 305 are each stuck to supported portion 303d of holder 303 by an adhesive.

FIG. 8 is a perspective view illustrating an assembly process of suspensions 305 and support member 306.

Support member 306 is formed with a non-magnetic material such as a resin. Support member 306 has a shape symmetrical in the Y axis direction. The shape of support member 306 is a C shape in a plan view. Arm 306a extending in the X axis direction and then bent in the Y axis direction is formed at each of both ends of support member 306. Protrusion 306b of a columnar shape, protrusion 306c of a semicircular shape and screw hole 306d are formed so as to be arranged in the Y axis direction in each of an upper surface and a lower surface of an end of arm 306a. Further, encoder 306e is installed at a center position in the Y axis direction in an inside surface of support member 306. Moreover, two holes for positioning support member 306 on base 307, and three holes 306f for screwing are formed in the upper surface of support member 306.

When upper suspension 305 is attached to support member 306, protrusions 306b, 306c in the upper surface of arm 306a are fitted to hole 305e at the outside and cutaway 305f of suspension 305, respectively. In this state, hole 305e at the inside of suspension 305 and screw hole 306d in the upper surface of arm 306a match each other. In this state, screw 309 is threaded in hole 305e at the inside of suspension 305 via washer 308, and is screwed in screw hole 306d. Consequently, upper suspension 305 is fixed to support member 306. Lower suspension 305 is also screwed to the lower surface of arm 306a in the same manner. Thus, two suspensions 305 are fixed to support member 306.

Thus, when two suspensions 305 are fixed to support member 306, encoder 306e of support member 306 faces scale 303i (see FIG. 7A) installed on the side surface of supported portion 303d at the X axis negative side of holder 303. Encoder 306e is an encoder for optically detecting movement in the Z axis direction of scale 303i. Positions in the Z axis direction of holder 303 and movable screen 301 are detected based on a detection signal from encoder 306e.

Figure 9:
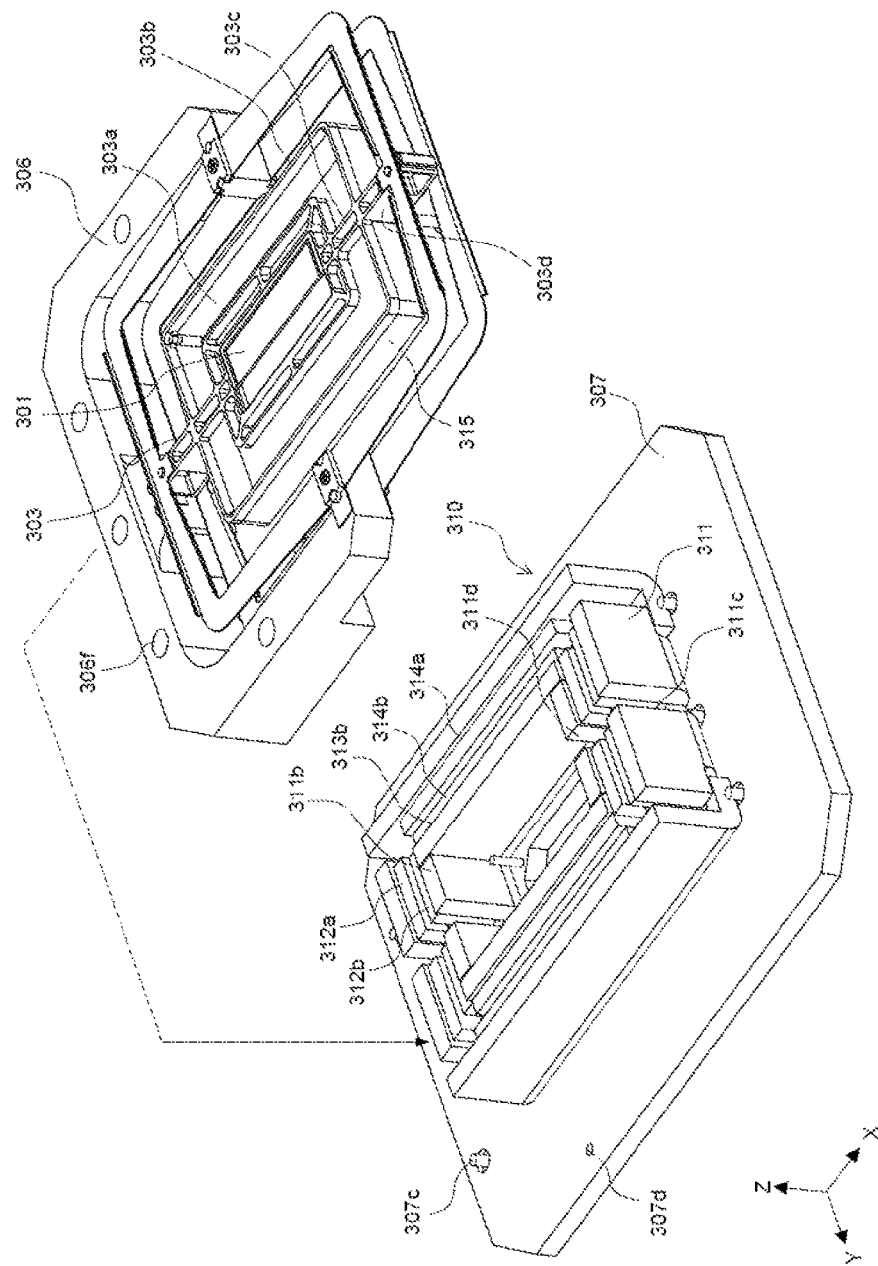
FIG. 9 is a perspective view illustrating an assembly process of the support member and a base according to the first exemplary embodiment.

FIG. 9 is a perspective view illustrating an assembly process of support member 306 and base 307.

Support member 306 is positioned on base 307 such that holes 306f match positions of screw holes 307d of base 307. At this time, coil 315 attached to outer frame 303b of holder 303 is inserted in a gap between first magnets 312a, 312b and in a gap between second magnets 314a, 314b. Moreover, bridge 303c is inserted in gap 311d of first yoke 311, and supported portion 303d is inserted in gap 311c of first yoke 311. Consequently, holder 303 and movable screen 301 are positioned at positions lower than an upper surface of magnetic circuit 310. In this state, screws are screwed in screw holes 307d of base 307 via holes 306f. Consequently, support member 306 is fixed to base 307.

Figure 10:
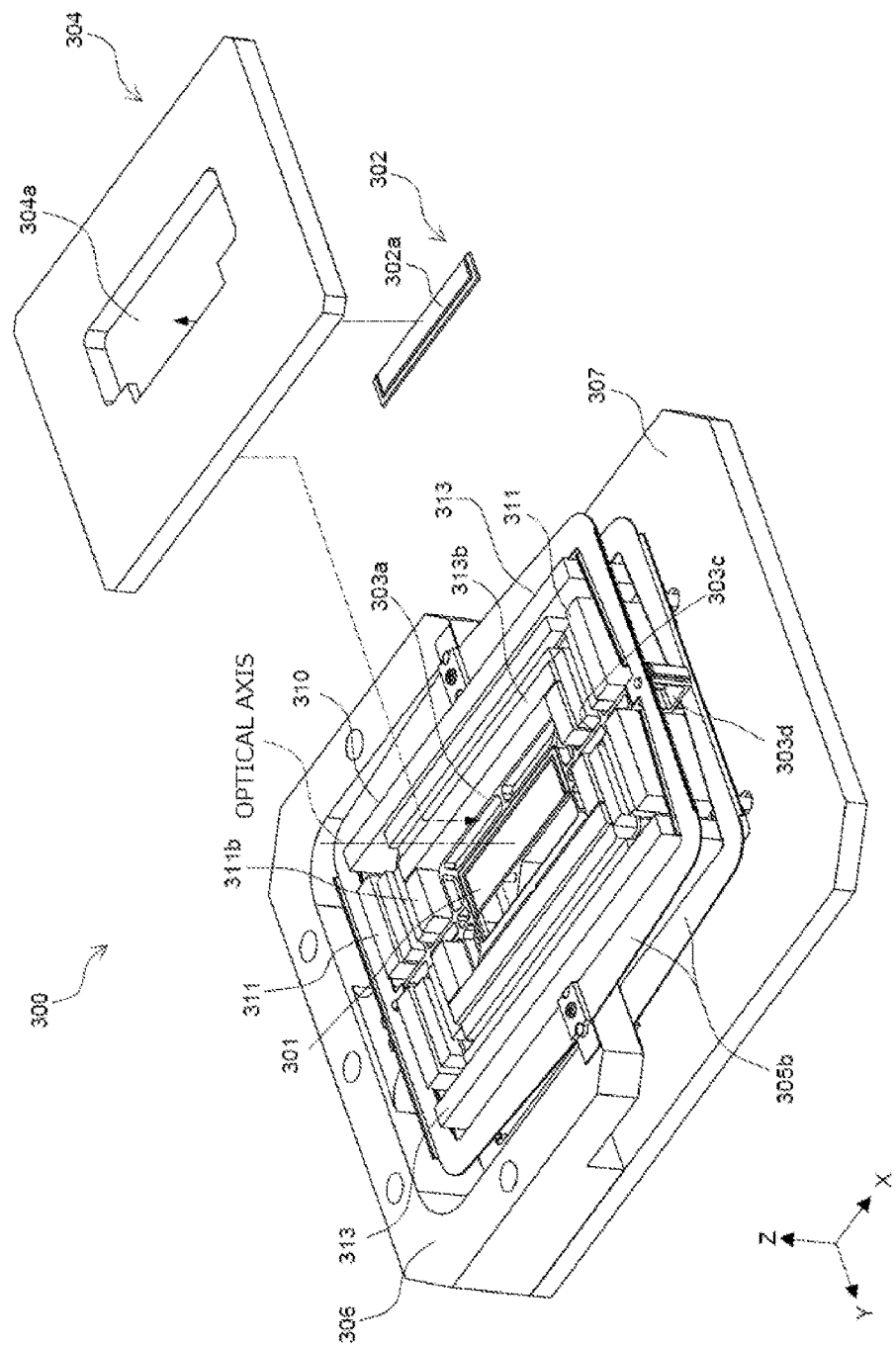
FIG. 10 is a perspective view illustrating an assembly process of a cover and a fixed screen according to the first exemplary embodiment.

FIG. 10 is a perspective view illustrating an assembly process of cover 304 and fixed screen 302.

Cover 304 includes a magnetic body. Cover 304 has a shape symmetrical in the X axis direction. Opening 304a through which laser light passes is formed in cover 304. A width in the X axis direction of a portion at the Y axis positive side of opening 304a is narrower than other portions of opening 304a. Fixed screen 302 is attached to the portion at the Y axis positive side of opening 304a by fitting end rim 302a to the portion at the Y axis positive side of opening 304a. Fixed screen 302 is fixed to a lower surface of cover 304 by an adhesive.

Cover 304 overlaps the upper surface of magnetic circuit 310 in a state where fixed screen 302 is attached in such a way. Since cover 304 includes a magnetic body, cover 304 adheres by magnetic force of magnetic circuit 310 to upper surfaces of first yoke 311 and second yoke 313 incorporated in magnetic circuit 310. Consequently, attachment of cover 304 is completed, and the configuration of driving unit 300 illustrated in FIG. 3 is obtained.

Figure 11:
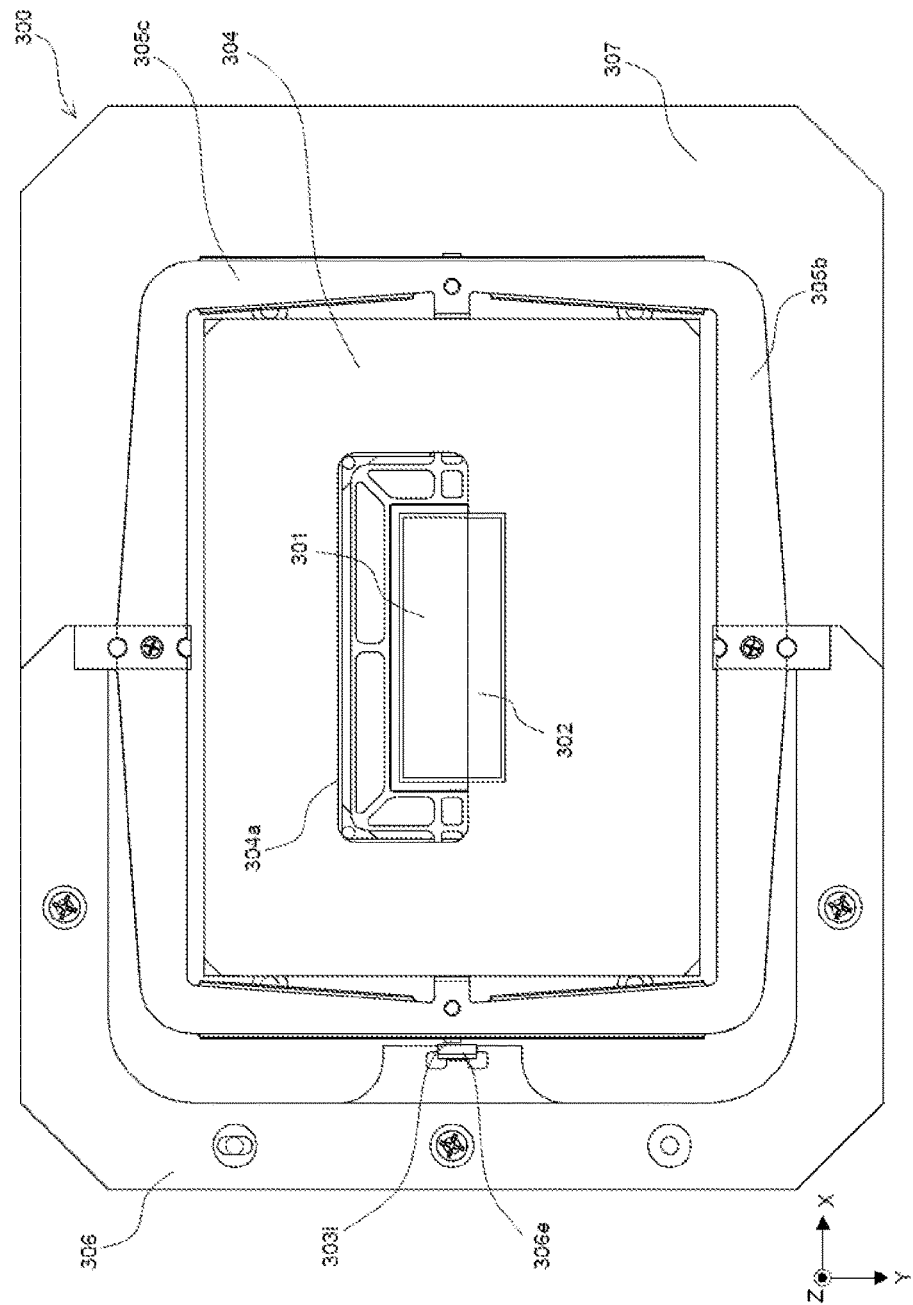
FIG. 11 is a plan view illustrating the configuration of the driving unit according to the first exemplary embodiment.
Figure 12:
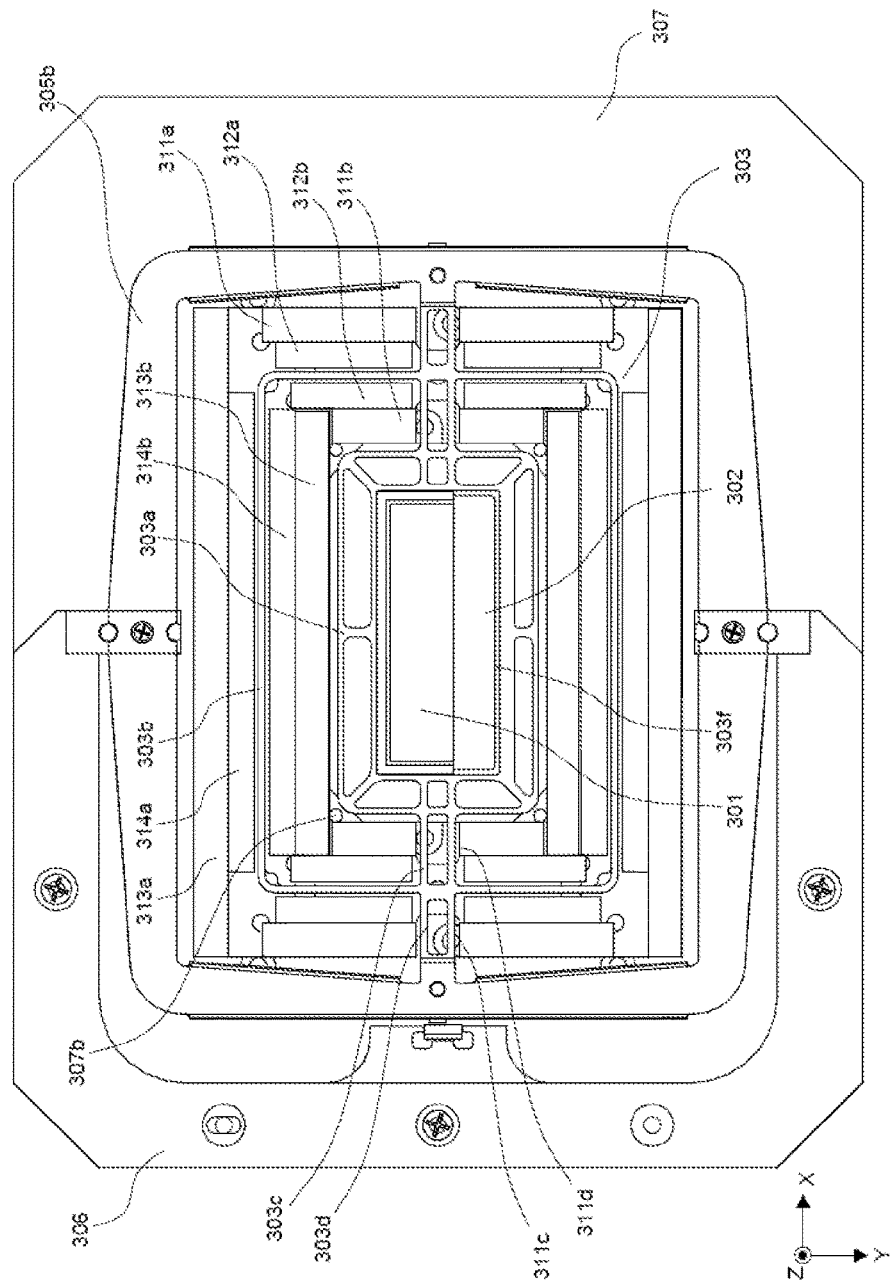
FIG. 12 is a transparent plan view illustrating the configuration of the driving unit seen through the cover according to the first exemplary embodiment.

FIG. 11 is a plan view illustrating the configuration of driving unit 300. FIG. 12 is a transparent plan view illustrating the configuration of driving unit 300 seen through cover 304.

As illustrated in FIGS. 11 and 12, movable screen 301 and fixed screen 302 are disposed so as to be arranged in the Y axis direction. Movable screen 301 covers approximately ⅔ of an area of opening 303f of inner frame 303a, and a remaining area of approximately ⅓ is an opened area. Fixed screen 302 covers the opened area of opening 303f. Movable screen 301 is scanned with incident laser light from the Z axis negative side, and then fixed screen 302 is scanned with the incident laser light from the Z axis negative side.

Figure 13:
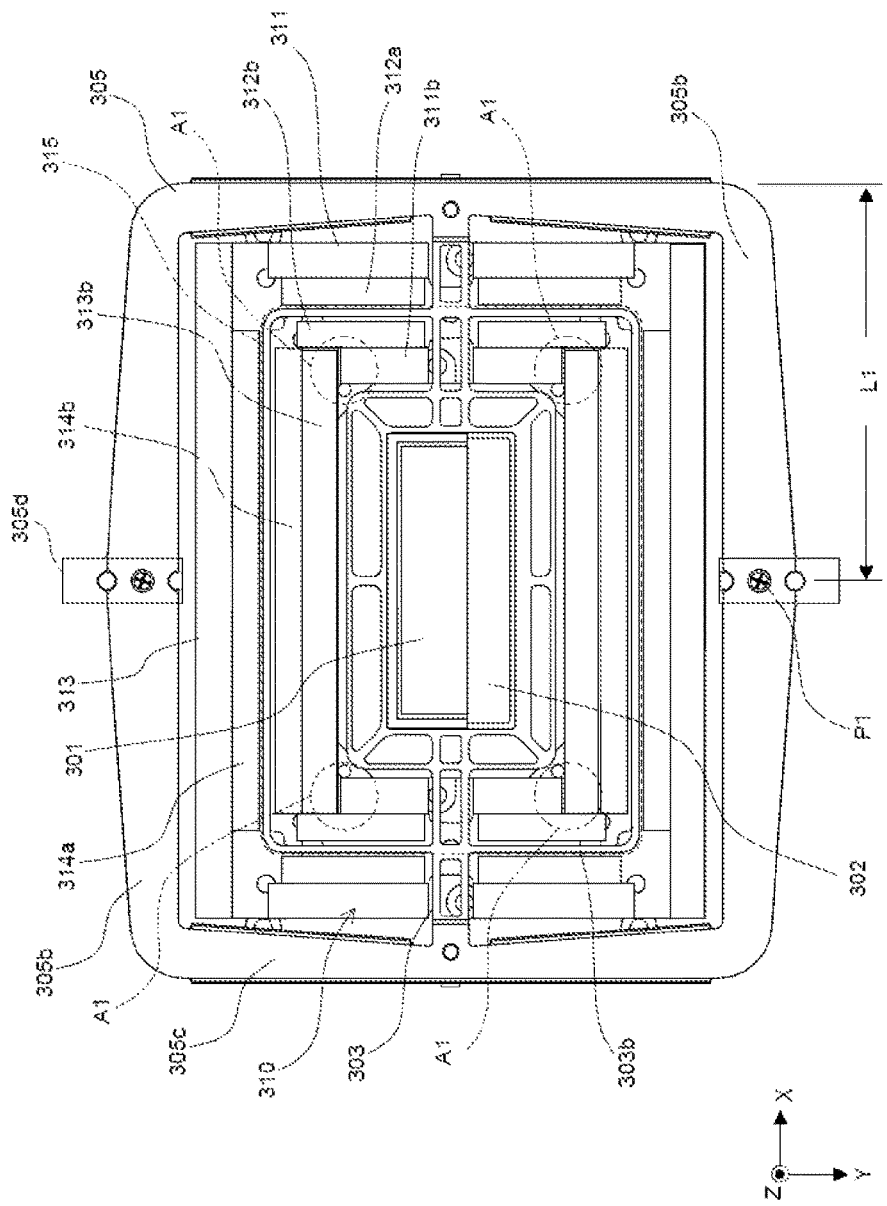
FIG. 13 is a plan view illustrating a portion of the magnetic circuit and the suspension according to the first exemplary embodiment.

FIG. 13 is a plan view illustrating a portion of magnetic circuit 310 and suspensions 305. FIG. 13 illustrates coil 315 by a broken line for convenience, but coil 315 is actually disposed at the Z axis negative side of outer frame 303b.

As indicated by each broken line round area A1, first yoke 311 and second yoke 313 are disposed such that a side end surface of wall 311b at the inside of first yoke 311 and an outside surface of wall 313b at the inside of second yoke 313 overlap each other. Moreover, at this overlapping portion, first magnet 312b installed on wall 311b at the inside of first yoke 311 extends to a side end surface of wall 313b at the inside of second yoke 313. According to this configuration, it is possible to more efficiently apply a magnetic field to coil 315.

That is, wall 311b and wall 313b overlap each other in such a way, and consequently it is possible to extend wall 313b at the inside of second yoke 313 near a corner of coil 315, and to extend first magnet 312b near a corner of coil 315. Consequently, it is possible to apply a magnetic field near a corner of coil 315. Further, in the present exemplary embodiment, first magnet 312a extends near a corner of coil 315, and second magnet 314a extends near a corner of coil 315. Consequently, it is possible to apply a magnetic field near a corner of coil 315.

Thus, a magnetic field is efficiently applied to coil 315, and consequently driving force (Lorentz force) produced on coil 315 is enhanced. Consequently, it is possible to quickly move holder 303 and movable screen 301.

Moreover, as illustrated in FIG. 13, each plate spring 305b is disposed substantially parallel to a long side of movable screen 301, is fixed at a center position in a longitudinal direction to be fixed to a base 307 side, and has both ends connected to holder 303 via beams 305c. Thus, plate spring 305b is disposed substantially parallel to the long side of movable screen 301, and accordingly it is possible to secure long distance L1 from fixed position P1 of plate spring 305b to each of both the ends while driving unit 300 is compactly housed. Consequently, a stress of plate spring 305b produced during driving of holder 303 reduces, and a load during driving of holder 303 reduces. Consequently, it is possible to prevent deformation of plate spring 305b and to enhance durability.

Figure 14:
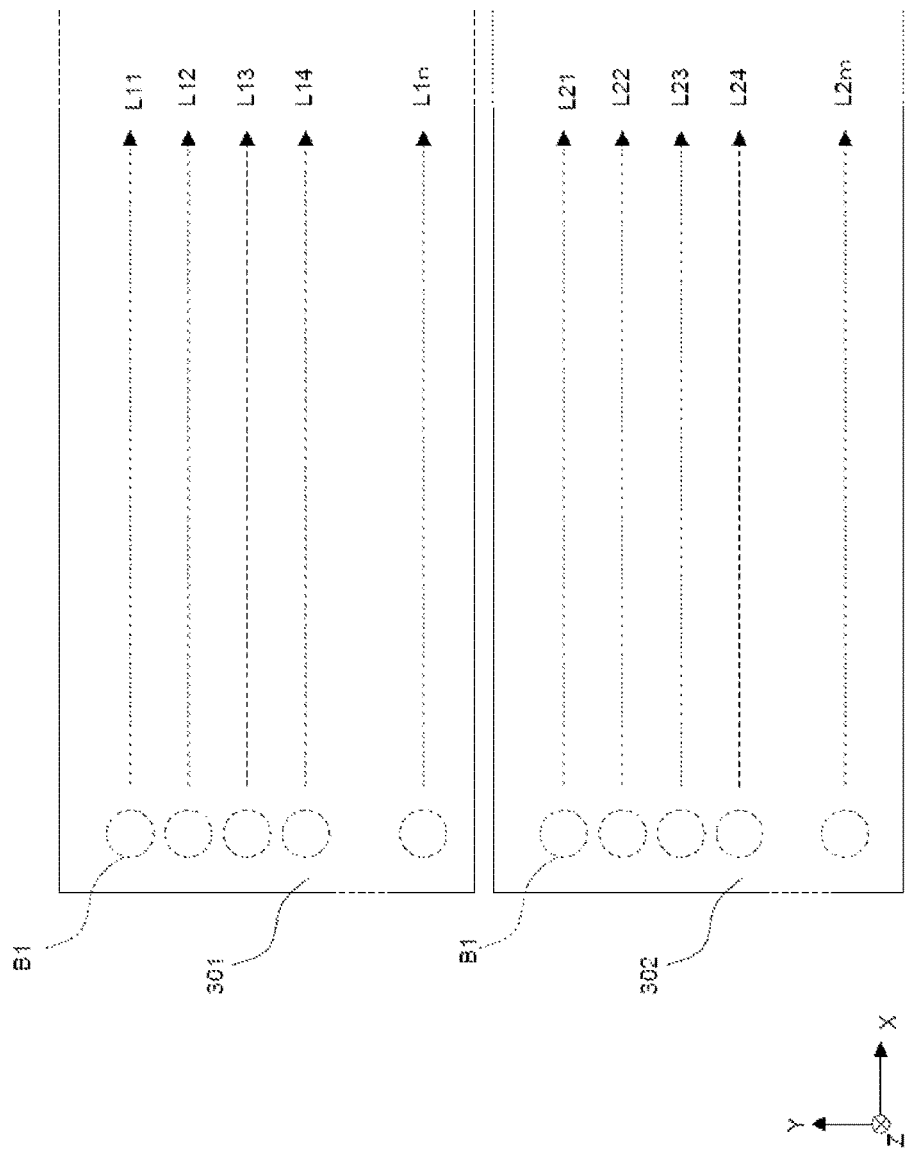
FIG. 14 is a view schematically illustrating a laser light scanning method for a movable screen and a fixed screen.

FIG. 14 is a view schematically illustrating a laser light scanning method for movable screen 301 and fixed screen 302.

Movable screen 301 is scanned in an X axis positive direction with beam B1 formed by superimposing the laser light of the respective colors. Scan lines L11 to L1n along which beam B1 passes are set in advance at a certain interval in the Y axis direction on movable screen 301. Start positions and end positions of scan lines L11 to L1n match in the X axis direction. Hence, an area surrounding scan lines L11 to L1n is rectangular.

Thus, movable screen 301 is scanned, and then fixed screen 302 disposed at the Y axis negative side of movable screen 301 is scanned in the X axis positive direction with beam B1. Scan lines L21 to L2m along which beam B1 passes are also set in advance at a certain interval in the Y axis direction on fixed screen 302. Start positions and end positions of scan lines L21 to L2m match in the X axis direction. Hence, an area surrounding scan lines L21 to L2m is rectangular.

Scanning with beam B1 formed by modulating laser light of each color according to an image signal is performed along scan lines L11 to L1n and scans lines L21 to L2m at a high frequency, and consequently an image is composed. The image composed in such a way is projected on the area around the position of eyes 2a of vehicle driver 2 (eyebox) via movable screen 301 and fixed screen 302, and via mirror 22 and wind shield 12 (see FIG. 1C). Consequently, vehicle driver 2 visually recognizes image 30 as a virtual image in a space ahead of wind shield 12.

Figure 15A:
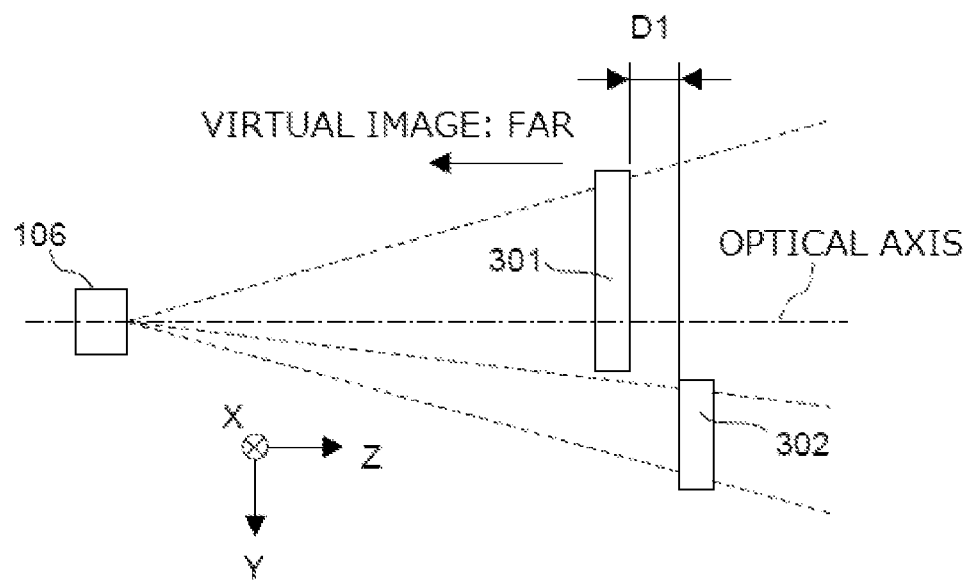
FIGS. 15A, 15B are a view schematically illustrating a movement range of the movable screen according to the first exemplary embodiment, and a graph illustrating a drive example of the movable screen, respectively.
Figure 15B:
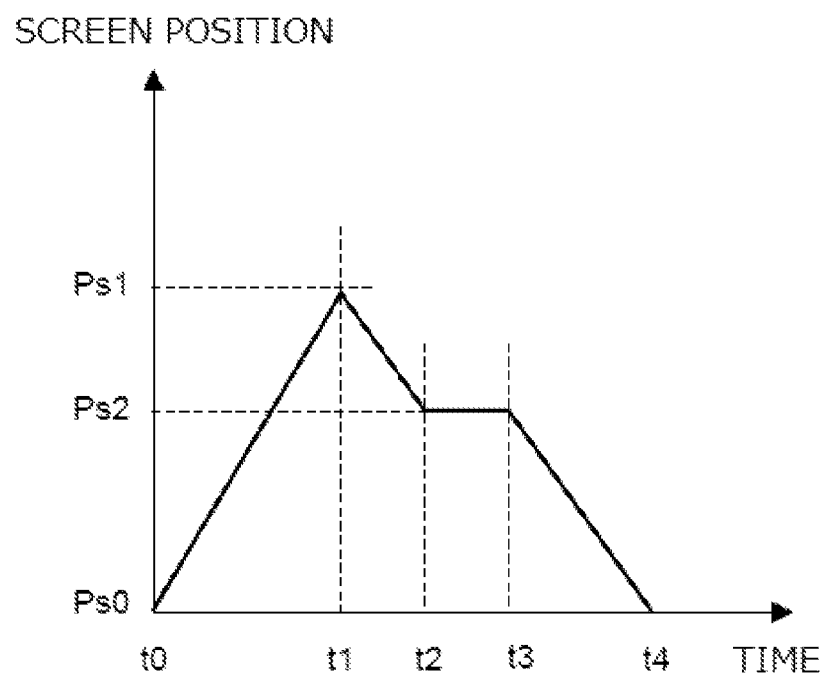

FIGS. 15A, 15B are a view schematically illustrating movement range D1 of movable screen 301, and a graph illustrating a drive example of movable screen 301, respectively.

As illustrated in FIG. 15A, in the present exemplary embodiment, fixed screen 302 is fixed to a position displaced toward a Z axis positive side and the Y axis positive side with respect to movable screen 301. That is, fixed screen 302 is disposed at a position optically farther from light source 101 than movable screen 301 is, and is disposed at a position far from movable screen 301 in a direction parallel to a short side of movable screen 301.

Here, image 30 generated as a virtual image is generated at a position farther from a point of view (position of eyes 2a) of a vehicle driver when movable screen 301 is closer to the Z axis negative side (light source 101 side). Since fixed screen 302 is closer to the Z axis positive side than movable screen 301 is, an image by fixed screen 302 is generated at a position closer to a point of view of a vehicle driver than an image by movable screen 301 is. Moreover, since fixed screen 302 does not move, an image by fixed screen 302 is always generated at a position located a certain distance from a point of view of a vehicle driver.

Figure 16:
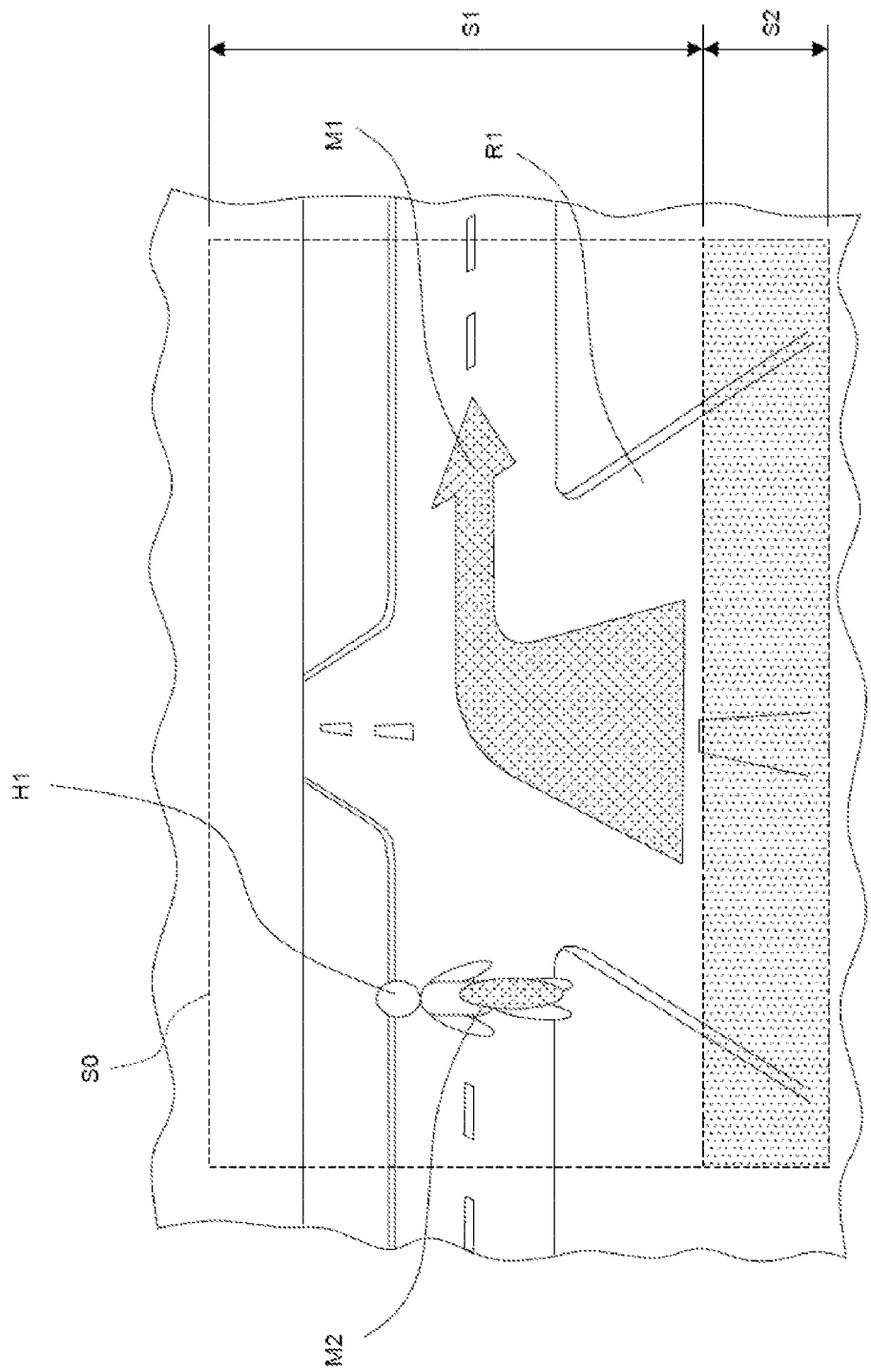
FIG. 16 is a view schematically illustrating an image display example according to the first exemplary embodiment.

FIG. 16 is a view schematically illustrating a display example of images generated by movable screen 301 and fixed screen 302.

In the display example in FIG. 16, depth image M1 is an arrow for suggesting according to a navigation function vehicle driver 2 a direction to which vehicle 1 should turn in road R1, and vertical image M2 is a marking for calling attention of vehicle driver 2 to a fact that passerby H1 is present. For example, depth image M1 and vertical image M2 are displayed with different colors from each other. Area S0 in which images generated by movable screen 301 and fixed screen 302 are displayed is divided into upper area S1 and lower area S2. An image generated by movable screen 301 is displayed in upper area S1, and an image generated by fixed screen 302 is displayed in lower area S2.

As illustrated in FIG. 16, an image such as depth image M1 and vertical image M2 which dynamically changes according to driving is displayed in area S1. A static image such as a vehicle speed and outdoor temperature is displayed in area S2. As described above, an image generated by fixed screen 302 is displayed in area S2, and this image is displayed at a position located a short distance (for example, a position located approximately 2 meters) from a point of view (eye position) of a vehicle driver. This distance is significantly shorter than a vehicle driver's viewing distance during normal driving (for example, approximately several tens of meters to 100 meters). Consequently, a static image displayed in area S2 is unlikely to hinder a normal driving operation. Moreover, this image is disposed in a lower portion of area S0 and is unlikely to overlap a field of view of a vehicle driver. Consequently, a static image displayed in area S2 is more unlikely to hinder a normal driving operation.

FIG. 15B illustrates a drive example of movable screen 301 when the dynamic image as illustrated in FIG. 16 is displayed in area S1.

Movable screen 301 repeatedly moves with time t0 to t4 as one cycle. Movable screen 301 moves from initial position Ps0 to farthest position Ps1 during time t0 to t1, and movable screen 301 returns from farthest position Ps1 to initial position Ps0 during time t1 to t4. The movement cycle, that is, the time from time t0 to t4 of movable screen 301 is, for example, 1/60 seconds. Movable screen 301 moves as illustrated in FIG. 15B by a change in a current that is applied to coil 315 while an output of encoder 306e is monitored.

Time t0 to t1 is a period for displaying depth image M1 which spreads in the depth direction in FIG. 16, and time t1 to t4 is a period for displaying vertical image M2 which spreads in a vertical direction in FIG. 16.

During time t0 to t1, movable screen 301 linearly moves from initial position Ps0 to farthest position Ps1. When movable screen 301 moves, a position at which a virtual image ahead of wind shield 12 is formed moves forward along with the movement of movable screen 301. Hence, when movable screen 301 is present at each position in the depth direction of depth image M1, laser light sources 101a to 101c are caused to emit light at timing corresponding to depth image M1 on a scan line corresponding to depth image M1. Consequently, it is possible to display depth image M1 as illustrated in FIG. 16 as a virtual image in area S1.

On the other hand, since vertical image M2 does not change in the depth direction but spreads only in the vertical direction, it is necessary to fix movable screen 301 to a position corresponding to vertical image M2 and to generate a virtual image. Stop position Ps2 in FIG. 15B is a position of movable screen 301 corresponding to a depth position of vertical image M2. Movable screen 301 stops at stop position Ps2 during time t2 to t3 while movable screen 301 returns from farthest position Ps1 to initial position Ps0. During this time, laser light sources 101a to 101c are caused to emit light at timing corresponding to vertical image M2 on a scan line corresponding to vertical image M2. Consequently, it is possible to display vertical image M2 as illustrated in FIG. 16 as a virtual image ahead of projection area 13 of wind shield 12.

The above-described control is performed by image processing circuit 201 illustrated in FIG. 2. Under this control, depth image M1 and vertical image M2 are displayed as virtual images in area S1 during time t0 to t4. The above-described control produces a mismatch between display timing of depth image M1 and display timing of vertical image M2. However, since this mismatch is very short time, vehicle driver 2 recognizes an image formed with depth image M1 and vertical image M2 superimposed on each other. Thus, vehicle driver 2 can see an image based on an image signal (depth image M1, vertical image M2) which is superimposed on a landscape including road R1 and passerby H1.

Note that in the example of FIG. 16, since there is one vertical image M2, one stop position Ps2 of movable screen 301 is set in the step in FIG. 15B, but when there is a plurality of vertical images M2, a plurality of stop positions is set in the step in FIG. 15B according to a number of vertical images M2. However, since the time from time t0 to t4 is fixed in the step in FIG. 15B and time t4 is invariable, movement speeds of movable screen 301 before and after the stop position (an inclination of a waveform in FIG. 15B) are to be modified according to an increase and decrease in a number of the stop positions.

Meanwhile, since in the present exemplary embodiment, an image to be displayed in area S2 in FIG. 16 is generated by fixed screen 302, it is possible to reduce movement range D1 in which movable screen 301 reciprocally moves, as illustrated in FIG. 15A. For example, when a static image to be displayed in area S2 in FIG. 16 is also generated by movable screen 301, it is necessary to use, instead of movable screen 301, movable screen 301' having a width expanded to a range of fixed screen 302 in the Y axis direction so as to move movable screen 301' to a position in the Z axis direction of fixed screen 302, as illustrated in a comparative example in FIG. 15C. Hence, movement range D2 in which movable screen 301' reciprocally moves becomes significantly longer than movement range D1 in the first exemplary embodiment.

Figure 15C:
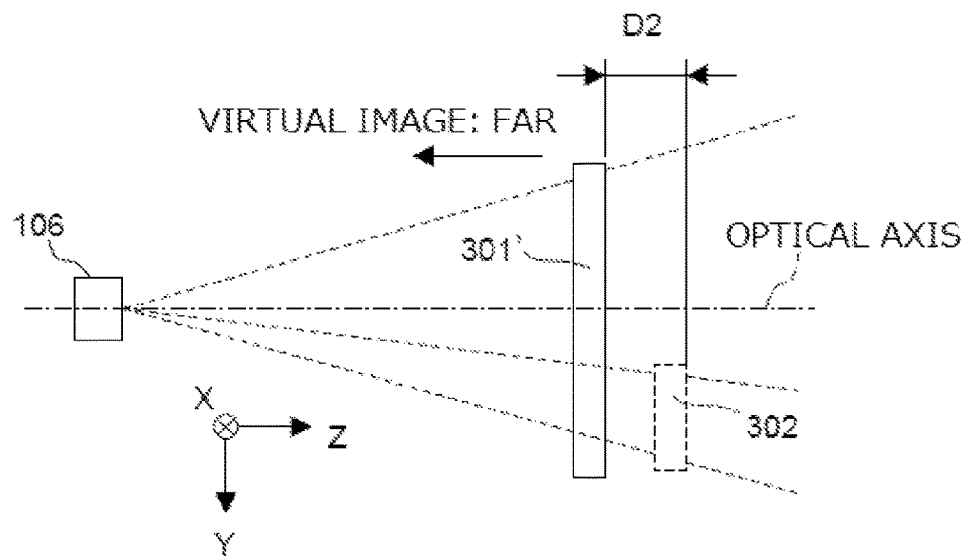
FIGS. 15C, 15D are a view schematically illustrating a movement range of a movable screen according to a comparative example, and a graph illustrating a drive example of the movable screen, respectively.
Figure 15D:
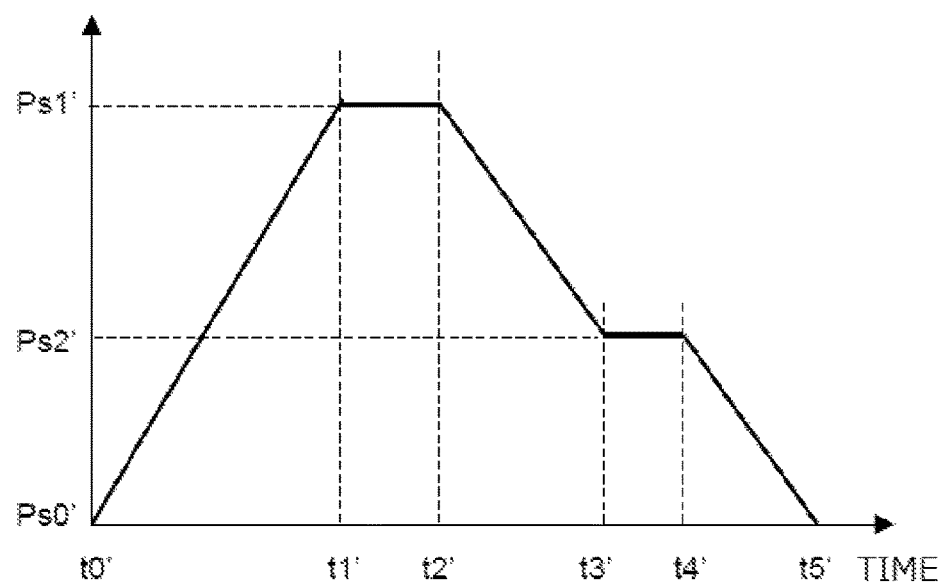

Note that in a configuration according to the comparative example, when the image in FIG. 16 is displayed, movable screen 301' moves as illustrated in FIG. 15D. In this case, movable screen 301' moves to position Ps1' corresponding to fixed screen 302 in FIG. 15C during time t0 to t1. During this time, depth image M1 is displayed in area S1 in FIG. 16. Subsequently, movable screen 301' stops during time t1' to t2', and during this time, a static image is displayed in area S2 in FIG. 16. Further, during time t3' to t4', movable screen 301' stops, and vertical image M2 is displayed in area S1 in FIG. 16.

When depth image M1 and vertical image M2 as illustrated in FIG. 16 are displayed, it is necessary to move movable screen 301 at a speed as high as approximately 60 Hz. By contrast, in the configuration of the first exemplary embodiment, fixed screen 302 is provided and consequently it is possible to significantly shorten movement range D1 of movable screen 301. Consequently, even in the case of moving movable screen 301 at a speed as high as approximately 60 H, it is possible to smoothly and stably move movable screen 301.

Effect of First Exemplary Embodiment

According to the first exemplary embodiment, the following effect is exhibited.

Since holder 303 is driven by using coil 315 and magnetic circuit 310, it is possible to move movable screen 301 at a high frequency corresponding to a frame rate. Moreover, since each plate spring 305b which supports holder 303 is disposed in substantially parallel to the long side of movable screen 301, it is possible to secure a long length of plate spring 305b while driving unit 300 is compactly housed. Consequently, it is possible to reduce a stress of plate spring 305b produced during driving of holder 303, and to reduce a load during driving of holder 303. Consequently, it is possible to prevent deformation of plate spring 305b and to enhance durability. Further, plate spring 305b has a shape symmetrical in the longitudinal direction, is fixed at the center position in the longitudinal direction, that is, at the position of the axis of symmetry to be fixed to the base 307 side, and has both the ends connected to holder 303. Consequently, it is possible to substantially equalize stresses produced at both the ends of plate spring 305b during driving of holder 303, and to stably move movable screen 301 in an optical axis direction. Hence, according to image display device 20 according to the first exemplary embodiment, it is possible to stably move movable screen 301 at a high speed.

As illustrated in FIG. 10, since two plate springs 305b are disposed so as to be arranged in the optical axis direction, it is possible to suppress operations other than operations in the Z axis direction of holder 303 and movable screen 301 during operations. Moreover, it is possible to suppress an operation at an unintended frequency.

As illustrated in FIG. 7B, since the width of each plate spring 305b is gradually narrowed from the center to both the ends, it is possible to reduce a weight of a movable end of plate spring 305b while a spring constant of plate spring 305b is maintained. Consequently, it is possible to enhance responsiveness of holder 303 and movable screen 301.

As illustrated in FIG. 13, first yoke 311 and second yoke 313 are disposed such that the side end surface of wall 311b at the inside of first yoke 311 and the outside surface of wall 313b at the inside of second yoke 313 overlap each other, and first magnet 312b installed on wall 311b at the inside of first yoke 311 extends to the side end surface of wall 313b at the inside of second yoke 313. Consequently, it is possible to apply a magnetic field near a corner of coil 315, and to enhance driving force produced on coil 315. Consequently, it is possible to move holder 303 and movable screen 301 at a higher speed.

Figure 17:
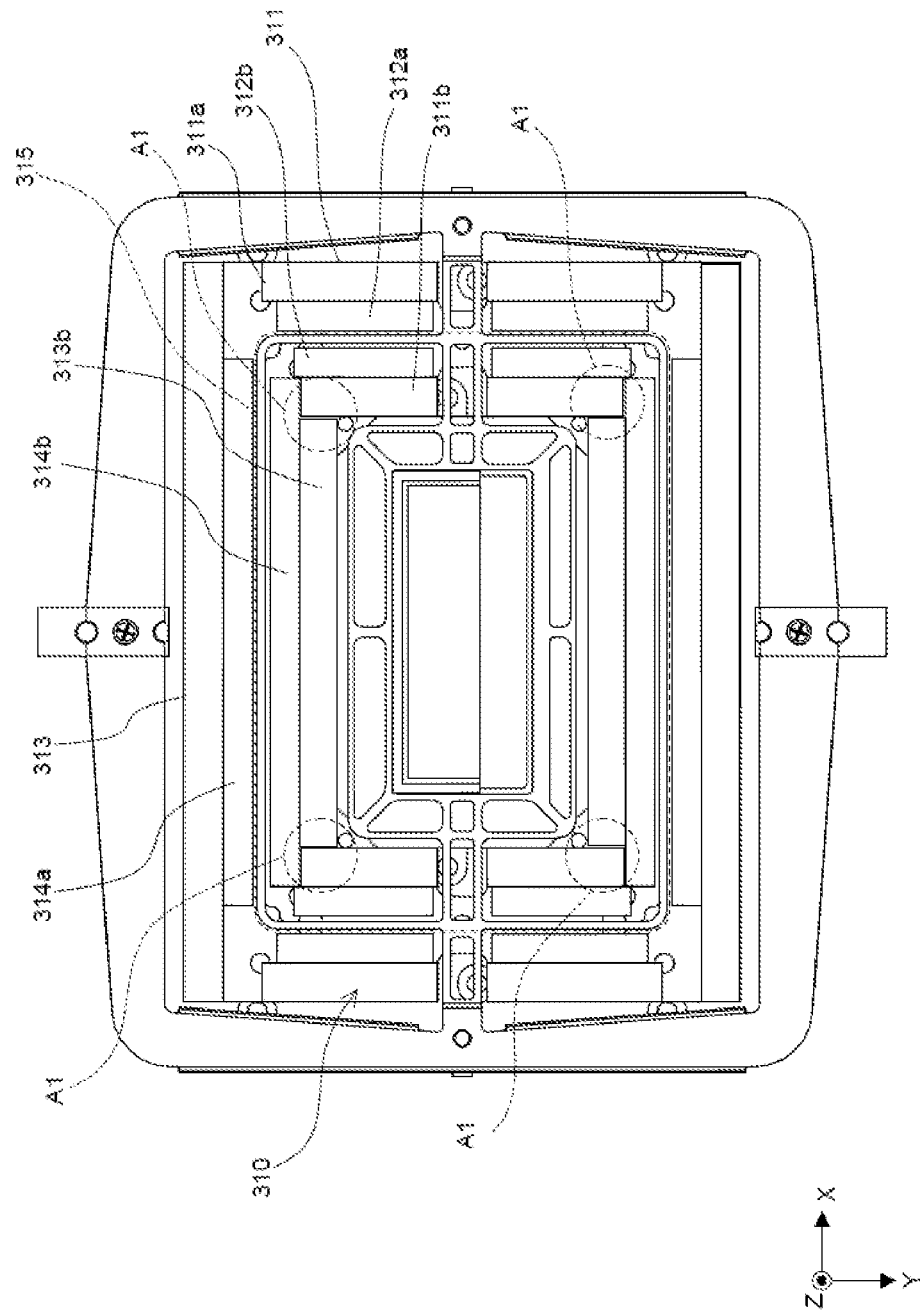
FIG. 17 is a plan view of a portion of a magnetic circuit and a suspension according to a modification of the first exemplary embodiment.

Note that as illustrated in FIG. 17, magnetic circuit 310 may be configured such that first yoke 311 and second yoke 313 are disposed such that the outside surface of wall 311b at the inside of first yoke 311 and the side end surface of wall 313b at the inside of second yoke 313 overlap each other, and magnetic circuit 310 may be configured such that second magnet 314b installed on wall 313b at the inside of second yoke 313 extends to the side end surface of wall 313b at the inside of first yoke 311. In this case, as with the first exemplary embodiment, it is also possible to apply a magnetic field near a corner of coil 315 and to enhance driving force produced on coil 315.

Base 307 includes a magnetic body, and first yoke 311 and second yoke 313 are installed on the upper surface of base 307. Consequently, portions of base 307 at which first yoke 311 and second yoke 313 are installed serve as magnetic paths, and a magnetic flux is unlikely to saturate in first yoke 311 and second yoke 313. Consequently, it is possible to reduce a thickness of each of first yoke 311 and second yoke 313, and as a result it is possible to reduce a size of an outer shape of driving unit 300.

As illustrated in FIG. 12, supported portion 303d extending outward from outer frame 303b is connected to the end of each plate spring 305b through gaps 311c, 311d between walls 311a, 311b of first yoke 311. Moreover, bridge 303c of holder 303 which connects between inner frame 303a and outer frame 303b is configured to pass through gap 311d between walls 311b at the inside of first yoke 311. For this reason, as illustrated in FIG. 10, it is possible to dispose inner frame 303a in an area surrounded by walls 311b at the insides of first yokes 311 and walls 313b at the insides of second yokes 313, and to house holder 303 in a range of a height of magnetic circuit 310. Consequently, it is possible to reduce a dimension in the Z axis direction of driving unit 300. Moreover, since inner frame 303a and supported portion 303d can be connected linearly by bridge 303c, it is possible to reduce volume of bridge 303c, as compared to a case where bridge 303c is configured to cross magnetic circuit 310. For this reason, it is possible to reduce a weight of holder 303, and to enhance responsiveness of holder 303 and movable screen 301.

Figure 18:
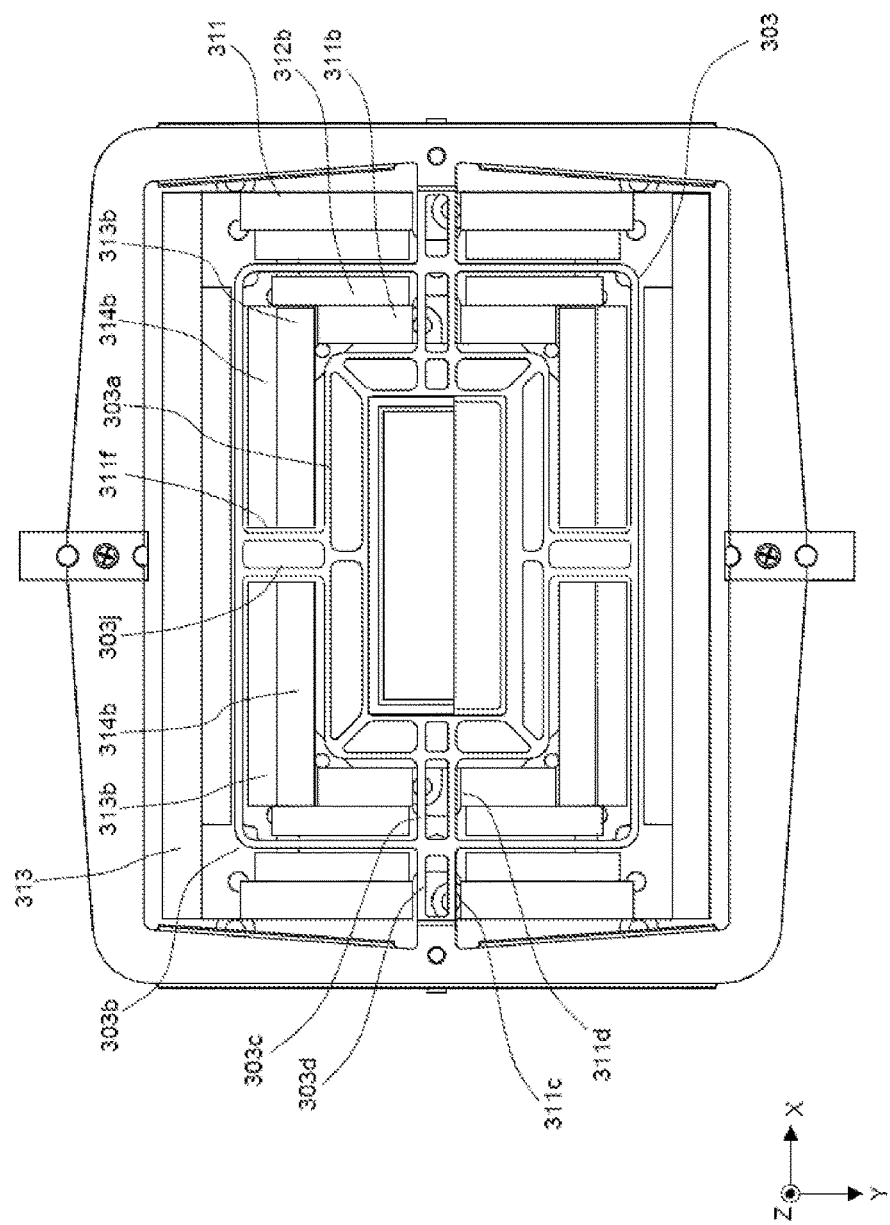
FIG. 18 is a plan view of a portion of a magnetic circuit and a suspension according to another modification of the first exemplary embodiment.

Note that as illustrated in FIG. 18, wall 313b at the inside of second yoke 313 may be separated in the X axis direction to provide gap 311f, and bridge 303j which connects a center position in the X axis direction of inner frame 303a and a center position in the X axis direction of outer frame 303b may further be provided, and bridge 303j may be configured to pass through gap 311f. In this case, second magnet 314a installed on wall 313b is also separated into two. Further, in the configuration in FIG. 18, bridge 303c may be omitted, and, along with this omission, two walls 311b at the inside of first yoke 311 may be integrated, and two first magnets 312b may be integrated. The same effect as the effect of the configuration according to the first exemplary embodiment can also be exhibited by this configuration. Note that a position at which part of holder 303 such as bridge 303c and supported portion 303d crosses magnetic circuit 310 is not limited to the position illustrated in FIG. 12 or 18, and may be another position. Moreover, a number of bridges 303c can also be modified appropriately.

Since cover 304 installed on an upper portion of magnetic circuit 310 includes a magnetic body, portions of cover 304 overlapping first yoke 311 and second yoke 313 become magnetic paths, and a magnetic flux is unlikely to saturate in first yoke 311 and second yoke 313. Consequently, it is possible to reduce a thickness of each of first yoke 311 and second yoke 313, and as a result it is possible to reduce a size of the outer shape of driving unit 300.

As illustrated in FIG. 3, driving unit 300 includes movable screen 301 and fixed screen 302, and drives movable screen 301 to display a dynamic depth image and drives fixed screen 302 to display a static image. Consequently, as described with reference to FIGS. 15A to 15D, as compared to the case of the comparative example where movable screen 301 displays a static image together with a dynamic image, it is possible to narrow movement range D1 (oscillation range) of movable screen 301, and to more smoothly and quickly move movable screen 301. Moreover, in the configuration according to the first exemplary embodiment, as illustrated in FIGS. 15A, 15C, a size in the Y axis direction of movable screen 301 becomes smaller than a size in the Y axis direction of movable screen 301' according to the comparative example. For this reason, it is possible to reduce a weight of movable screen 301, and to enhance responsiveness of movable screen 301.

As illustrated in FIG. 15A, fixed screen 302 is fixed to a position that is outside of movement range D1 of movable screen 301 and that is displaced in a direction perpendicular to the optical axis direction with respect to movable screen 301. Consequently, it is possible to separate an image formation position and a disposition position of an image generated by fixed screen 302 from an image generated by movable screen 301, and to enhance visibility of both the images.

As illustrated in FIG. 15A, fixed screen 302 is disposed at a position optically farther from light source 101 than movable screen 301 is. Consequently, it is possible to place a static image generated by fixed screen 302 close to a point of view (eye position) of a vehicle driver, and to prevent the static image from hindering a normal driving operation.

As illustrated in FIG. 12, fixed screen 302 is disposed at a position far from movable screen 301 in a direction parallel to the short side of movable screen 301. Consequently, it is possible to place a static image generated by fixed screen 302 in the lower portion of area S0 as illustrated in FIG. 16, and to prevent the static image from covering a field of view of a vehicle driver.

As illustrated in FIG. 10, since fixed screen 302 is attached to cover 304, fixed screen 302 can be fixed easily to driving unit 300. Moreover, cover 304 includes opening 304a through which light from movable screen 301 passes, and fixed screen 302 is disposed in an area of opening 304a through which light from movable screen 301 does not pass. Consequently, it is possible to place an optical path of light having passed through fixed screen 302 and an optical path of light having passed through movable screen 301 close to each other, and to dispose an image of fixed screen 302 and an image of movable screen 301 so as to smoothly arrange the images in a field of view of a vehicle driver. Note that opening 304a through which light from movable screen 301 passes may not necessarily be coupled to the opening to which fixed screen 302 is attached, and a shape and a size of opening 304a can also be modified appropriately.

Second Exemplary Embodiment

A second exemplary embodiment differs from the first exemplary embodiment in a configuration of driving unit 300. Moreover, in the second exemplary embodiment, fixed screen 302 is omitted, and as with the comparative example in FIG. 15B, there is only movable screen 301. Other configurations are the same as those in the first exemplary embodiment. The configuration of driving unit 300 according to the second exemplary embodiment will be described below.

Figure 19:
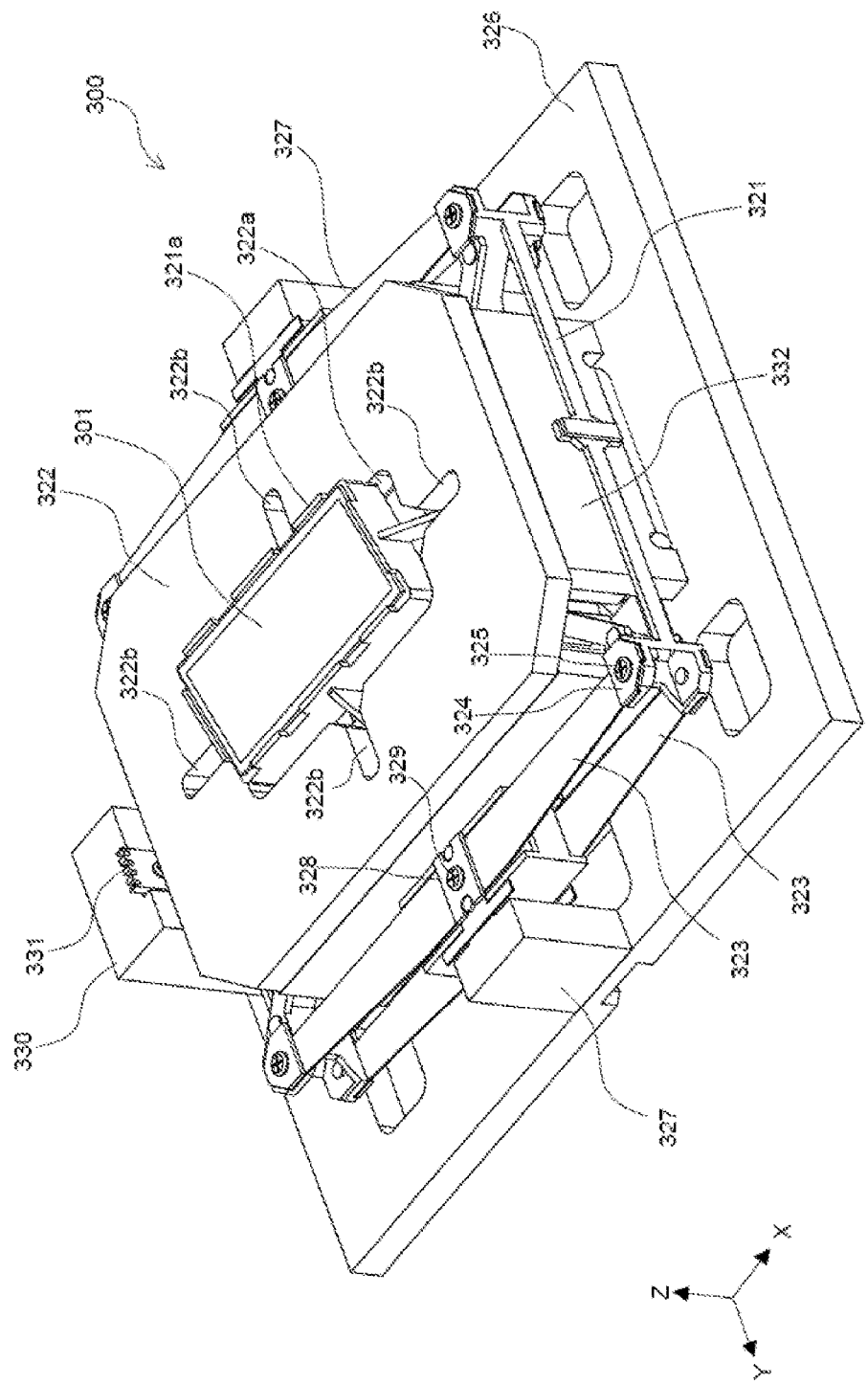
FIG. 19 is a perspective view illustrating a configuration of a driving unit according to a second exemplary embodiment.

FIG. 19 is a perspective view illustrating the configuration of driving unit 300.

Driving unit 300 includes holder 321, cover 322, four plate springs 323, washer 324, screw 325, base 326, support member 327, washer 328, screw 329, support member 330, encoder 331 and magnetic circuit 332. Movable screen 301 is held by holder 321. Opening 322a is formed in cover 322, and movable screen 301 is exposed through opening 322a. Moreover, cutaways 322b extending, respectively, in an X axis direction and a Y axis direction from opening 322a are formed in cover 322.

Holder 321 is supported movably in a Z axis direction by each plate spring 323. An end of plate spring 323 is fixed to holder 321 by washer 324 and screw 325. Support member 327 is installed on base 326, and plate spring 323 is fixed to support member 327 by washer 328 and screw 329. Further, magnetic circuit 332 is installed on base 326. A magnetic field is applied from magnetic circuit 332 to a coil (not illustrated) held by holder 321. A current is applied to the coil, and consequently holder 321 is driven in a Z axis direction.

Figure 20:
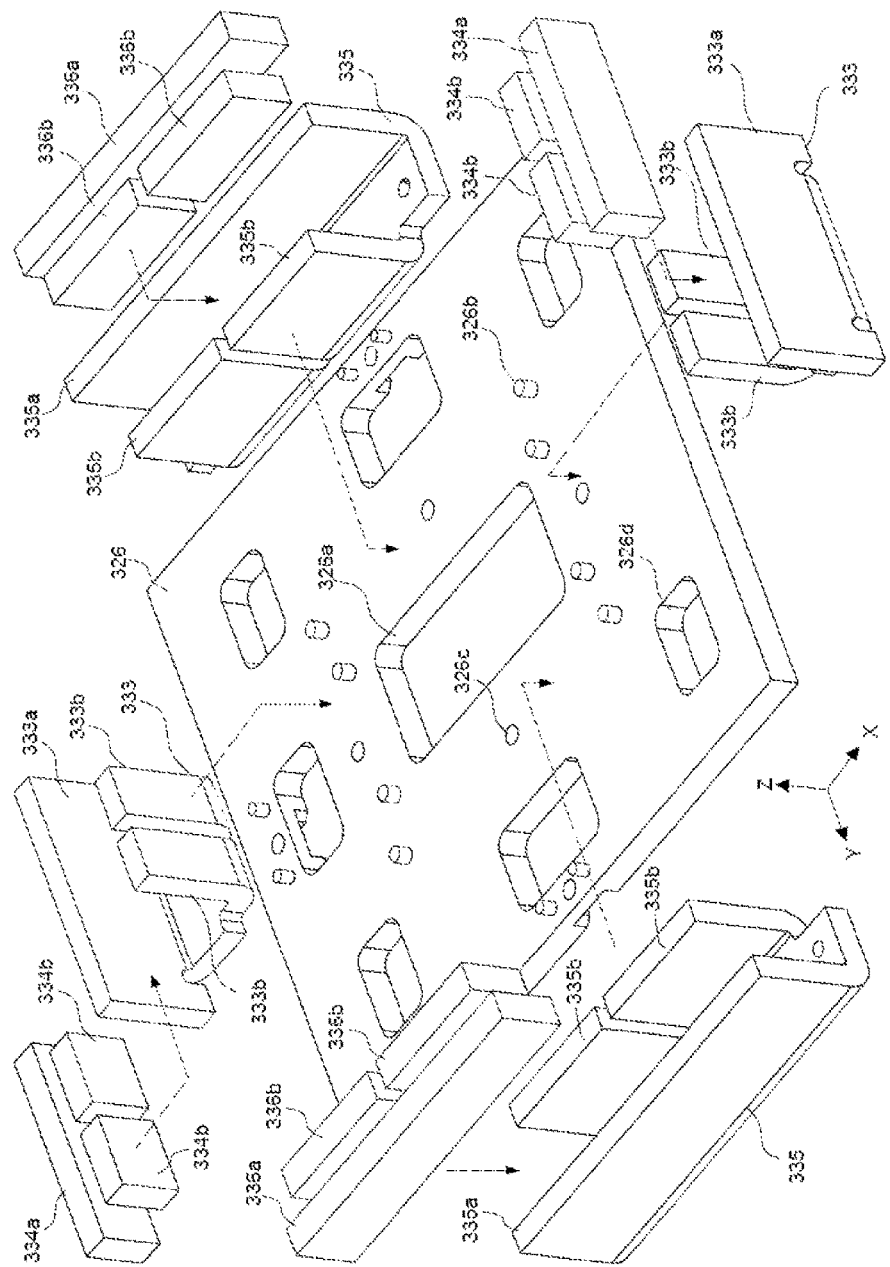
FIG. 20 is an exploded perspective view illustrating a configuration of a magnetic circuit according to the second exemplary embodiment.

FIG. 20 is an exploded perspective view illustrating a configuration of magnetic circuit 332.

Magnetic circuit 332 includes first yoke 333, first magnets 334a, 334b, second yoke 335 and second magnets 336a, 336b.

Base 326 has an outline having a substantially square shape in a plan view. Base 326 includes a magnetic body. Opening 326a, a plurality of bosses 326b, a plurality of screw holes 326c and through-hole 326d are formed in base 326. Opening 326a is an opening through which laser light from correction lens 107 illustrated in FIG. 2 passes in a Z axis positive direction. Bosses 326b are each a boss for positioning each member installed on base 326 to a predetermined position. Screw holes 326c are each a screw hole for fixing each member installed on base 326 by a screw. Through-hole 326d is a through-hole to which a driving unit or the like is inserted from a back side of base 326 when each member is installed on base 326.

First yoke 333 includes wall 333a at an outside and wall 333b at an inside. First magnets 334a, 334b are attached respectively to inside surfaces of walls 333a, 333b facing each other. Moreover, second yoke 335 includes wall 335a at an outside and wall 335b at an inside. Second magnets 336a, 336b are attached respectively to inside surfaces of walls 335a, 335b facing each other.

Note that the second exemplary embodiment differs from the first exemplary embodiment in that wall 333a at the outside of first yoke 333 is not separated into two. For this reason, one first magnet 334a is installed on wall 333a. Moreover, the second exemplary embodiment differs from the first exemplary embodiment in that wall 335b at the inside of second yoke 335 is separated into two, and second magnet 336b is installed on each of two walls 335b. Note that as with the first exemplary embodiment, first yoke 333 has a shape symmetrical in the Y axis direction, and second yoke 335 has a shape symmetrical in the X axis direction.

Figure 21:
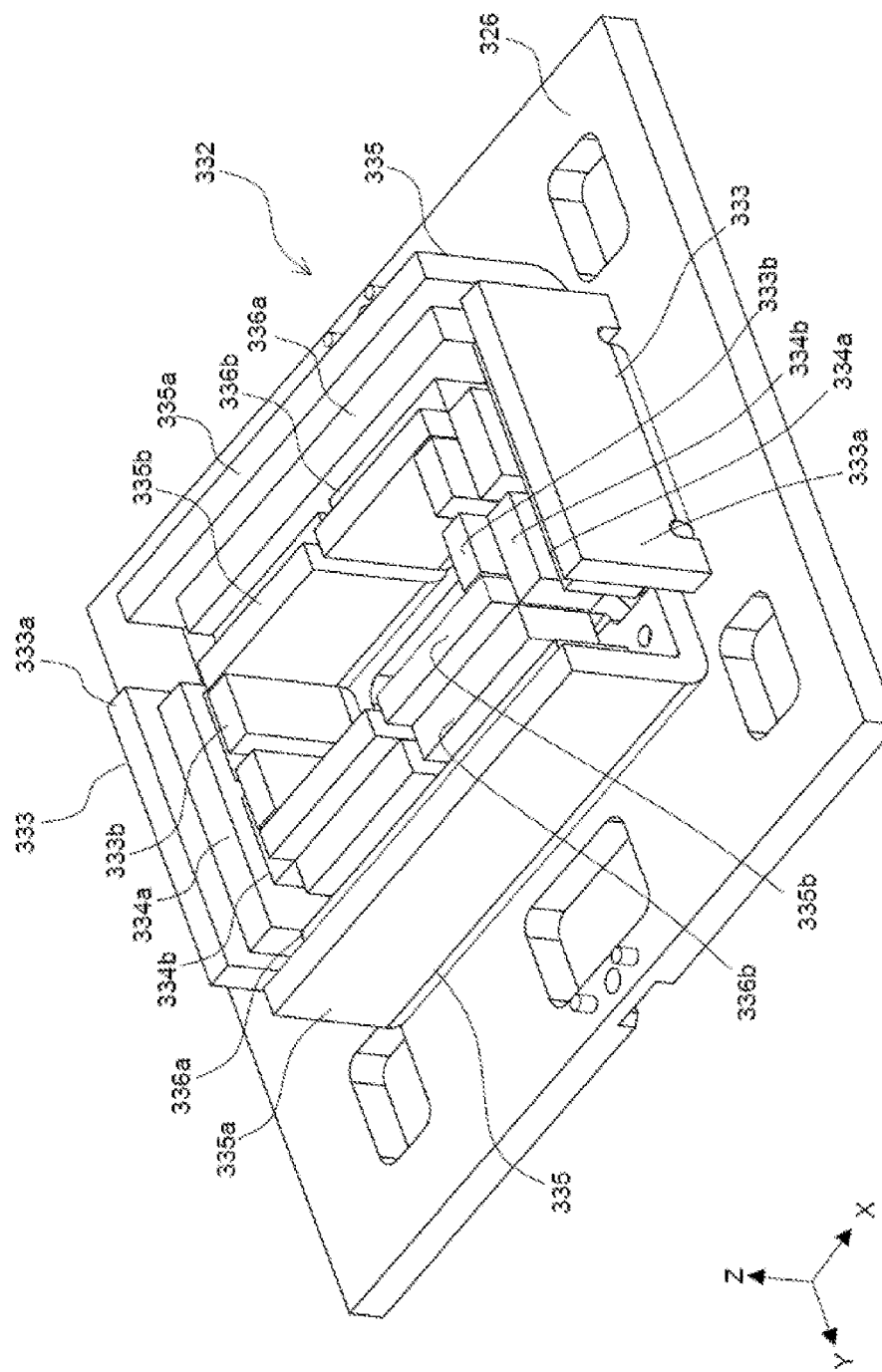
FIG. 21 is a perspective view illustrating a configuration of the assembled magnetic circuit according to the second exemplary embodiment.

In a state where first magnets 334a, 334b are installed, first yoke 333 at an X axis positive side is installed at the X axis positive side of opening 326a of base 326, and first yoke 333 at an X axis negative side is installed at the X axis negative side of opening 326a of base 326. Moreover, in a state where second magnets 336a, 336b are installed, second yoke 335 at a Y axis positive side is installed at the Y axis positive side of opening 326a of base 326, and second yoke 335 at a Y axis negative side is installed at the Y axis negative side of opening 326a of base 326. Thus, as illustrated in FIG. 21, magnetic circuit 332 is installed on base 326.

Figure 22:
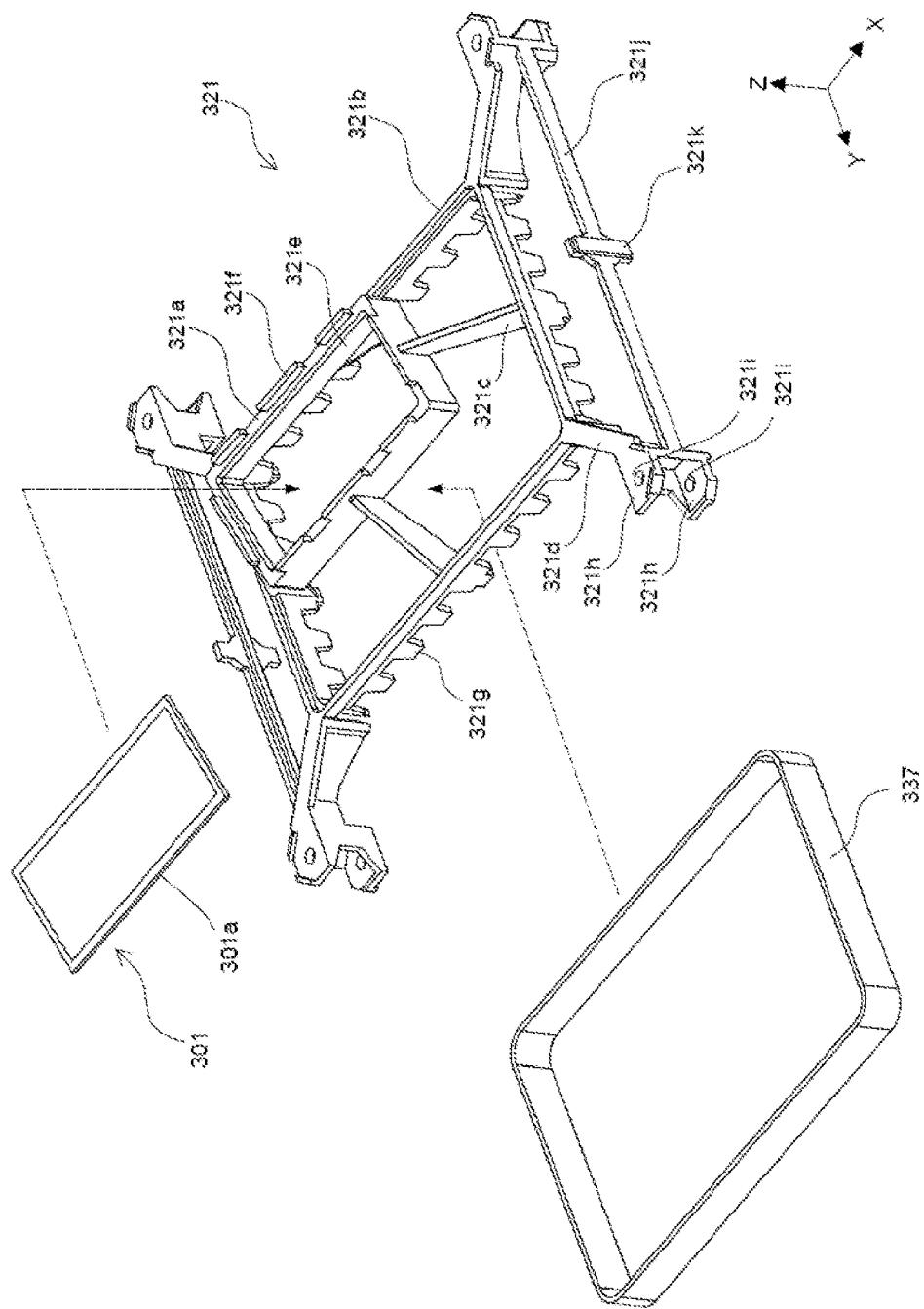
FIG. 22 is a perspective view illustrating an assembly process of a holder, a movable screen and a coil according to the second exemplary embodiment.

FIG. 22 is a perspective view illustrating an assembly process of holder 321, movable screen 301 and coil 337.

Holder 321 is integrally formed with a material having low specific gravity such as a resin. Holder 321 has a shape symmetrical in the X axis direction. Holder 321 includes inner frame 321a which has a substantially rectangular shape and on which movable screen 301 is installed, and outer frame 321b which has a substantially rectangular shape and on which coil 337 is installed. Inner frame 321a is connected to outer frame 321b by four bridges 321c. Each of two bridges 321c arranged in the X axis direction connects between a center position in the Y axis direction of inner frame 321a and a center position in the Y axis direction of outer frame 321b. Moreover, each of two bridges 321c arranged in the Y axis direction connects between a center position in the X axis direction of inner frame 321a and a center position in the X axis direction of outer frame 321b. Further, four supported portions 321d are formed so as to extend in a radial pattern from four corners of outer frame 321b, respectively.

Note that the second exemplary embodiment differs from the first exemplary embodiment in that inner frame 321a is provided so as to be displaced in a height direction (Z axis positive direction) with respect to outer frame 321b. Moreover, as with the first exemplary embodiment, outer frame 321b is disposed in parallel to an X-Y plane. However, in contrast to the first exemplary embodiment, inner frame 321a is disposed in a state where inner frame 321a is inclined with respect to a surface parallel to the X-Y plane.

Inner frame 321a is provided with opening 321e through which laser light passes. Opening 321e has an outline having a substantially rectangular shape in a plan view. A plurality of walls 321f is provided around opening 321e. End rim 301a of movable screen 301 is fitted to an inside of each wall 321f, and movable screen 301 is attached to inner frame 321a. End rim 301a is thicker than other portions of movable screen 301. Movable screen 301 is fixed to inner frame 321a by an adhesive.

Moreover, a plurality of protrusions 321g that each has a guard shape and that protrudes toward a Z axis negative side is formed on a lower surface of outer frame 321b. An inner side of coil 337 is fitted to the plurality of protrusions 321g, and coil 337 is attached to outer frame 321b. Coil 337 is fixed to outer frame 321b by an adhesive. Coil 337 is configured to be wound around an axis parallel to a Z axis in one direction.

Two guards 321h parallel to the X-Y plane are formed so as to face each other at an end of each supported portion 321d. Screw holes 321i are formed respectively at positions arranged in the Z axis direction of guards 321h. Further, beam 321j which connects two supported portions 321d arranged in the Y axis direction is formed, and scale 321k is installed on an outside surface at a center position in the Y axis direction of beam 321j.

Figure 23:
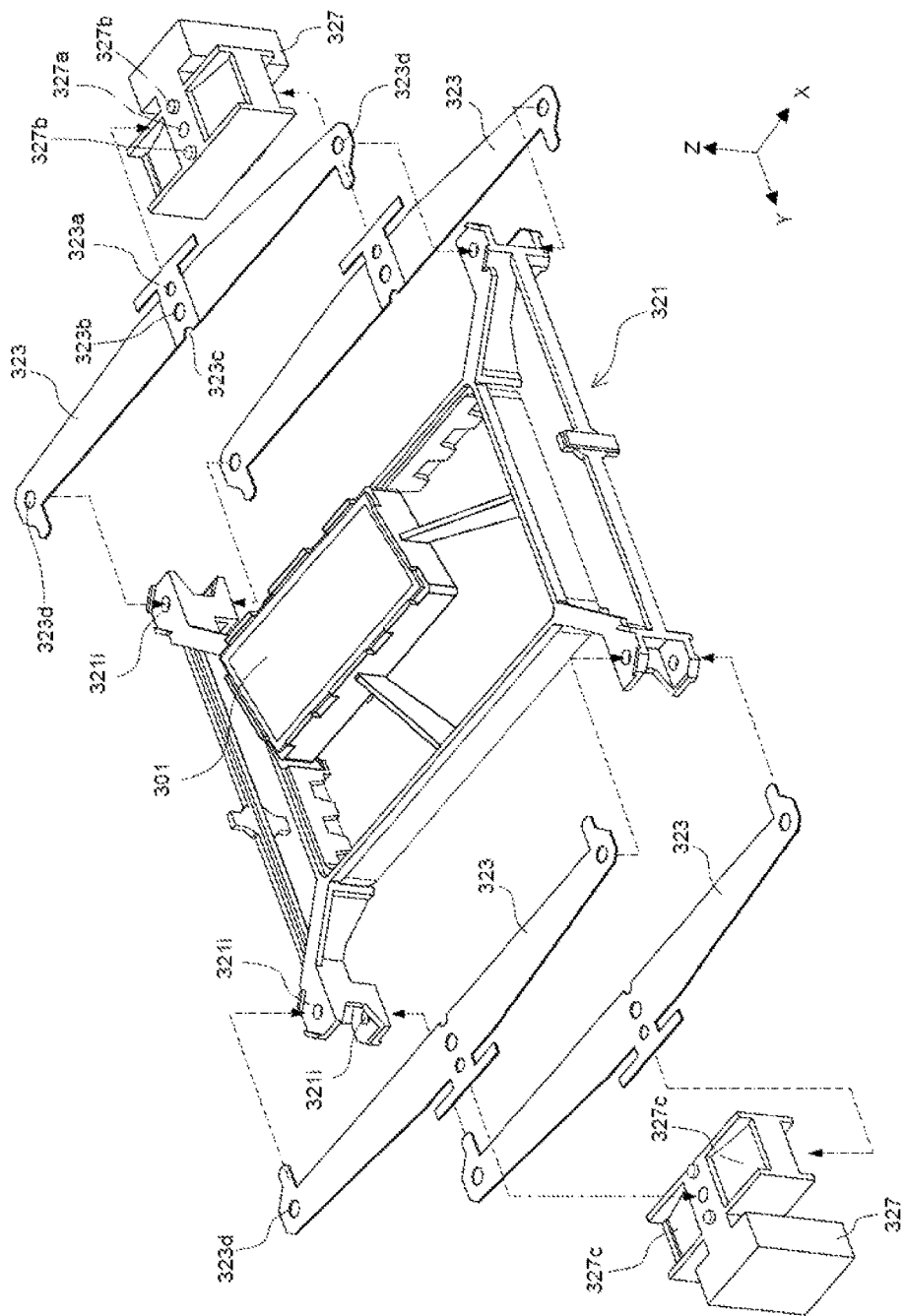
FIG. 23 is a perspective view illustrating an assembly process of the holder, a leaf spring and a support member according to the second exemplary embodiment.

FIG. 23 is a perspective view illustrating an assembly process of holder 321, plate springs 323 and support member 327. Four plate springs 323 in FIG. 23 all have the same structure. Two plate springs 323 at the Y axis positive side have such a relationship that a top side and a back side are reversed, and two plate springs 323 at the Y axis negative side have such a relationship that a top side and a back side are reversed. Here, a structure of upper plate spring 323 at the Y axis negative side will be described for convenience. Note that FIG. 23 does not illustrate washer 324, screw 325, washer 328 and screw 329 for fixing each plate spring 323 illustrated in FIG. 19 for convenience.

Plate spring 323 is integrally formed with a flexible metal material. Plate spring 323 has a shape symmetrical in the X axis direction. Two holes 323a, 323b and cutaway 323c of an arc shape are each formed at a center position in the X axis direction of plate spring 323, that is, at a position of an axis of symmetry in the X axis direction. Moreover, hole 323d is formed at each of both ends of plate spring 323. A width in the Y axis direction of plate spring 323 is gradually narrowed from the center position in the X axis direction toward both ends in the X axis direction. Consequently, a weight of a movable end of plate spring 323 is reduced while a spring constant of plate spring 323 is maintained.

Support member 327 is integrally formed with a non-magnetic material such as a resin. Support member 327 has a shape symmetrical in the X axis direction. Screw hole 327a and two protrusions 327b of a columnar shape are formed so as to be arranged in the Y axis direction at center positions in the X axis direction on an upper surface of support member 327. Further, two inclined surfaces 327c each having a height lower from a center toward an end in the X axis direction are formed on the upper surface of support member 327. Note that screw hole 327a, two protrusions 327b and two inclined surfaces 327c are also formed in a lower surface of support member 327, as with the upper surface. A portion of support member 327 at which screw hole 327a, protrusions 327b and inclined surfaces 327c are formed has a shape symmetrical in the Z axis direction.

As indicated by dashed-dotted line arrows in FIG. 23, four plate springs 323 are each screwed to holder 321 by washer 324 and screw 325 (see FIG. 19) in a state where hole 323d matches screw hole 321i at a holder 321 side. Moreover, as indicated by the dashed-dotted line arrows in FIG. 23, hole 323a and cutaway 323c of each of four plate springs 323 are fitted respectively to protrusions 327b of support member 327, and hole 323b of each of four plate springs 323 matches screw hole 327a. In this state, screw 329 (see FIG. 19) is screwed to screw hole 327a via washer 328. Consequently, plate springs 323 are fixed to holder 321.

Figure 24:
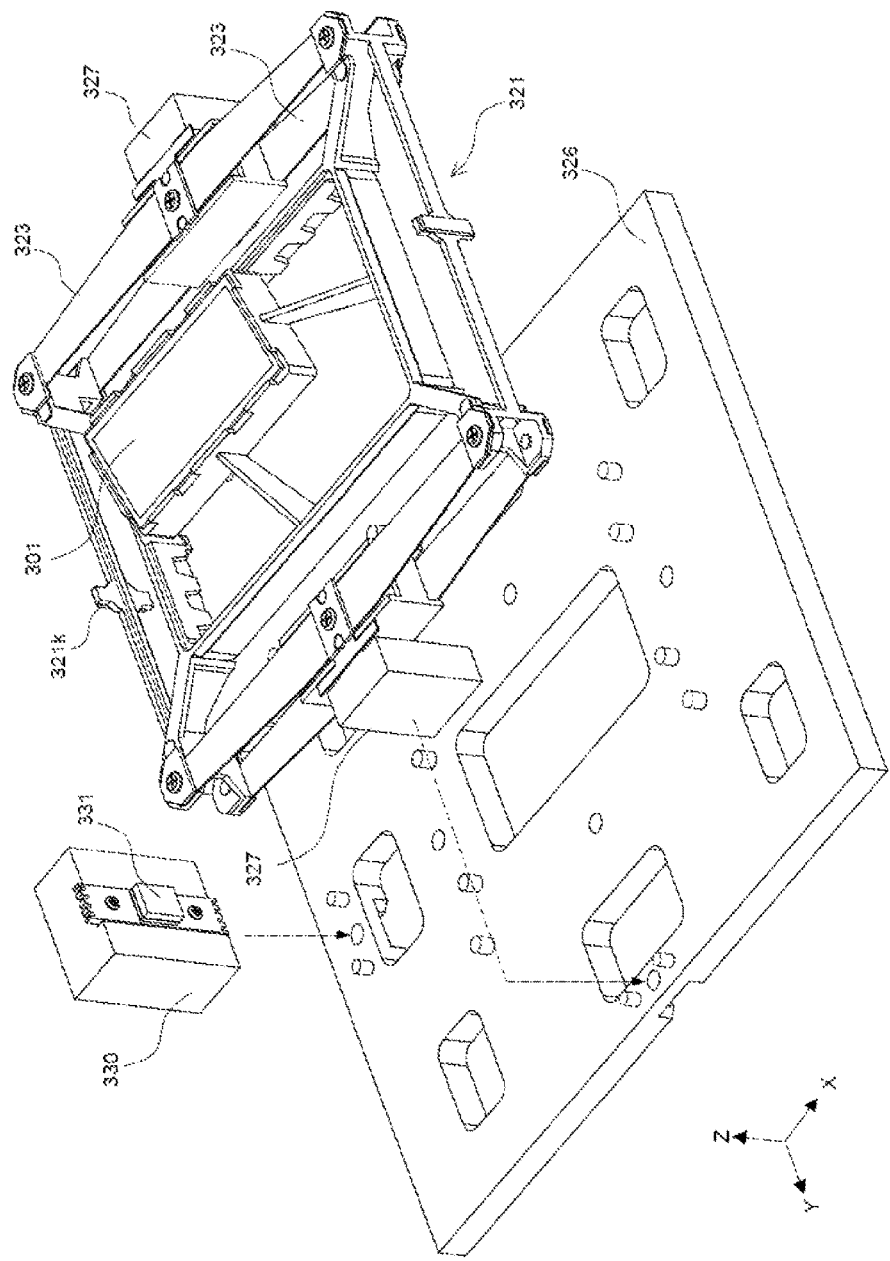
FIG. 24 is a perspective view illustrating a process of assembling the support member and an encoder on a base according to the second exemplary embodiment.

FIG. 24 is a perspective view illustrating a process of assembling support members 327, 330 and encoder 331 on base 326. FIG. 24 does not illustrate magnetic circuit 332 for convenience.

Support member 327 is placed at each of a center position of an end at the Y axis positive side of base 326 and a center position of an end at the Y axis negative side of base 326, and is screwed to base 326 from the back side of base 326. Further, support member 330 on which encoder 331 is installed is placed at a center position of an end at the X axis negative side of base 326, and is screwed to base 326 from the back side of base 326. Note that a flow of first assembling holder 321, each plate spring 323 and support member 327 and then assembling support member 327 to base 326 is described here for convenience, but support member 327 may first be installed on base 326, and then plate spring 323 may be fixed to support member 327, and subsequently holder 321 may be fixed to the end of plate spring 323.

Thus, when holder 321 is supported by base 326, encoder 331 of support member 330 faces scale 321k at the X axis negative side of holder 321. As with the first exemplary embodiment, encoder 331 is an encoder for optically detecting movement in the Z axis direction of scale 321k.

Figure 25:
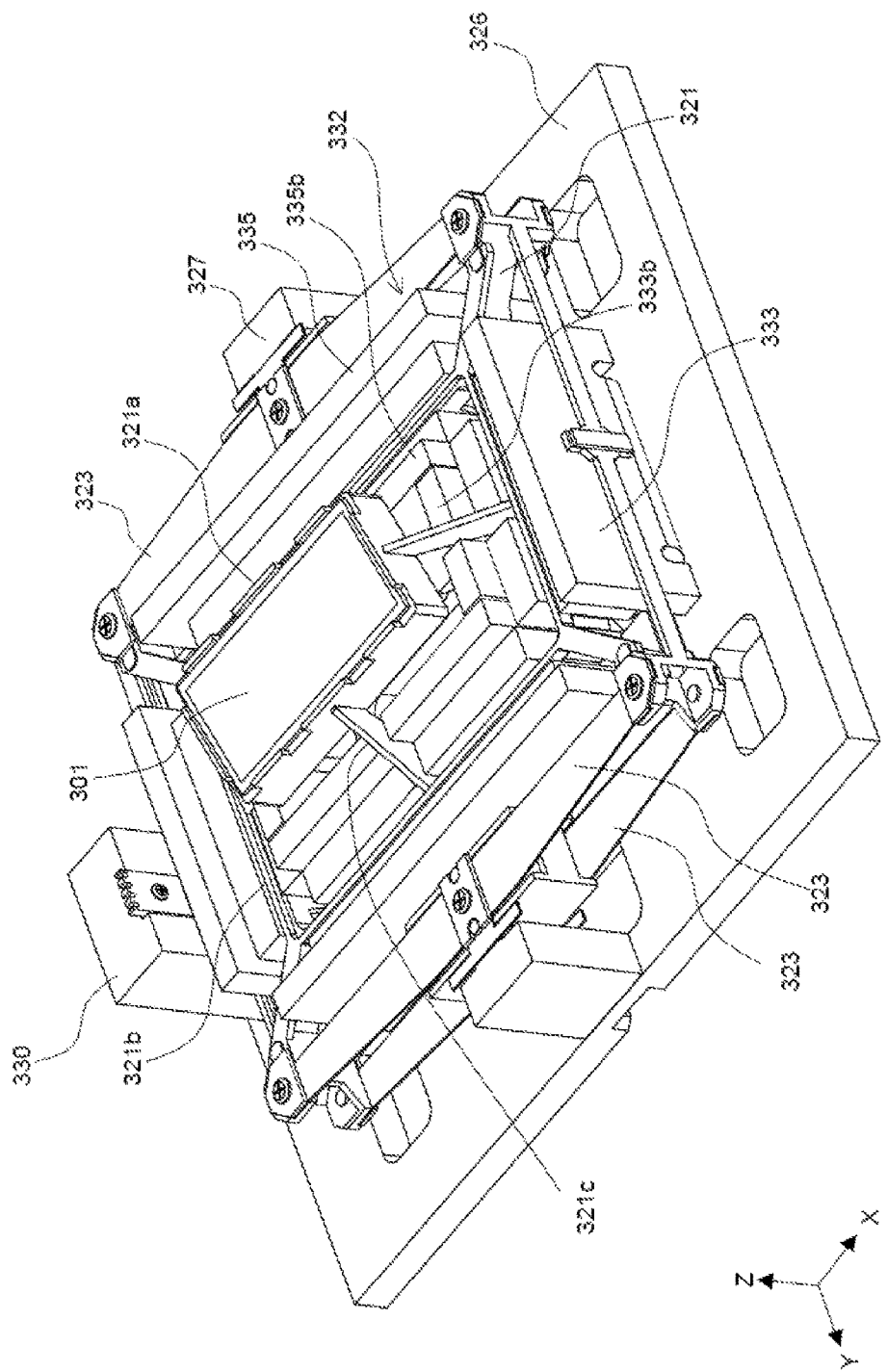
FIG. 25 is a perspective view illustrating the configuration of the driving unit without a cover being attached according to the second exemplary embodiment.

FIG. 25 is a perspective view illustrating the configuration of driving unit 300 without cover 322 being attached.

According to the above-described assembling, the configuration of a structure illustrated in FIG. 25 is obtained. Subsequently, cover 322 illustrated in FIG. 19 overlaps an upper surface of magnetic circuit 332. At this time, inner frame 321a of holder 321 passes through opening 322a of cover 322, and bridges 321c of holder 321 pass through cutaways 322b of cover 322, respectively. Since cover 322 includes a magnetic body, cover 322 adheres by magnetic force of magnetic circuit 332 to upper surfaces of first yoke 333 and second yoke 335 incorporated in magnetic circuit 332. Consequently, attachment of cover 322 is completed, and the configuration of driving unit 300 illustrated in FIG. 19 is obtained.

Figure 26:
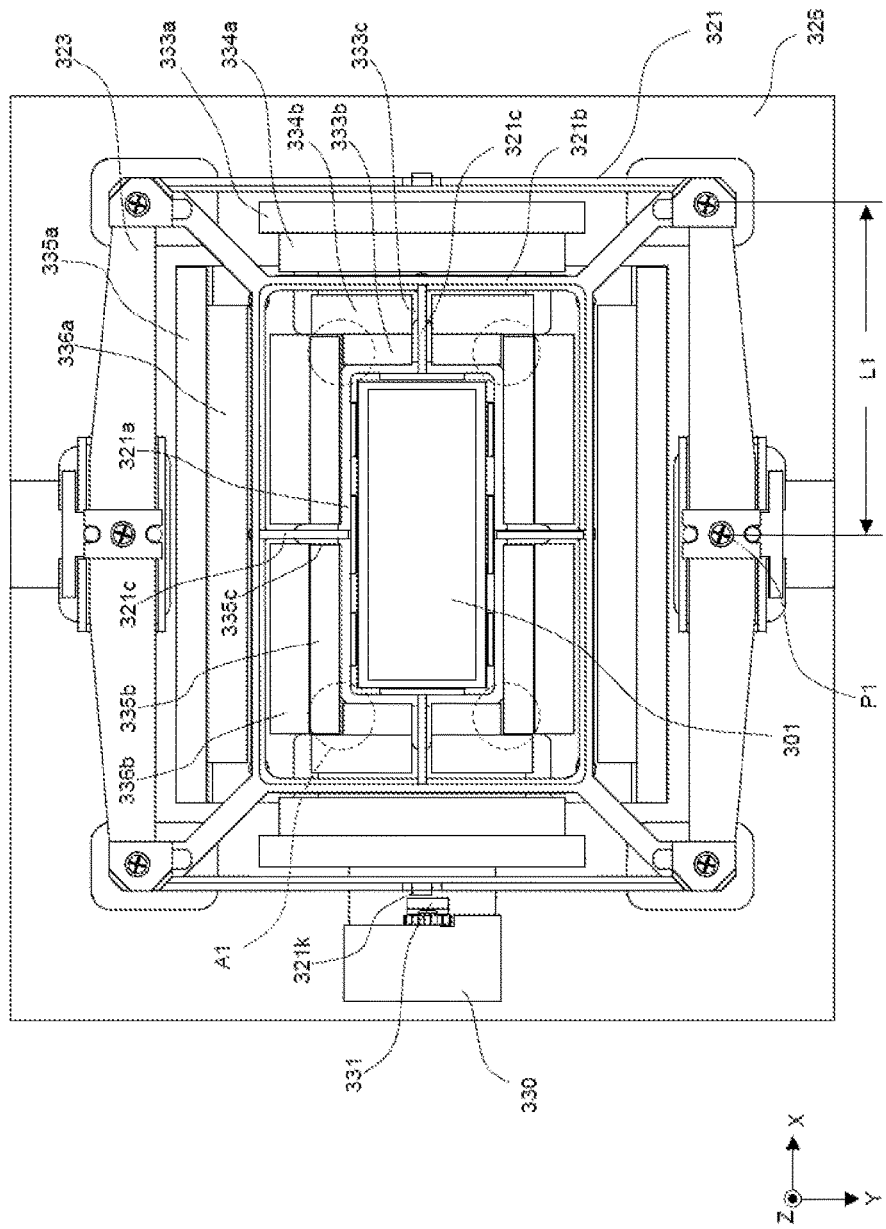
FIG. 26 is a plan view illustrating the configuration of the driving unit with the cover being detached according to the second exemplary embodiment.

FIG. 26 is a plan view illustrating the configuration of driving unit 300 with cover 322 being detached.

As with the first exemplary embodiment, as indicated by each broken line round area A1, first yoke 333 and second yoke 335 are disposed such that a side end surface of wall 333b at the inside of first yoke 333 and an outside surface of wall 335b at the inside of second yoke 335 overlap each other. Moreover, at this overlapping portion, first magnet 334b installed on wall 333b at the inside of first yoke 333 extends to a side end surface of wall 335b at the inside of second yoke 335. According to this configuration, it is possible to more efficiently apply a magnetic field to coil 337 as with the first exemplary embodiment.

Moreover, as with the first exemplary embodiment, each plate spring 323 is disposed substantially parallel to a long side of movable screen 301, is fixed at a center position in a longitudinal direction to be fixed to a base 326 side, and has both ends connected to holder 321. Thus, plate spring 323 is disposed substantially parallel to the long side of movable screen 301, and consequently it is possible to secure long distance L1 from fixed position P1 of plate spring 323 to each of both the ends while driving unit 300 is compactly housed. Consequently, a stress of plate spring 323 produced during driving of holder 321 reduces, and a load during driving of holder 321 reduces. Consequently, it is possible to prevent deformation of plate spring 323 and to enhance durability.

Effect of Second Exemplary Embodiment

The same effect as the effect of the first exemplary embodiment can also be exhibited by the configuration according to the second exemplary embodiment.

Note that in the second exemplary embodiment, as illustrated in FIG. 26, each of four corners of outer frame 321b is connected to the end of each plate spring 323 via a gap between wall 333a at the outside of first yoke 333 and wall 335a at the outside of second yoke 335, and via a gap between the first magnet 334a installed on wall 333a at the outside of first yoke 333 and second magnet 336a installed on wall 335a at the outside of second yoke 335. For this reason, holder 321 is unlikely to be twisted, and it is possible to more stably move holder 321 and movable screen 301, as compared to the first exemplary embodiment. For this reason, it is possible to suppress vibration at an unintended frequency of holder 321 and movable screen 301.

Moreover, in the second exemplary embodiment, as illustrated in FIG. 25, inner frame 321a is provided so as to be displaced in the height direction with respect to outer frame 321b such that inner frame 321a is positioned higher than an upper end of magnetic circuit 332. Consequently, as compared to the first exemplary embodiment, it is possible to place wall 333b at the inside of first yoke 333 and wall 335b at the inside of second yoke 335 close to a center side of base 326, and to make magnetic circuit 332 compact.

Moreover, in the second exemplary embodiment, as illustrated in FIG. 26, each of wall 333b at the inside of first yoke 333 and wall 335b at the inside of second yoke 335 is separated in a width direction, and bridges 321c which connect inner frame 321a and outer frame 321b pass through gap 333c between walls 333b at the insides of separated first yokes 333 and gap 335c between walls 335b at the insides of separated second yokes 335, respectively. Consequently, it is possible to suppress volume of each bridge 321c and to reduce a weight of holder 321. Consequently, it is possible to enhance responsiveness of holder 321 and movable screen 301. Moreover, since bridges 321c obliquely stand on outer frame 321b as illustrated in FIG. 25, it is possible to cover magnetic circuit 332 with cover 322 by providing cutaways 322b to cover 322 as illustrated in FIG. 19.

Note that any one or more of four bridges 321c illustrated in FIG. 26 may be omitted as long as bridge 321c can stably supports movable screen 301. Moreover, a position at which each bridge 321c crosses magnetic circuit 332 is not limited to the position illustrated in FIG. 26, and may be other positions. Moreover, a number of bridges 321c can also be modified appropriately.

Figure 27:
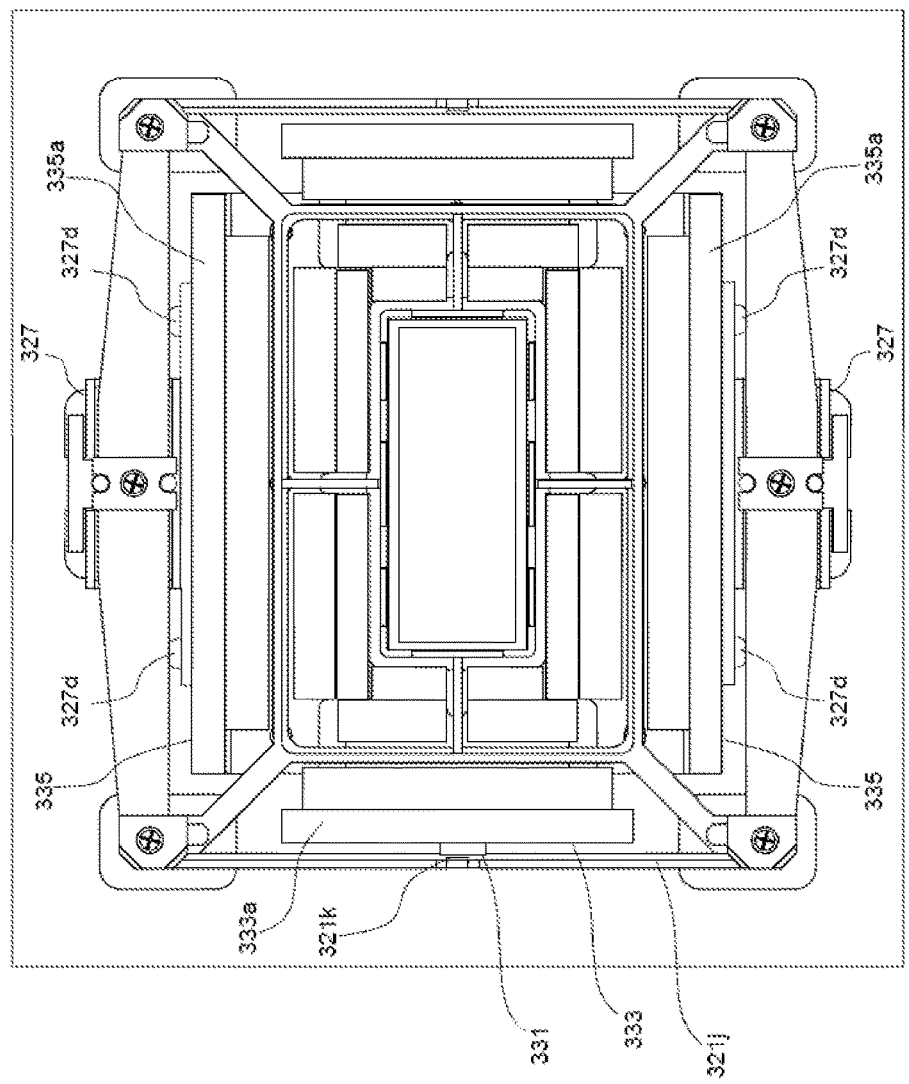
FIG. 27 is a plan view illustrating a configuration of a driving unit with a cover being detached according to a modification of the second exemplary embodiment.

As illustrated in FIG. 27, support member 327 may be fixed to wall 335a at the outside of second yoke 335 by screw 327d. Moreover, as illustrated in FIG. 27, scale 321k may be installed on an inside surface of beam 321j, and encoder 331 may be installed on wall 335a at the outside of second yoke 335. Consequently, it is possible to reduce a size of an outer shape of driving unit 300 in a plan view.

Third Exemplary Embodiment

In the second exemplary embodiment, as illustrated in FIG. 23, holder 321 is supported by using plate springs 323 each having the width gradually narrowed from the center to the end. By contrast, in the third exemplary embodiment, at least one pair of two pairs of plate springs 323 each pair of which sandwich movable screen 301 in a short side direction are each provided with an extensible and contractable structure which meanders in a width direction of plate spring 323.

Figure 28A:
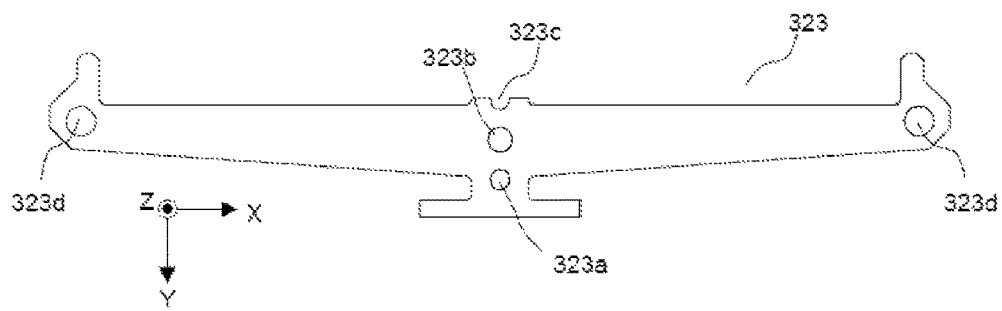
FIG. 28A is a view illustrating the leaf spring used in the second exemplary embodiment as reference.
Figure 28B:
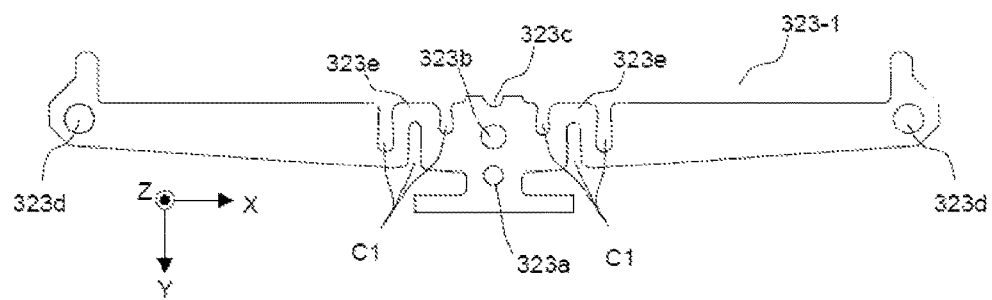
FIGS. 28B to 28D are plan views illustrating configurations of leaf springs according to a third exemplary embodiment, respectively.
Figure 28C:
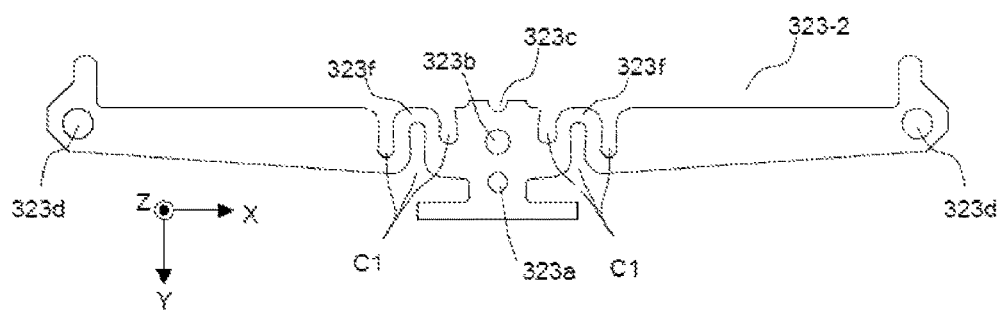
Figure 28D:
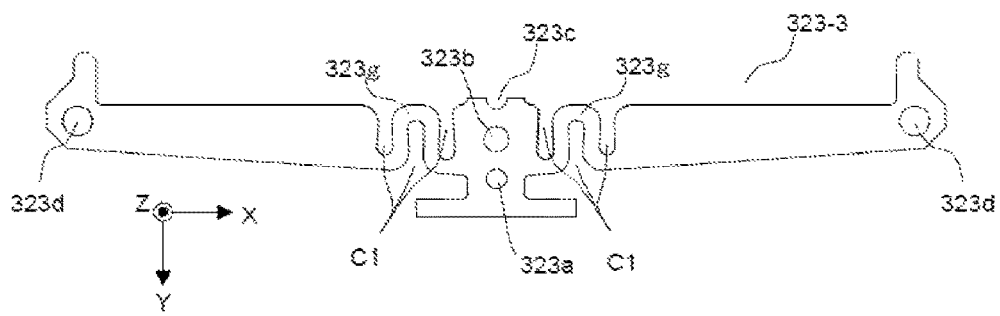

FIGS. 28B to 28D are plan views illustrating configurations of plate springs 323-1 to 323-3 according to the third exemplary embodiment, respectively. FIG. 28A illustrates plate spring 323 used in the second exemplary embodiment.

As illustrated in FIGS. 28B to 28D, extensible and contractable structures 323e to 323g of a crank shape are formed at both sides of centers of plate springs 323-1 to 323-3 used in the third exemplary embodiment, respectively. Each of extensible and contractable structures 323e to 323g is formed by providing plate spring 323 with cutaways C1 from a Y axis positive side and a Y axis negative side. Any of plate springs 323-1 to 323-3 has a shape symmetrical in a longitudinal direction. Extensible and contractable structure 323f of plate spring 323-2 is narrower than extensible and contractable structure 323e of plate spring 323-1. Moreover, a meandering portion of extensible and contractable structure 323g of plate spring 323-3 is longer than a meandering portion of extensible and contractable structure 323f of plate spring 323-2.

Thus, extensible and contractable structures 323e to 323g are provided, and consequently plate springs 323-1 to 323-3 become easy to bend in a Z axis direction and become easy to twist in a direction parallel to a Y-Z plane, as compared to plate spring 323 of the second exemplary embodiment. Moreover, due to the difference among extensible and contractable structures 323e to 323f, plate spring 323-3 becomes the easiest to bend, and plate spring 323-2 becomes the second easiest to bend among plate springs 323-1 to 323-3.

Figure 29A:
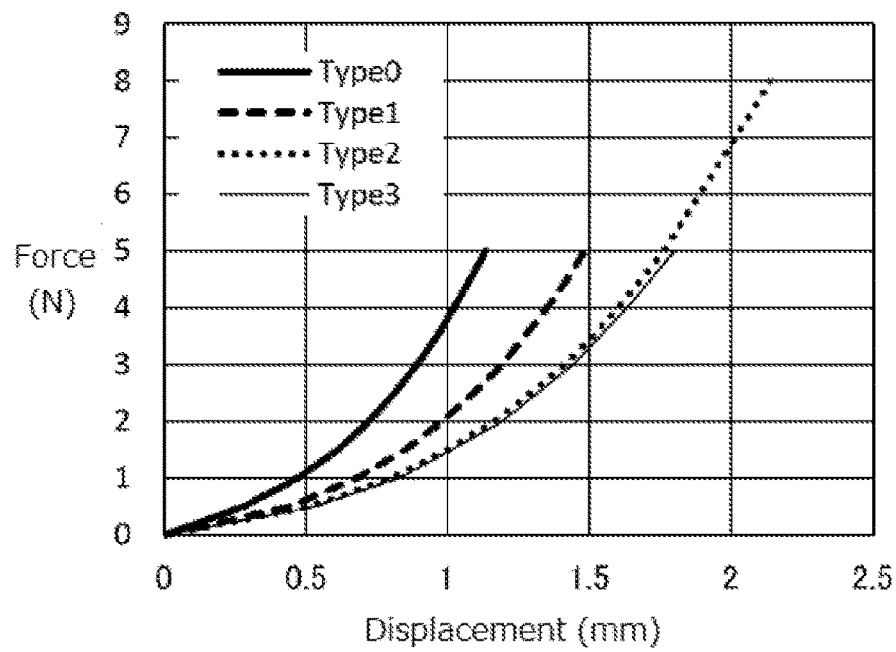
FIGS. 29A, 29B are views illustrating reaction force characteristics and stress characteristics of the leaf springs according to the third exemplary embodiment.
Figure 29B:
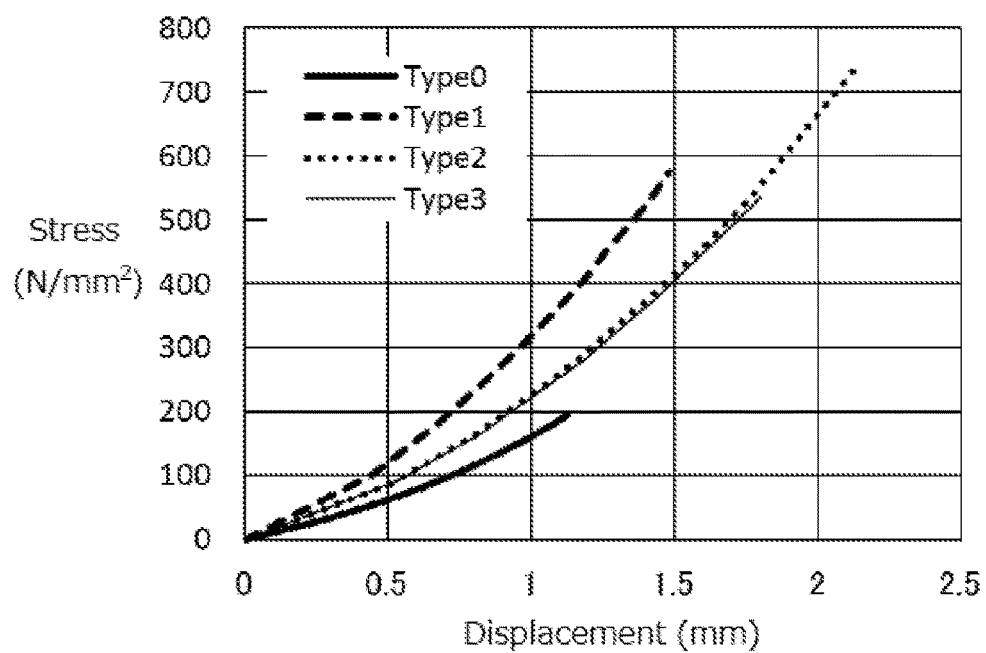

FIGS. 29A, 29B are views illustrating reaction force characteristics and stress characteristics of plate springs 323-1 to 323-3 according to the third exemplary embodiment. FIGS. 29A, 29B also illustrate reaction force characteristics and stress characteristics of plate spring 323 according to the second exemplary embodiment. In FIG. 29A, a horizontal axis indicates a bend amount (a displacement amount of an end with respect to a center) of each of plate springs 323 and 323-1 to 323-3, and a vertical axis indicates reaction force applied to the end. Moreover, in FIG. 29B, a horizontal axis indicates a bend amount (a displacement amount of an end with respect to a center) of each of plate springs 323, 323-1 to 323-3, and a vertical axis indicates a maximum stress applied to each of plate springs 323, 323-1 to 323-3.

In FIGS. 29A, 29B, Type0 indicates characteristics of plate spring 323 according to the second exemplary embodiment, and Type1 to Type3 indicate characteristics of plate springs 323-1 to 323-3, respectively. Here, each of plate spring 323 and plate springs 323-1 to 323-3 has a total length of 72.8 mm and a thickness of 0.2 mm, and includes a material of BeCu. An effective length as a plate spring between two locations except a center (fixed portion) and an end (support portion) in each of plate spring 323 and plate springs 323-1 to 323-3 is 29.1 mm.

As illustrated in FIG. 29A, reaction force of plate spring 323 according to the second exemplary embodiment rapidly increases along with an increase in a bend amount. For this reason, In order to obtain a bend amount necessary for reciprocal movement of movable screen 301 by using plate spring 323, large reaction force is produced in plate spring 323, and driving unit 300 needs to have large driving force. For example, in order to obtain a bend amount of 1 mm (movement amount of movable screen 301) by using plate spring 323 according to the second exemplary embodiment, driving force of 4 N is necessary. Moreover, when reaction force rapidly increases in such a way and linearity of reaction force characteristics decreases, it becomes difficult to control driving of movable screen 301.

By contrast, as illustrated in FIG. 29A, reaction force of each of plate springs 323-1 to 323-3 according to the third exemplary embodiment moderately increases along with an increase in a bend amount, and linearity of the reaction force characteristics of each of plate springs 323-1 to 323-3 is enhanced, as compared to plate spring 323 according to the second exemplary embodiment. For this reason, when each of plate springs 323-1 to 323-3 according to the third exemplary embodiment is used to obtain a bend amount of 1 mm (movement amount of movable screen 301), it is possible to suppress driving force to 2 N or less, and particularly when each of plate springs 323-2, 323-3 is used, it possible to suppress driving force to approximately 1.5 N. Moreover, since linearity of the reaction force characteristics of each of plate springs 323-1 to 323-3 is improved, it is possible to easily control driving of movable screen 301.

On the other hand, as illustrated in FIG. 29B, since area of a portion of each of extensible and contractable structures 323e to 323g of plate springs 323-1 to 323-3 decreases, a maximum stress in each of plate springs 323-1 to 323-3 increases as compared to a maximum stress in plate spring 323 according to the second exemplary embodiment. Here, when a maximum stress increases, a life of each of plate springs 323-1 to 323-3 until breakage becomes short due to stress concentration during repetitive deformation of each of plate springs 323-1 to 323-3. For this reason, a maximum stress with respect to a bend amount of each of plate springs 323-1 to 323-3 is preferably as small as possible.

For example, in order to obtain a bend amount of 1 mm (movement amount of movable screen 301) by using plate spring 323-1, a stress exceeding 300 N/mm² is produced. By contrast, when each of plate springs 323-2, 323-3 is used to obtain a bend amount of 1 mm (movement amount of movable screen 301), a stress is suppressed to approximately 200 N/mm² Consequently, it is possible to extend a life of each of plate springs 323-2, 323-3 to the extent that a number of times of repetitive deformation exceeds $10^{10}$ times. Hence, it is preferable to use plate springs 323-2, 323-3 rather than plate springs 323-1 in order to achieve a long life.

As described above, it is possible to stably move movable screen 301 by smaller driving force by using plate springs 323-1 to 323-3 illustrated in FIGS. 28B to 28C. Particularly, it is possible to more easily and stably control driving of movable screen 301 by using plate springs 323-2, 323-3, and to further extend a life of each of plate springs 323-2, 323-3.

Figure 30A:
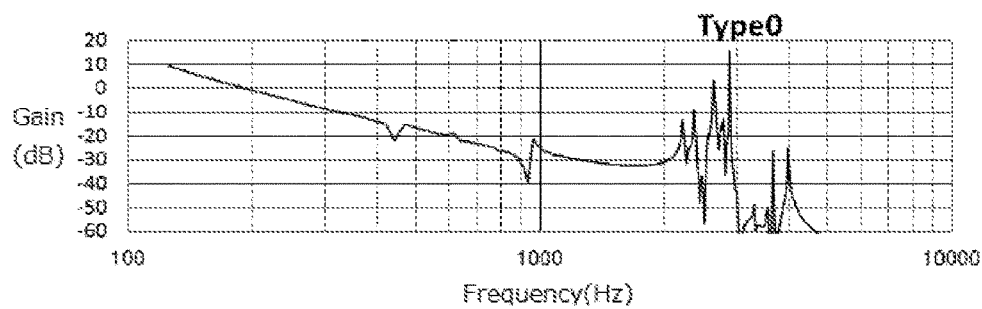
FIG. 30A is a view illustrating frequency response characteristics of the leaf spring used in the second exemplary embodiment as reference.
Figure 30B:
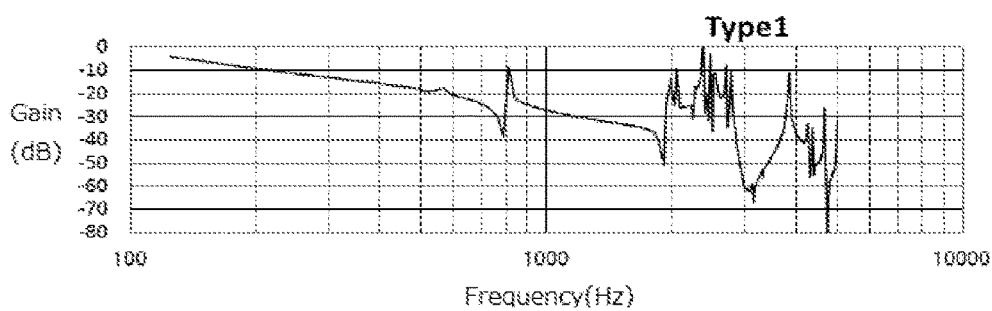
FIGS. 30B to 30D are plan views illustrating frequency response characteristics of the leaf springs according to the third exemplary embodiment, respectively.
Figure 30C:
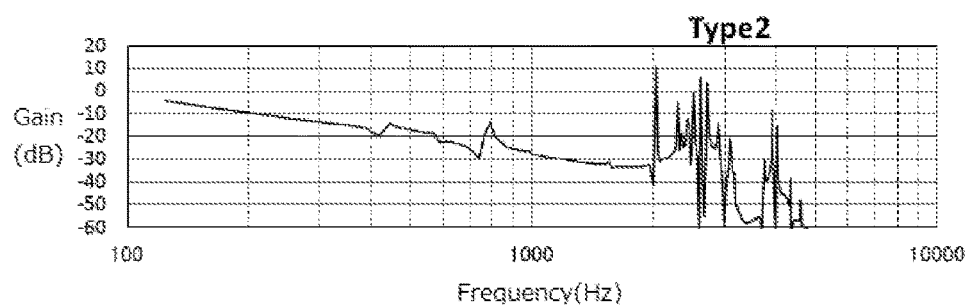
Figure 30D:
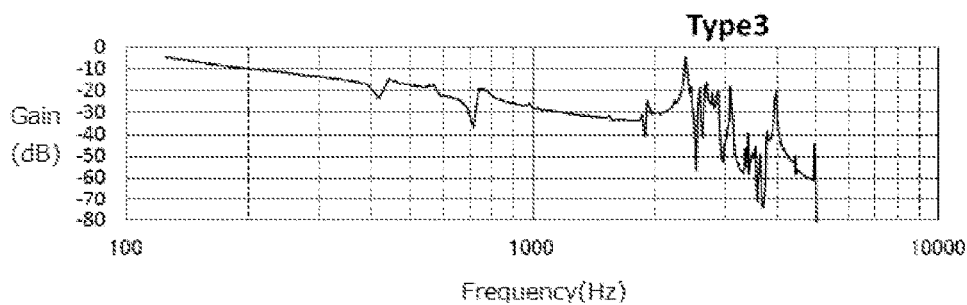

FIG. 30A is a view illustrating frequency response characteristics in a case where plate spring 323 according to the second exemplary embodiment is used as each of four plate springs which support holder 321, and FIGS. 30B to 30D are views illustrating frequency response characteristics in cases where plate springs 323-1 to 323-3 according to the third exemplary embodiment are used as four plate springs which support holder 321, respectively. FIGS. 30A to 30D illustrate the frequency response characteristics based on simulations.

It is understood with reference to FIGS. 30A to 30D that amplitude of unnecessary resonance is suppressed in the case where each of plate springs 323-1 to 323-3 (Type1 to Type3) according to the third exemplary embodiment is used, as compared to the case where plate spring 323 (Type0) according to the second exemplary embodiment is used. Consequently, it is understood that it is possible to obtain the above-described effect, that is, the effect of enabling stable reciprocal movement of movable screen 301, by using each of plate springs 323-1 to 323-3 according to the third exemplary embodiment. Particularly, it is possible to significantly suppress amplitude of unnecessary resonance and to enhance linearity of frequency response characteristics by using plate spring 323-3 (Type3). Consequently, it can be said that an extensible and contractable structure provided to a plate spring is preferably formed narrower and longer such that the extensible and contractable structure can more smoothly follow deformation of the plate spring caused by displacement of holder 321. That is, the extensible and contractable structure is preferably configured to be softer.

Note that in the frequency response characteristics of plate spring 323-3 (Type3) illustrated in FIG. 30D, gain fluctuation is produced around a frequency of 2000 Hz. On the other hand, when movable screen 301 is driven at a frequency of approximately 60 Hz as described above, it is preferable to secure a control band of a servo system up to approximately 2000 Hz in order to stably perform various complicated control operations such as a stop operation and an activation operation of movable screen 301. For this reason, it is preferable to cancel gain fluctuation produced around 2000 Hz.

For this problem, the present inventors have considered making buckling rigidity of the pair of plate springs at the Z axis positive side and buckling rigidity of the pair of plate springs at the Z axis negative side different from each other among the four plate springs which support holder 303 according to the second exemplary embodiment. Specifically, the present inventors have considered using any one of the plate springs in FIGS. 28A to 28D as each of the pair of plate springs at the Z axis positive side, and using another of the plate springs in FIGS. 28A to 28D as each of the pair of plate springs at the Z axis negative side.

Here, the buckling rigidity indicates deformation difficulty of each plate spring in FIGS. 28A to 28D with respect to external force (compression or pull) in an X axis positive direction or an X axis negative direction, and can be expressed by (load/deformation amount).

Figure 31A:
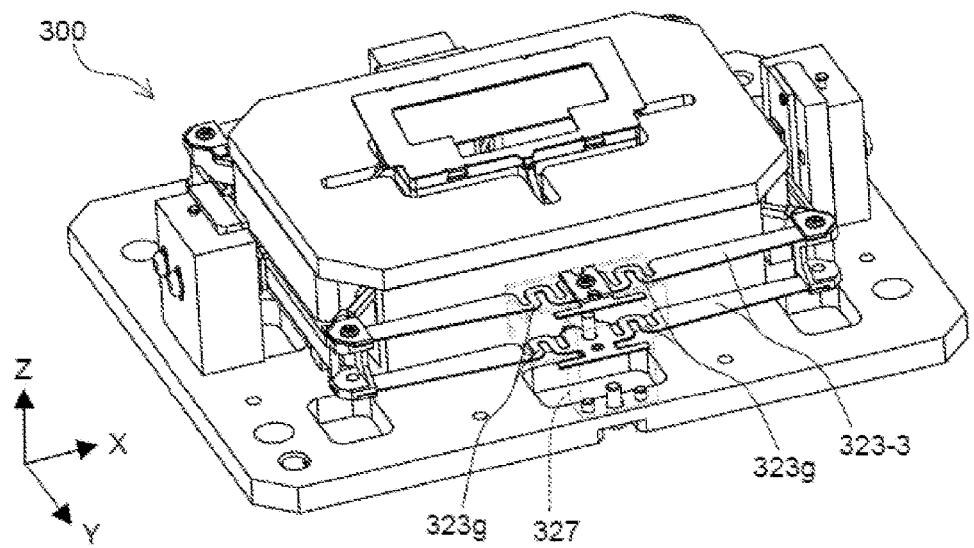
FIGS. 31A to 31C are perspective views illustrating configurations of driving units according to the third exemplary embodiment, respectively.
Figure 31B:
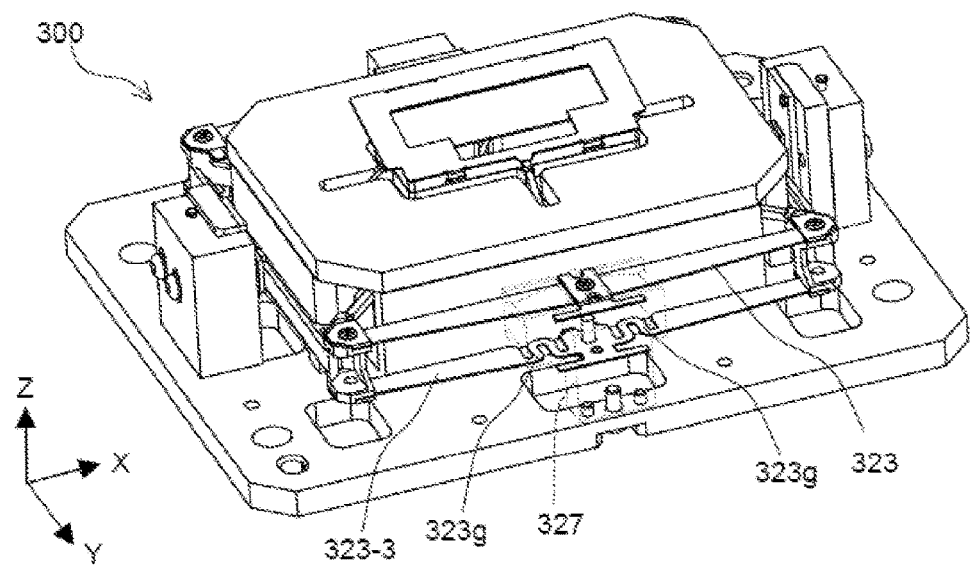
Figure 31C:
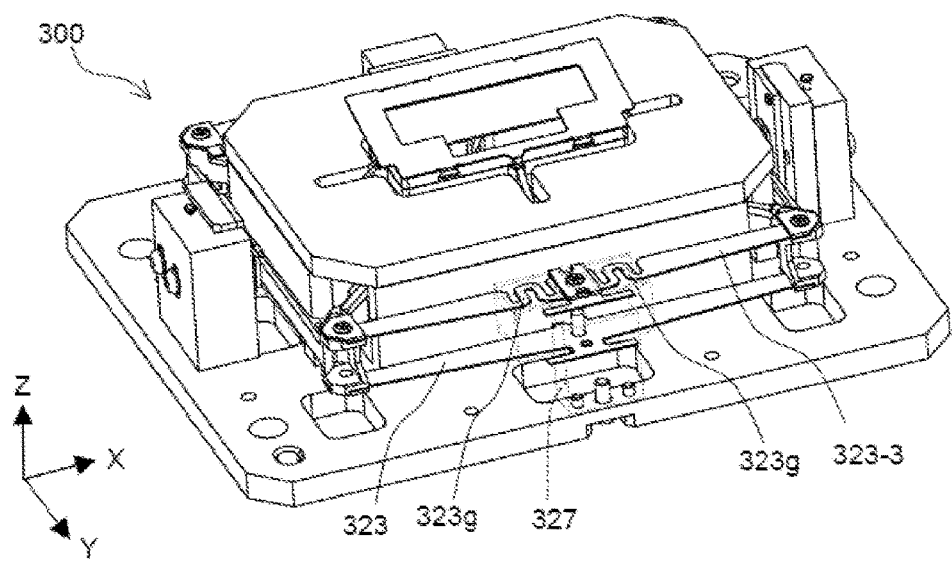

FIGS. 31A to 31C are perspective views illustrating configurations of driving units 300 according to the third exemplary embodiment, respectively. Each of FIGS. 31A to 31C illustrates support member 327 by a broken line, and illustrates a transparent view of a vicinity of a center of a plate spring.

In the configuration in FIG. 31A, any of a pair of plate springs at a Z axis positive side and a pair of plate springs at a Z axis negative side is plate spring 323-3 in FIG. 28D. By contrast, in the configuration in FIG. 31B, each of a pair of plate springs at the Z axis positive side is plate spring 323 in FIG. 28A, and each of a pair of plate springs at the Z axis negative side is plate spring 323-3 in FIG. 28D. Moreover, in the configuration in FIG. 31C, each of a pair of plate springs at the Z axis positive side is plate spring 323-3 in FIG. 28D, and each of a pair of plate springs at the Z axis negative side is plate spring 323 in FIG. 28A.

Hence, in the configuration in FIG. 31A, buckling rigidity of the pair of plate springs at the Z axis positive side is the same as buckling rigidity of the pair of plate springs at the Z axis negative side. By contrast, in the configuration in each of FIGS. 31B, 31C, buckling rigidity of the pair of plate springs at the Z axis positive side, and buckling rigidity of the pair of plate springs at the Z axis negative side are different from each other.

Figure 32A:
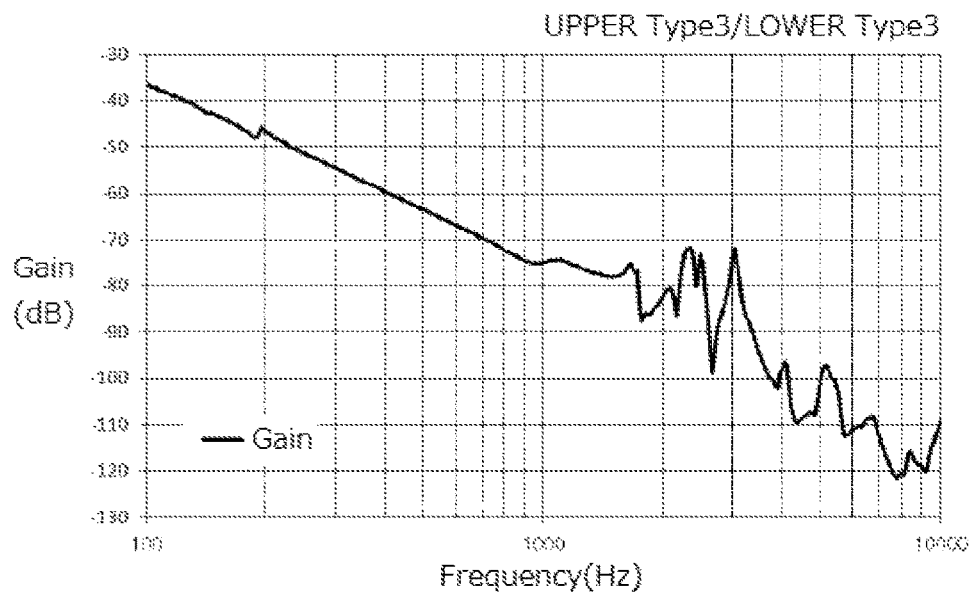
FIGS. 32A to 32C are views illustrating frequency response characteristics of the driving units according to the third exemplary embodiment, respectively.
Figure 32B:
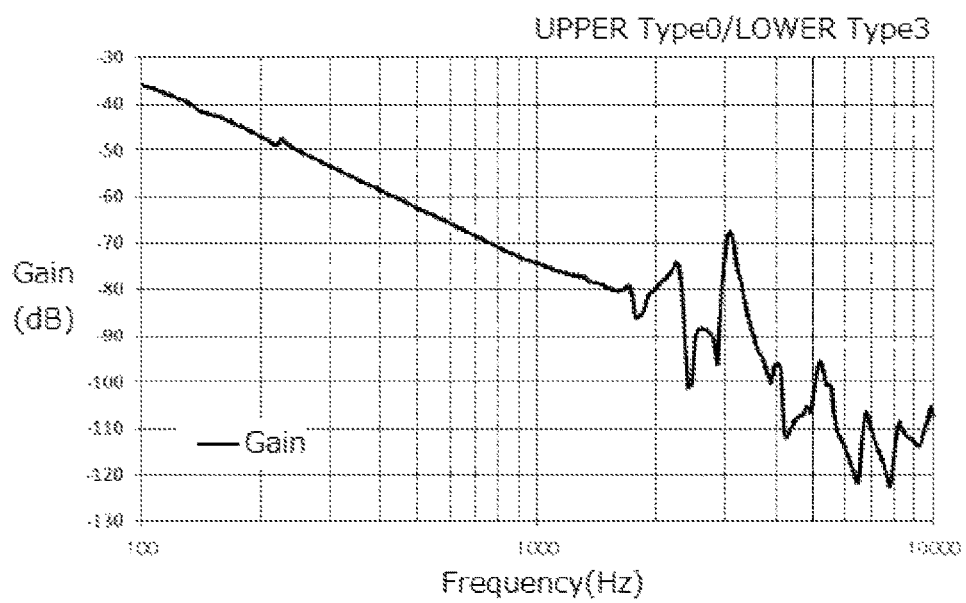
Figure 32C:
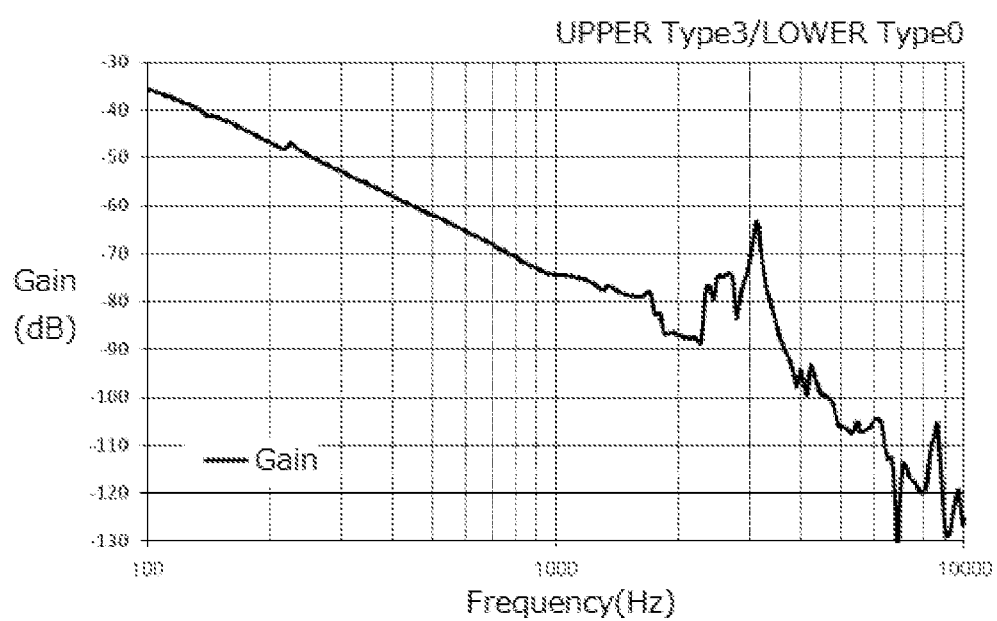

FIGS. 32A to 32C are views illustrating frequency response characteristics (actual measured values) of driving units 300 illustrated in FIGS. 31A to 31C, respectively. FIGS. 32A to 32C illustrate gain characteristics of driving units 300, respectively.

With reference to FIG. 32A, gain fluctuation is produced at a frequency slightly lower than 2000 Hz. Thus, when gain fluctuation is produced, control of driving unit 300 tends to become unstable.

By contrast, with reference to FIG. 32B, gain fluctuation around 2000 Hz is suppressed as compared to the case in FIG. 32A. Moreover, with reference to FIG. 32C, gain fluctuation around 2000 Hz is more significantly suppressed, and no large fluctuation in a peak pattern is observed.

In view of the above, it has been possible to confirm that, buckling rigidity is made different by using a pair of plate springs at the Z axis positive side and a pair of plate springs at the Z axis negative side which are different from each other, and that consequently it is possible to stabilize a gain of driving unit 300 in a band up to around 2000 Hz.

Note that it is considered that such action is achieved by following reasons.

First, in the configuration in FIG. 31A, since the pair of plate springs 323-3 at the Z axis positive side and the pair of plate springs 323-3 at the Z axis negative side have the same configuration and have the same buckling rigidity, amplitude at substantially the same phase is produced and resonance at the same resonance frequency is produced. In this case, in a resonance system including upper and lower plate springs 323-3 and supported portion 321d sandwiched between upper and lower plate springs 323-3, a resonance mode in upper and lower plate springs 323-3 is enhanced and large amplitude is produced. It is considered that for this reason, large gain fluctuation is produced around 2000 Hz as illustrated in FIG. 32A.

By contrast, in the configuration in FIG. 31B, since the pair of plate springs 323 at the Z axis positive side and the pair of plate springs 323-3 at the Z axis negative side are different in a configuration and buckling rigidity, the pair of plate springs 323 at the Z axis positive side and the pair of plate springs 323-3 at the Z axis negative side are different in a resonance point. For this reason, in a resonance system including upper and lower plate springs 323, 323-3 and supported portion 321d sandwiched between upper and lower plate springs 323, 323-3, a resonance mode in upper and lower plate springs 323, 323-3 is unlikely to be enhanced, and large amplitude is suppressed. It is considered that for this reason, large gain fluctuation is suppressed around 2000 Hz as illustrated in FIG. 32B.

Similarly, in the configuration in FIG. 31C, since the pair of plate springs 323-3 at the Z axis positive side and the pair of plate springs 323 at the Z axis negative side are different in a configuration and buckling rigidity, the pair of plate springs 323-3 at the Z axis positive side and the pair of plate springs 323 at the Z axis negative side are different in a resonance point. It is considered that for this reason, large gain fluctuation is suppressed around 2000 Hz as with FIG. 32B.

As described above, it is considered that buckling rigidity of a pair of plate springs at the Z axis positive side and buckling rigidity of a pair of plate springs at the Z axis negative side are made different, and consequently it is possible to suppress gain fluctuation. Note that FIGS. 31B, 31C each illustrate the combination of plate springs 323 and 323-3 in FIGS. 28A, 28D, but a combination of other plate springs different in buckling rigidity may be used. For example, it is assumed that the same effect can be obtained by a combination of plate springs 323-1, 323-3 in FIGS. 28B, 28D and by a combination of plate springs 323-1, 323-2 in FIGS. 28B, 28C. In addition, a plate spring having an extensible and contractable structure of a crank shape other than the plate springs in FIGS. 28B to 28D may be used.

Note that a number of pairs of plate springs may not necessarily be two, and three pairs or more of plate springs may be disposed in the Z axis direction. In this case, it is also preferable to form an extensible and contractable structure in at least one of these plate springs so as to reduce reaction force and to improve a frequency response. Moreover, in each of FIGS. 28B to 28D, the extensible and contractable structure is formed at the position located near the center side at each of both the sides of the center of the plate spring. However, the extensible and contractable structure may be disposed at a position displaced toward an end side from this position.

Other Modifications

The exemplary embodiments of the present disclosure are described above. However, the present disclosure is not limited to the above-described exemplary embodiments, and various modifications can also be made in application examples of the present disclosure, in addition to the above-described exemplary embodiments.

For example, holders 303, 321 are each formed with a resin in the first, second exemplary embodiments. However, holders 303, 321 may each have a hybrid structure formed with a resin and with a lightweight alloy (for example a magnesium alloy). In this case, in order to suppress production of an eddy current, a portion which directly comes into contact with at least coils 315, 337 is formed with a resin, and preferably, a portion which comes into close contact with coils 315, 337 is also formed with a resin. Holders 303, 321 are each formed by insert-molding of a portion to be formed with a resin into a portion to be formed with a lightweight alloy. In such a way, it is possible to maintain mechanical strength while reducing a weight of each of holders 303, 321 by using a lightweight alloy, and to suppress an electrical failure by using a resin.

Moreover, the example where the present disclosure is applied to the head-up display mounted on vehicle 1 is described in each of the first, second exemplary embodiments. However, the present disclosure is not limited to an in-vehicle type, and is also applicable to other types of image display devices.

Moreover, configurations of image display device 20 and irradiation light generator 21 are not limited to the configurations illustrated in FIGS. 1C and 2, and can be modified appropriately. Moreover, a configuration of driving unit 300 which moves movable screen 301 is also not limited to the configurations described in the first, second exemplary embodiments, and can be modified appropriately.

Various modifications can appropriately be made in the exemplary embodiments of the present disclosure, within a scope of a technical idea described in the claims.

What is claimed is:

1. An image display device comprising:
a light source;
a screen which is irradiated with light from the light source to form an image;
an optical system which generates a virtual image with the light from the screen; and
a driving unit which moves the screen in an optical axis direction, wherein:
the driving unit includes:
a holder which holds the screen,
a plurality of elastic members which support the holder so as to enable the holder to reciprocally move in the optical axis direction, and
a driving source which generates force for moving the holder in the optical axis direction,
the plurality of elastic members are disposed so as to be arranged in the optical axis direction, and
buckling rigidity of one of the plurality of elastic members is set to be different from buckling rigidity of another one of the plurality of elastic members.

2. The image display device according to claim 1, wherein at least one of the plurality of elastic members restricts a movement of the holder in the optical axis direction of the holder.

3. The image display device according to claim 1, wherein the driving source moves the holder in the optical axis direction by electromagnetic drive.

4. The image display device according to claim 1, wherein:
the screen has a substantially rectangular shape in outline, and the driving unit has one or more pairs of the plurality of elastic members,
at least one of the pairs of the plurality of elastic members are arranged in a direction parallel to a short side of the screen so as to sandwich the screen,
at least one of the plurality of elastic members configuring the one of the pairs of the plurality of elastic members has an extensible and contractable structure which meanders in a width direction orthogonal to a longitudinal direction of the one of the plurality of elastic members.

5. An image display device comprising:
a light source;
a screen which is irradiated with light from the light source to form an image;
an optical system which generates a virtual image with the light from the screen; and
a driving unit which moves the screen in an optical axis direction, wherein:
the driving unit includes:
a holder which holds the screen,
one or more elastic members which support the holder so as to enable the holder to reciprocally move in the optical axis direction, and
a driving source which generates force for moving the holder in the optical axis direction,
the screen has a substantially rectangular shape in outline,
the driving source includes a base, a magnetic circuit which is installed on the base, and a coil to which a magnetic field from the magnetic circuit is applied, the coil being installed on the holder,
the magnetic circuit includes:
a pair of first yokes arranged in a direction parallel to a long side of the screen so as to sandwich the screen, which each has a substantially U shape structure including a first inside wall portion disposed at a side near the screen and a first outside wall portion disposed at a side far from the screen,
a pair of first magnets which are installed so as to face each other on an inside surface of each of the pair of first yokes,
a pair of second yokes arranged in a direction parallel to a short side of the screen so as to sandwich the screen, which each has a substantially U shape structure including a second inside wall portion disposed at a side near the screen and a second outside wall portion disposed at a side far from the screen, and
a pair of second magnets which are installed so as to face each other on an inside surface of each of the pair of second yokes, and
the coil is disposed so as to be inserted both in a gap between the pair of first magnets and in a gap between the pair of second magnets.

6. The image display device according to claim 5, wherein:
the pair of first yokes and the pair of second yokes are disposed such that a side end surface of the first inside wall portion and a surface, which is disposed at a side near the screen, of the second inside wall portion overlap each other, and
one of the pair of first magnets which is installed on the first inside wall portion extends to a side end surface of the second inside wall portion.

7. The image display device according to claim 5, wherein:
the pair of first yokes and the pair of second yokes are disposed such that a surface, which is disposed at a side near the screen, of the first inside wall portion and a side end surface of the second inside wall portion overlap each other, and
one of the pair of second magnets which is installed on the second inside wall portion extends to a side end surface of the first inside wall portion.

8. The image display device according to claim 5, wherein:
the base is made of a magnetic material, and
the pair of first yokes and the pair of second yokes are installed on an upper surface of the base.

9. The image display device according to claim 5, wherein:
each of the pair of first yokes is separated in a longitudinal direction of the each one of the pair of first yokes,
the pair of first magnets are installed on each of separated portions of the each one of the pair of first yokes,
the holder is connected to one of the elastic members through a gap between the separated portions of the each one of the pair of first yokes,
the holder includes: an inner frame which has a substantially rectangular shape and on which the screen is installed; an outer frame which has a substantially rectangular shape disposed outside of the inner frame and on which the coil is installed; and a supported portion which extends outward from the outer frame in a direction parallel to a long side of the screen,
the supported portion passes through a gap between separated portions of the first outside wall portion, and
a part of the supported portion protruding with respect to a surface, which is disposed at a side far from the screen, of the first outside wall portion is connected to the one of the elastic members.

10. The image display device according to claim 5, wherein:
the holder includes: an inner frame which has a substantially rectangular shape and on which the screen is installed; and an outer frame which has a substantially rectangular shape disposed outside of the inner frame and on which the coil is installed, and
the outer frame is connected to one of the elastic members both through a gap between the first outside wall portion and the second outside wall portion, and through a gap between one of the pair of first magnets which is installed on the first outside wall portion and one of the pair of second magnets which is installed on the second outside wall portion.

11. The image display device according to claim 10, wherein:
the inner frame is disposed so as to be displaced in a height direction with respect to the outer frame such that the inner frame is positioned higher than an upper end of the magnetic circuit,
the holder includes a bridge portion which connects between the inner frame and the outer frame,
at least one of the first inside wall portion and the second inside wall portion is separated in a longitudinal direction of corresponding one among the first inside wall portion and the second inside wall portion, and
the bridge portion passes through a gap between separated portions of the first inside wall portion or a gap between separated portions of the second inside wall portion.

12. The image display device according to claim 5, wherein:
the elastic members are plate springs, a pair of the plate springs are arranged in a direction parallel to a short side of the screen so as to sandwich the screen, each of the pair of the plate springs has a symmetrical shape in a longitudinal direction of the screen, and is disposed so that a longitudinal direction of the each one of the pair of the plate springs is substantially parallel to a long side of the screen, the each one of the pair of the plate springs is fixed to the base at a center position in the longitudinal direction of the screen, and is fixed to the holder at both ends of the each one of the pair of the plate springs.

13. An image display device comprising:

a light source;

a first screen which is irradiated with light from the light source to form an image;

a second screen which is irradiated with light from the light source to form an image;

an optical system which generates a virtual image with the light from the first screen and the second screen;

a driving unit which moves the first screen in an optical axis direction; and an image processing unit which modulates according to an image signal the light with which the first screen and the second screen are irradiated, wherein the second screen is fixed on the driving unit at a position displaced with respect to the first screen in a direction orthogonal to the optical axis direction, which is outside of a movement range of the first screen moved by the driving unit.

14. The image display device according to claim 13, wherein the second screen is disposed at a position where the second screen is optically farther from the light source than the first screen is.

15. The image display device according to claim 13, wherein:

the first screen has a substantially rectangular shape, and the second screen is disposed at a position where the second screen is far from the first screen in a direction parallel to a short side of the first screen.

* * * * *